(12) United States Patent
Lehane et al.

(10) Patent No.: US 9,641,403 B2
(45) Date of Patent: *May 2, 2017

(54) SYSTEMS, DEVICES AND METHODS OF DECOMPOSING SERVICE REQUESTS INTO DOMAIN-SPECIFIC SERVICE REQUESTS

(75) Inventors: Bart Lehane, Dublin (IE); Alan McNamee, Dublin (IE); Cameron Ross Dunne, Kildare (IE); Joe Hogan, Dublin (IE)

(73) Assignee: OPENET TELECOM LTD., Dublin (IE)

( * ) Notice: Subject to any disclaimer, the term of this patent is extended or adjusted under 35 U.S.C. 154(b) by 822 days.

This patent is subject to a terminal disclaimer.

(21) Appl. No.: 13/452,682

(22) Filed: Apr. 20, 2012

(65) Prior Publication Data

US 2012/0278378 A1    Nov. 1, 2012

Related U.S. Application Data

(60) Provisional application No. 61/479,136, filed on Apr. 26, 2011, provisional application No. 61/537,419, (Continued)

(51) Int. Cl.
*H04L 12/24* (2006.01)

(52) U.S. Cl.
CPC ...... *H04L 41/5054* (2013.01); *H04L 41/5051* (2013.01)

(58) Field of Classification Search
CPC .................................................. H04L 41/5054
(Continued)

(56) References Cited

U.S. PATENT DOCUMENTS 6,167,445 A    12/2000  Gai et al.
6,308,216 B1   10/2001  Goldszmidt et al.
(Continued)

FOREIGN PATENT DOCUMENTS

EP    2 346 210 A1    7/2010
EP    2 242 205 A1    10/2010
(Continued)

OTHER PUBLICATIONS

European Search Report dated Jul. 31,2012, issued in EP Application No. 12165563, mailed on Aug. 6, 2012.
(Continued)

*Primary Examiner* — Anthony Mejia
*Assistant Examiner* — Joseph M Cousins
(74) *Attorney, Agent, or Firm* — The Marbury Law Group, PLLC

(57) ABSTRACT

The various embodiments include methods, computers and communication systems that enable decomposing abstract service requests into resources rules, which may include receiving an abstract service request (e.g., a request specifying a functional requirement) via an exposed public interface, generating domain-specific resource rules based on the received abstract service request, identifying relevant components in a telecommunications domain for enforcing the generated domain-specific resource rules, and send the domain-specific resource rules to the identified components (e.g., on-line charging server, policy management server, etc.) for enforcement. Generating domain-specific resource rules based on the received abstract service request may include generating the rules consistent with the existing resource rules of the domain.

29 Claims, 34 Drawing Sheets

Related U.S. Application Data filed on Sep. 21, 2011, provisional application No. 61/546,818, filed on Oct. 13, 2011, provisional application No. 61/617,005, filed on Mar. 28, 2012.

(58) Field of Classification Search
USPC .................................................. 709/201
See application file for complete search history.

(56) References Cited

U.S. PATENT DOCUMENTS

| | | | |
|---|---|---|---|
| 6,363,420 | B1 | 3/2002 | Coward |
| 6,427,173 | B1 | 7/2002 | Boucher et al. |
| 6,862,281 | B1 | 3/2005 | Chandrasekaran |
| 7,107,334 | B1 | 9/2006 | Shaffer et al. |
| 7,197,546 | B1 | 3/2007 | Bagga et al. |
| 8,023,425 | B2 | 9/2011 | Raleigh |
| 2002/0150094 | A1 | 10/2002 | Cheng et al. |
| 2003/0065812 | A1 | 4/2003 | Beier et al. |
| 2003/0195919 | A1 | 10/2003 | Watanuki et al. |
| 2004/0088437 | A1 | 5/2004 | Stimac |
| 2006/0047836 | A1 | 3/2006 | Rao et al. |
| 2006/0085549 | A1 | 4/2006 | Hasti et al. |
| 2006/0165053 | A1 | 7/2006 | Bhatnagar et al. |
| 2006/0271813 | A1 | 11/2006 | Horton et al. |
| 2007/0143442 | A1 | 6/2007 | Zhang et al. |
| 2007/0153995 | A1 | 7/2007 | Fang et al. |
| 2007/0258460 | A1 | 11/2007 | Momtahan et al. |
| 2007/0283011 | A1 | 12/2007 | Rakowski et al. |
| 2008/0034080 | A1* | 2/2008 | Chamaraj et al. ............ 709/223 |
| 2008/0046573 | A1 | 2/2008 | Ropolyi et al. |
| 2008/0117869 | A1 | 5/2008 | Freen et al. |
| 2008/0133729 | A1* | 6/2008 | Fridman et al. .............. 709/223 |
| 2008/0183991 | A1 | 7/2008 | Cosmadopoulos et al. |
| 2008/0212602 | A1 | 9/2008 | Hobbs et al. |
| 2008/0216148 | A1 | 9/2008 | Bienek et al. |
| 2008/0240150 | A1 | 10/2008 | Dias et al. |
| 2009/0025010 | A1 | 1/2009 | Foottit et al. |
| 2009/0049201 | A1 | 2/2009 | Albert et al. |
| 2009/0049444 | A1 | 2/2009 | Ottavi et al. |
| 2009/0063650 | A1 | 3/2009 | Anslow et al. |
| 2009/0119742 | A1 | 5/2009 | Graziani et al. |
| 2009/0228611 | A1 | 9/2009 | Ferguson et al. |
| 2009/0249452 | A1 | 10/2009 | Burke et al. |
| 2009/0285179 | A1 | 11/2009 | Jones et al. |
| 2009/0305684 | A1 | 12/2009 | Jones et al. |
| 2010/0017603 | A1 | 1/2010 | Jones |
| 2010/0023699 | A1 | 1/2010 | Reidel et al. |
| 2010/0035576 | A1 | 2/2010 | Jones et al. |
| 2010/0042449 | A1* | 2/2010 | Thomas ............................ 705/7 |
| 2010/0185488 | A1 | 7/2010 | Hogan et al. |
| 2010/0188975 | A1 | 7/2010 | Raleigh |
| 2010/0197266 | A1 | 8/2010 | Raleigh |
| 2010/0287080 | A1 | 11/2010 | Thistle et al. |
| 2010/0287298 | A1* | 11/2010 | Leung .................. H04H 20/16 709/232 |
| 2011/0010312 | A1 | 1/2011 | McDonald |
| 2011/0044353 | A1 | 2/2011 | Foottit et al. |
| 2011/0075671 | A1 | 3/2011 | Davidson et al. |
| 2011/0124313 | A1 | 5/2011 | Jones |
| 2011/0208628 | A1 | 8/2011 | Foottit et al. |
| 2011/0264726 | A1* | 10/2011 | Zabawskyj ............. H04L 12/14 709/203 |
| 2011/0275344 | A1 | 11/2011 | Momtahan et al. |
| 2011/0276442 | A1* | 11/2011 | Momtahan ............ G06Q 30/00 705/30 |
| 2011/0280130 | A1 | 11/2011 | Foottit et al. |
| 2012/0026879 | A1 | 2/2012 | Foottit et al. |
| 2012/2008847 | | 4/2012 | Raleigh |

FOREIGN PATENT DOCUMENTS

| | | |
|---|---|---|
| EP | 2 262 199 A1 | 12/2010 |
| EP | 2 429 120 A1 | 3/2012 |
| WO | 02/06973 A1 | 1/2002 |
| WO | 2008/038862 A1 | 4/2008 |
| WO | 2009/129840 A1 | 10/2009 |
| WO | 2010/127593 A1 | 11/2010 |
| WO | 2010/141727 A1 | 12/2010 |

OTHER PUBLICATIONS

Lehane et al., European Application No. 12 165 569.0-1862; Intention to Grant issued by the European Patent Office Nov. 19, 2013.

Intenton to Grant issued by the European Patent Office in European Applcation No. 12 165 569.0 on Nov. 19, 2013.

Extended European Search Report for European Application No. 12165580 mailed on Nov. 4, 2014.

Wikipedia, the free encyclopedia, Multitier Architecture, Three-tier architecture, Oct. 23, 2014.

European Search Report dated Jul. 31, 2012, issued in EP Application No. 12165566, mailed on Aug. 28, 2012.

European Search Report dated Aug. 8, 2012, issued in EP Application No. 12165569, mailed on Aug. 16, 2012.

European Search Report dated Aug. 24, 2012, issued in EP Application No. 12165572, mailed on Sep. 3, 2012.

European Search Report dated Sep. 26, 2012, issued in EP Application No. 12165576, mailed on Oct. 4, 2012.

P. Calhoun et al., Diameter Base Protocol, Network Working Group, Request for Comments: 3588, Category: Standards Track, Sep. 1, 2003.

P. Eronen Ed. et al., Diameter Extensible Authentication Protocol (EAP) Application, Network Working Group, Request for Comments: 4072, Category: Standards Track, Aug. 31, 2005.

J. Wood et al., A Web Services Architecture for Visualization, Fourth IEEE International Conference on eScience, IEEE Computer Society, Dec. 7, 2008.

J. Korhonen Ed. et al., Clarifications on the Routing of Diameter Requests Based on the Username and the Realm, Network Working Group, Request for Comments: 5729, Updates: 3588 Category: Standards Track, Dec. 31, 2009.

http://www.3gpp.org, 3rd Generation Partnership Project; Technical Specification Group Services and System Aspects; Policy and Charging control architecture (Release108), 3GPP TS 23.203 V10.1.0, Sep. 29, 2010. Valbonne, France.

http://www.3gpp.org, 3rd Generation Partnership Project; Technical Specification Group Core Network and Terminals; Policy and Charging Control signalling flows and Quality of Service (QoS) parameter mapping (Release 8), 3GPP TS 29.213 V8.9.1, Oct. 4, 2010. Valbonne, France.

V. Fajardo, Ed. et al., Diameter Base Protocol draft-ietf-dime-rfc3588bis-33.txt, Network Working Group, Internet-Draft, Obsoletes: 3588 5719 (if approved), Intended status: Standards Track, May 7, 2012. (Expires: Nov. 8, 2012).

European Search Report dated Mar. 26, 2012, issued in EP Application No. 11193496, mailed on Apr. 2, 2012.

European Search Report dated Mar. 20, 2012, issued in EP Application No. 11193537, mailed on Apr. 2, 2012.

European Search Report dated Mar. 8, 2012, issued in EP Application No. 11193476, mailed on Apr. 2, 2012.

European Search Report dated Mar. 12, 2012, issued in EP Application No. 11193460, mailed on Apr. 11, 2012.

European Search Report dated Mar. 14, 2012, issued in EP Application No. 11193499, mailed on Apr. 11, 2012.

European Search Report dated May 25, 2012, issued in EP Application No. 11193561, mailed on Jun. 4, 2012.

Examination Report received from the European Patent Office on Jun. 5, 2013 in related European Application 12165569.

* cited by examiner

| Continuum Service Policy | Mobile Device Domain Resource Rules | Mobile Packet Core Domain Resource Rules |
|---|---|---|
| Optimize the network for video streaming | -Minimize uplink quality of service<br><br>-Prioritize uplink RTCP traffic<br><br>-Block non-essential processor intensive background applications | -Maximize downlink quality of service<br><br>-Prioritize time sensitive/ real-time traffic<br><br>-Route traffic through video optimization engine<br><br>-Modify metering and charging for video traffic |
| Optimize the network for video conferencing and video calls | -Maximize uplink quality of service<br><br>-Prioritize uplink RTCP traffic<br><br>-Block non-essential processor intensive background applications | -Maximize downlink quality of service<br><br>-Prioritize time sensitive/ real-time traffic<br><br>-Match downlink traffic to device (transcode video if necessary)<br><br>-Modify metering and charging for video traffic |
| Optimize the network for voice and voice over IP | -Maximize uplink quality of service<br><br>-Prioritize uplink RTCP traffic<br><br>-Throttle non-voice related time sensitive applications | -Maximize downlink quality of service<br><br>-Prioritize downlink voice traffic<br><br>-Throttle non-voice time sensitive applications Zero rate voice traffic |

FIG. 8A

| Continuum Service Policy | Mobile Device Domain Resource Rules | Mobile Packet Core Domain Resource Rules |
|---|---|---|
| Maximize the network's energy efficiency | -Turn the user equipment off after a short period of inactivity<br><br>-Limit the number of network connections for time sensitive application<br><br>-Measure the amount of application usage time and report this to the mobile packet core domain | -Charge more for traffic sent and received at peak energy times<br><br>-Financially reward users with low energy usage profiles |
| Optimize the network for business users | -Prioritize e-mail and instant message applications<br><br>-Allow frequent polling by e-mail and instant messaging applications<br><br>-Classify traffic into 'business' and 'personal' categories and charge differently for each category | -Prioritize traffic from specified business services such as customer relationship management services<br><br>-Prioritize traffic to and from corporate virtual private networks<br><br>-Block non-corporate traffic Throttle traffic when roaming to reduce charges |
| Optimize the network for students | -Prioritize applications that are popular with students such as social networking applications<br><br>-Allow throttled peer-to-peer traffic<br><br>-Provide the user with notifications regarding applications generating excessive amounts of traffic<br><br>-Block high bandwidth by default, unless told to allow it by the user | -Prioritize lower charges ahead of higher quality of service<br><br>-Prioritize traffic belonging to higher value users |

FIG. 8B

| Service | Priority | UE Domain<br><br>Downlink Actual QoS | MPC Domain<br><br>Downlink Allocated QoS | Content Provider Domain<br><br>Downlink Intended QoS |
|---|---|---|---|---|
| Video on Demand | 1 | 2,000 kb/s | 3,000 kb/s | 3,000 kb/s |
| User Equipment Update | 2 | 2,000 kb/s | 2,000 kb/s | 2,000 kb/s |
| Totals | N/A | 4,000 kb/s | 5,000 kb/s | 5,000 kb/s |

FIG. 12A

| Service | Priority | UE Domain<br><br>Downlink Actual QoS | MPC Domain<br><br>Downlink Allocated QoS | Content Provider Domain<br><br>Downlink Intended QoS |
|---|---|---|---|---|
| Video on Demand | 1 | 3,000 kb/s | 4,000 kb/s | 3,000 kb/s |
| User Equipment Update | 2 | 2,000 kb/s | 2,000 kb/s | 2,000 kb/s |
| Totals | N/A | 5,000 kb/s | 6,000 kb/s | 5,000 kb/s |

FIG. 12B

| Service | Priority | UE Domain<br><br>Downlink Actual QoS | MPC Domain<br><br>Downlink Allocated QoS | Content Provider Domain<br><br>Downlink Intended QoS |
|---|---|---|---|---|
| Video on Demand | 1 | 3,000 kb/s | 4,000 kb/s | <u>4,000 kb/s</u> |
| User Equipment Update | 2 | 2,000 kb/s | 2,000 kb/s | 2,000 kb/s |
| Totals | N/A | 5,000 kb/s | 6,000 kb/s | <u>6,000 kb/s</u> |

FIG. 12C

| Service | Priority | UE Domain<br><br>Downlink Actual QoS | MPC Domain<br><br>Downlink Allocated QoS | Content Provider Domain<br><br>Downlink Intended QoS |
|---|---|---|---|---|
| Video on Demand | 1 | <u>4,000 kb/s</u> | <u>5,000 kb/s</u> | 4,000 kb/s |
| User Equipment Update | 2 | <u>1,000 kb/s</u> | <u>1,000 kb/s</u> | 2,000 kb/s |
| Totals | N/A | 5,000 kb/s | 6,000 kb/s | 6,000 kb/s |

FIG. 12D

| Domain Type | Contextual Information |
|---|---|
| User equipment domain (e.g. a mobile device) | -Location of user equipment (present and past)<br>-Cell used by user equipment (present and past)<br>-Applications and services used by user equipment (present and past)<br>-Radio network conditions (e.g. signal strength)<br>-Objective quality of service measurements<br>-Subjective quality of service measurements (e.g. directly asking the user for feedback)<br>-User charging information (e.g. metering information, rating plan, current balance, etc.)<br>-Intended quality of service<br>-Available quality of service<br>-Allocated quality of service<br>-Actual quality of service |
| Radio access network domain (e.g. a 3G mobile network) | -Location of user equipment (present and past)<br>-Cell used by user equipment (present and past)<br>-Radio network conditions (e.g. signal strength)<br>-Intended quality of service<br>-Available quality of service<br>-Allocated quality of service<br>-Actual quality of service<br>-Cell congestion information |
| Mobile packet core domain (e.g. a 3G mobile network) | -Location of user equipment (present and past)<br>-Cell used by user equipment (present and past)<br>-Applications and services used by user equipment (present and past)<br>-User charging information (e.g. metering information, rating plan, current balance, etc.)<br>-User charging history<br>-User profile information<br>-Intended quality of service<br>-Available quality of service<br>-Allocated quality of service<br>-Actual quality of service<br>-Application and service signaling information |

FIG. 17

SYSTEMS, DEVICES AND METHODS OF DECOMPOSING SERVICE REQUESTS INTO DOMAIN-SPECIFIC SERVICE REQUESTS

RELATED APPLICATIONS

This application claims the benefit of priority to U.S. Provisional Application No. 61/479,136, titled "Mobile Application Server that Enables Users to Directly Access Telecommunications Operator Services" filed Apr. 26, 2011; U.S. Provisional Application No. 61/537,419, titled "Mobile Application Server that Enables Users to Directly Access Telecommunications Operator Services" filed Sep. 21, 2011; U.S. Provisional Application No. 61/546,818, titled "Mobile Application Server that Enables Users to Directly Access Telecommunications Operator Services" filed Oct. 13, 2011; and U.S. Provisional Application No. 61/617,005, titled "Systems and Methods for Controlling Charging and Policy Management in A Multi-Access Environment" filed Mar. 28, 2012; the entire contents of all of which are hereby incorporated by reference.

This application is also related to U.S. patent application Ser. No. 13/452,670 entitled "Systems, Devices and Methods of Orchestrating Resources and Services Across Multiple Heterogeneous Domains"; U.S. patent application Ser. No. 13/452,696 entitled "Systems, Devices and Methods of Establishing a Closed Feedback Control Loop Across Multiple Domains"; U.S. patent application Ser. No. 13/452,696 entitled "Systems, Devices and Methods of Crowd-sourcing Across Multiple Domains"; U.S. patent application Ser. No. 13/452,717 entitled "Systems, Devices and Methods of Synchronizing Information Across Multiple Heterogeneous Networks"; and U.S. patent application Ser. No. 13/452,727 entitled "Systems, Devices and Methods of Distributing Telecommunications Functionality Across Multiple Heterogeneous Domains", all of which are filed concurrently herewith and incorporated herein by reference for the subject matter disclosed in their respective claims.

BACKGROUND

Wireline and wireless communication technologies have seen dramatic improvements over the past few years. Service providers now offer users a wide array of services, higher usage limits, and attractive subscription plans. Wireless dongles and embedded wireless modem cards allow users to use tablet computers, netbooks and laptops to access wireless Internet protocol (IP) and data services through wireless networks. Internet-enabled smart phones, tablets, televisions, and gaming consoles have become essential personal accessories, connecting users to friends, work, leisure activities and entertainment. Users now have more choices and expect to have access to content, data and communications at any time, in any place. As more users utilize these services, telecommunications networks must expand to meet the increase in user demand, support the array of new services and provide fast, reliable communications.

SUMMARY

The various embodiments include methods of communicating information across multiple heterogeneous networks, which may include receiving an abstract service request in a telecommunications domain that exposes a public interface for communicating with the telecommunications domain, generating domain-specific resource rules based on the received abstract service request, identifying a relevant component in the telecommunications domain for enforcing the generated domain-specific resource rules, and sending the domain-specific resource rules to the identified relevant component. In an embodiment, the method may include receiving the domain-specific resource rules in the identified relevant component, and enforcing the received domain-specific resource rules in the identified relevant component. In a further embodiment, receiving an abstract service request in a telecommunications domain may include receiving at least one of an event-based service request, a session based service creation request, a session based service modification request, a session based service termination request, and a service request containing a policy. In a further embodiment, receiving an abstract service request in a telecommunications domain may include receiving a policy-charging service request, and identifying a relevant component in the telecommunications domain may include identifying at least one of a policy component and a charging component within a telecommunications network. In a further embodiment, receiving an abstract service request in a telecommunications domain may include receiving an implementation agnostic service request that specifies a functional service requirement. In a further embodiment, generating domain-specific resource rules based on the received abstract service request may include generating resource rules for an instance of a domain type selected from a hierarchy of domain types. In a further embodiment, receiving an abstract service request in a telecommunications domain may include receiving an abstract service request in a user equipment domain. In a further embodiment, generating domain-specific resource rules based on the received abstract service request may include generating a domain-specific charging rule. In a further embodiment, receiving an abstract service request in a telecommunications domain may include receiving the abstract service request from a component in the telecommunications domain. In a further embodiment, receiving the abstract service request from a component in the telecommunications domain may include receiving a request generated in response to changing circumstances in the telecommunications domain. In a further embodiment, receiving an abstract service request in a telecommunications domain may include receiving a request sent in response to a service request being received by a continuum orchestrator. In a further embodiment, generating domain-specific resource rules based on the received abstract service request may include generating domain-specific resource rules based on domain capabilities identified in the received abstract service request. In a further embodiment, the method may include identifying existing resource rules in the telecommunications domain, in which generating domain-specific resource rules based on the received abstract service request may include generating the domain-specific resource rules such that they are consistent with the identified resource rules.

Further embodiments may include a computing device having a processor configured with processor-executable instructions to perform various operations corresponding to the methods discussed above.

Further embodiments may include a computing device that may include various means for performing functions corresponding to the method operations discussed above.

Further embodiments may include a non-transitory processor-readable storage medium having stored thereon processor-executable instructions configured to cause a processor to perform various operations corresponding to the method operations discussed above.

Further embodiments may include a system having a computing device that may include a transceiver, a memory, and a device processor coupled to the memory and transceiver, and a communications server having a server transceiver, a server memory and a server processor coupled to the server memory, in which the server processor and/or the device processor are configured with processor executable instructions to perform various operations corresponding to the methods discussed above.

BRIEF DESCRIPTION OF THE DRAWINGS

The accompanying drawings, which are incorporated herein and constitute part of this specification, illustrate exemplary aspects of the invention, and, together with the general description given above and the detailed description given below, serve to explain features of the invention.

FIGS. 8A and 8B are tables that list continuum service policies, along with the decomposed resource rules, that may be applied in a user equipment domain and a mobile packet core domain in accordance with various embodiments.

FIG. 12A is a table illustrating an initial partial state of three domains within an example continuum.

FIG. 12B is a table illustrating a stable state of the domains after a feedback control loop has finished iterating.

FIG. 12C is a table illustrating an initial state of the domains after the network conditions in the continuum have changed due to the user requesting a higher quality of video from the video on demand service.

FIG. 12D is another table illustrating the stable state of the domains after the feedback control loop has finished iterating.

FIG. 17 is a table illustrating example domains and the types of contextual information that may be collected from the domains in various embodiments.

DETAILED DESCRIPTION

Figure 1:
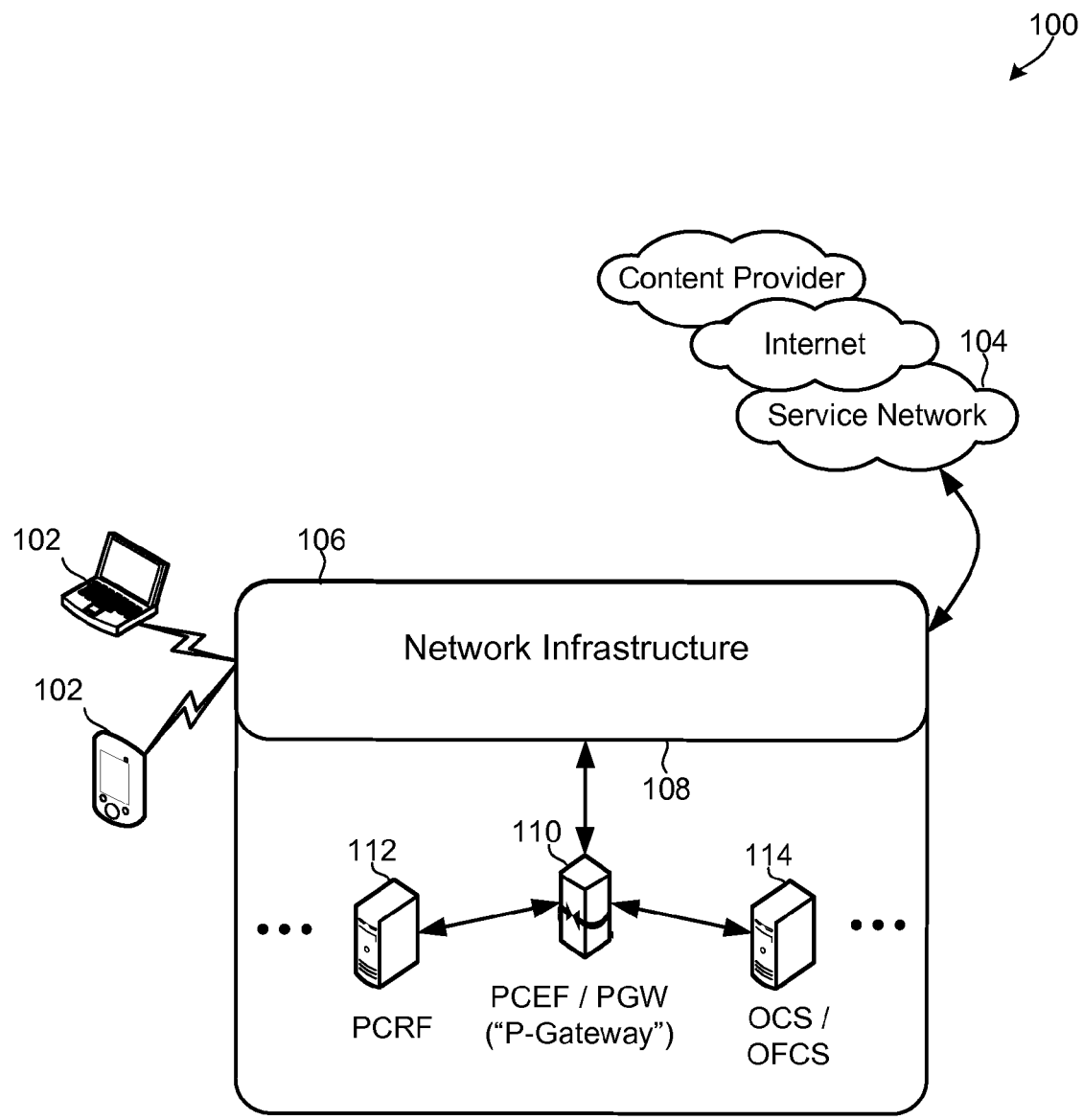
FIG. 1 is a system block diagram illustrating a telecommunications system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile device," "wireless device" and "user equipment" (UE) may be used interchangeably and refer to any one of various cellular telephones, smart-phones (e.g., iPhone®), personal data assistants (PDA's), palm-top computers, tablet computers (e.g., iPad®), laptop computers, wireless electronic mail receivers (e.g., Blackberry®), VoIP phones, wire-line devices, devices implementing Machine-to-Machine (M2M) technologies, multimedia/Internet enabled cellular telephones, IP enabled televisions, IP enabled entertainment systems, and similar electronic devices that include a processor and are capable of sending and receiving wireless or wireline communication signals.

A number of different wireline and wireless communication services and standards are available or contemplated in the future, all of which may implement and benefit from the various embodiments. Such services and standards include, e.g., third generation partnership project (3GPP), long term evolution (LTE) systems, third generation wireless mobile communication technology (3 G), fourth generation wireless mobile communication technology (4 G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iden). References to terminology and/or technical details related to an individual standard or technology are for illustrative purposes only, and are not intended to limit the scope of the claims to a particular communication system or technology unless specifically recited in the claim language.

In recent years, telecommunications service providers have begun offering many new services and user equipment (e.g., cellular phones, smartphones, tablets, laptop computers, etc.) has become faster and more feature-rich than ever. For example, modern smartphones have impressive processing capabilities, high speed communication circuitry (e.g., radios, modems, etc.), and are capable of executing powerful network-intensive applications, which may include productivity applications (e.g., calendars, video conferencing, etc.), photo and video applications (YouTube®, Netflix®, etc.), social media applications (e.g., Facebook®, etc.), and other similar applications that generate and/or consume large amounts of information over telecommunications and/or IP networks.

To meet user demands for these new applications and services, and to manage the increase in network traffic resulting from the popularity of these services, traditional telephony systems are expanding and converging with IP/data systems. As these networks expand and grow in complexity, it is becoming more common for a single service or communication to require participation from multiple heterogeneous networks. For example, a service may be produced in a first network and transported through (and modified in) multiple heterogeneous networks for consumption in a yet another network. Each of these participating networks may perform specialized operations on the service/communication, and operations performed by each participating network may impact the operations of the other participating networks.

To ensure efficient and reliable delivery of services, a certain degree of coordination and communication is required between the resources and services of the participating networks. However, using existing solutions, networks are often not fully informed of the operations and/or capabilities of the other networks or components participating in the service delivery. The various embodiments overcome these and other limitations by providing complete and holistic network solutions that enable reliable, efficient and profitable end-to-end delivery of services across multiple heterogeneous networks participating in the delivery of a service.

The various embodiments include methods, devices and systems for orchestrating services across multiple heterogeneous telecommunications domains, which may include coordinating resources and services across multiple autonomous and semi-autonomous telecommunications systems.

Various embodiments may identify two or more networks participating in a service delivery associated with a service request, decompose the service request into multiple single-domain service requests, and send the single-domain service requests directly to their respective networks for processing.

Various embodiments may decompose abstract service requests into concrete service requests specific to a particular domain, and send the concrete domain-specific service requests directly to their respective components and/or networks for processing.

Various embodiments may measure system and service statistics (e.g., received quality of service, etc.) on a first participating network, and modify variables (e.g., the applied quality of service, etc.) in a second participating network based on the measurements. In an embodiment, a closed circuit feedback control loop may be established between two or more participating networks. The closed circuit feedback control loop may be used to collect information/statistics regarding system, component and network performance from components/networks and continuously or periodically adjust variables to ensure the continued, efficient and profitable delivery of services to consumers.

Various embodiments may collect, combine, and/or generate information relating to multiple heterogeneous networks, and intelligently modify characteristics or services on one or more networks participating in the service delivery.

Various embodiments may synchronize services, information and/or communications between two or more heterogeneous networks participating in the service delivery.

Various embodiments may distribute functionality (e.g., charging functionality) associated with a specific network across one or more heterogeneous networks participating in the service delivery.

The various embodiments may be implemented within a variety of communication systems, an example of which is illustrated in FIG. 1. A typical communication system 100 includes user equipment 102 configured to send and receive voice, data, and control signals to and from a service network 104 (and ultimately the Internet and/or a content provider) via a communications network 106. In the example illustrated in FIG. 1, the communications network 106 includes a network infrastructure 108 unit that encapsulates various network components/systems implementing any of a variety of communication technologies/protocols to process and route the voice, data and control signals to and from the user equipment 102. The network infrastructure 108 unit may include, for example, components for implementing a cellular telephone network, a radio access network (e.g., UTRAN, RAN, etc.), WiFi network, WiMAX network, and/or other well known communication technologies (e.g., GPRS, UMTS, LTE, cdmaOne, CDMA2000™). Since these structures are well known, certain details have been omitted in order to focus the descriptions on the most relevant features.

The network infrastructure 108 may also include connections to a policy control enforcement function (PCEF) component 110, which may be responsible for enforcing policy rules to control the bandwidth, the quality of service (QoS), and other characteristics of the communications between the service network 104 and the user equipment 102. The enforcement of policies may also include querying, coordinating, removing, revoking and/or adjusting various resources (e.g., network resources, subscriber resources, etc.) based on the policy rules. The PCEF 110 may also be configured to send signaling information (e.g., control plane information relating to communication setup, security, authentication, charging, enforcement of policy rules, etc.) to a policy control rules function (PCRF) component 112, online/offline charging systems (OCS/OFCS) 114, and other similar components that participate in, collect information from, or otherwise contribute to, communications between the service network 104 and the user equipment 102.

Often, the delivery of a single service (e.g., a communication session) may require participation from multiple heterogeneous networks, and a certain degree of coordination is required between the participating networks to ensure efficient and reliable delivery of services. To achieve this, various embodiments may group the devices, components, systems, networks, and/or resources (herein collectively "resources") between providers and consumers of a service into a set of logical domains, thereby partitioning and encapsulating the network functionality into logical units that more readily support coordination and cooperation among the various resources.

Figure 2:
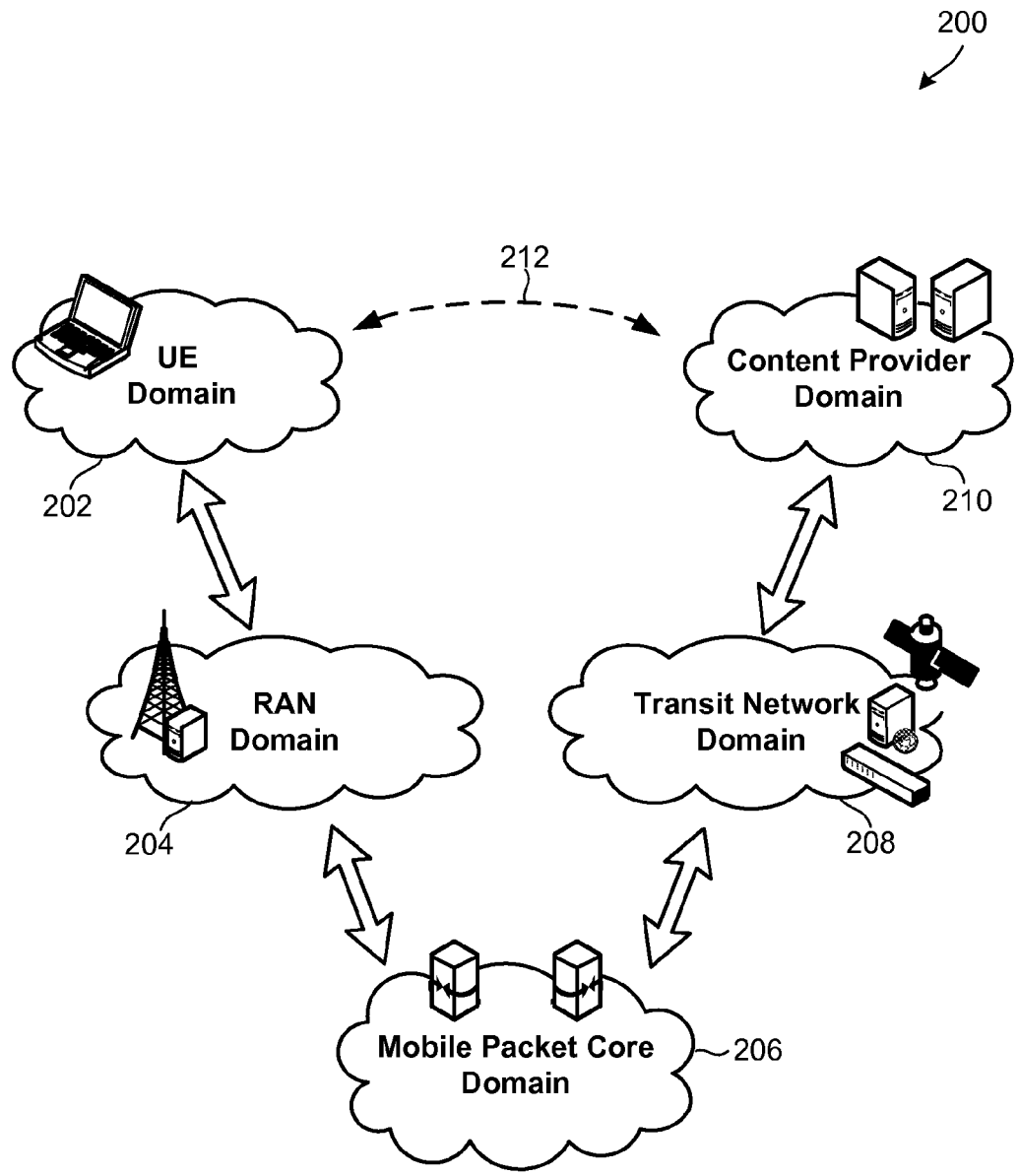
FIG. 2 is a system block diagram illustrating an example communications system in which the resources, devices, components, systems, and networks that exist between consumers and providers of services are grouped into logical domains in accordance with the various embodiments.

FIG. 2 illustrates an example communications system 200 in which all the resources (e.g., devices, components, systems, networks, etc.) that exist between the consumers (e.g., wireless device users) and providers of services (e.g., content providers) are grouped into logical domains in accordance with the various embodiments. The resources may be grouped such that each domain includes resources that are typically under the control of a single logical entity and/or such that each domain is responsible for a particular type or category of functionality provided by the telecommunications network. The domains may be antonymous, semi-antonymous, heterogeneous and/or homogeneous domains.

In the example illustrated in FIG. 2, the resources are grouped into five domains, namely a user equipment domain 202, a radio access network domain 204, a mobile packet core domain 206, a transit network domain 208, and a content provider domain 210. In an embodiment, the domains may be defined more granularly to further separate distinct functionality. For example, the content provider domain may be defined to include a content delivery network domain and/or a cloud computing application server domain. In a further embodiment, domains may be classified into a hierarchical tree structure in which each domain type inherits properties from its parents. For example, the user equipment domain may be further classified to be either a mobile device domain or a home entertainment domain.

Communications 212 between the consumer and provider may travel through and/or may be processed by each of the logical domains 202-210. Each domain 202-210 may include components for performing a specialized group of operations for the communication 212. For example, the content provider domain 210 may include resources (e.g., web servers, content servers, etc.) responsible for producing content (e.g., webpages, videos, etc.) for consumption on the user equipment (e.g., mobile phones, etc.). The transit network domain 208 may include resources (e.g., IP routers, access networks, hubs, etc.) for communicating the information across the network (e.g., over the Internet protocol, etc.). The mobile packet core domain 206 may include resources responsible for the policy and charging control (PCC) aspects of the core mobile network. Resources responsible PCC aspects may include a policy and charging enforcement function (PCEF) component, a policy and charging rules function (PCRF) component, an off-line charging system (OFCS) component, an on-line charging system (OCS) component, a subscriber profile repository (SPR) component, an application function (AF) component, a congestion manager component, a media optimization engine component, an application level routing component (e.g., a Diameter Routing Agent, a dynamic context router, etc.), and/or other similar components. In an embodiment, these components may be contained within other domains. In an alternative embodiment, these components may be realized as independent domains.

The radio access network domain 204 may include resources that provide a connection between the user equipment and the network, such as base transceiver stations (BTS), NodeBs, eNodeBs, home eNodeBs, cells, femtocells, microcells, picocells, base station controllers (BSC), packet control units (PCU), packet data serving nodes (PDSN), radio network controllers (RNC), serving gateways (SGW), packet data network gateway (PGW), components responsible for the policy and charging control aspects on a radio access network (RAN), and other similar components. The user equipment domain 202 may include user equipment (e.g., smart-phone, laptop, etc.), their associated modules/functional units (e.g., location identification unit, power management module, etc.), and resources responsible for managing the user equipment.

As discussed above, the resources between the consumers and providers of services may be grouped into various logical domains. In the various embodiments, these domains may include any combination of machine-to-machine domains, user equipment domains, radio access network domains, mobile packet core domains, fixed line domains, residential gateway domains, cable domains, transit network domains, advertisement provider domains, virtual private network (VPN) domains, storage domains, content provider domains, content delivery network domains, cloud computing domains, and other similar domains. The resources grouped into domains may include power management systems, admission control systems, policy management systems, charging systems, policy and charging enforcement systems, user repositories, offloading management systems, and other similar components.

As discussed above, various embodiments may partition and encapsulate network functionality into logical units by grouping the resources into a distinct set of logical domains. These groupings may be performed such that the combination of all the logical domains account for the entire end-to-end telecommunications network for a service or a group of services. The end-to-end telecommunications network may form a "continuum," that includes any telecommunications devices, components, systems, networks, and resources that together enable the services to be produced and consumed on the telecommunications system, grouped into one or more logical domains.

Figure 3:
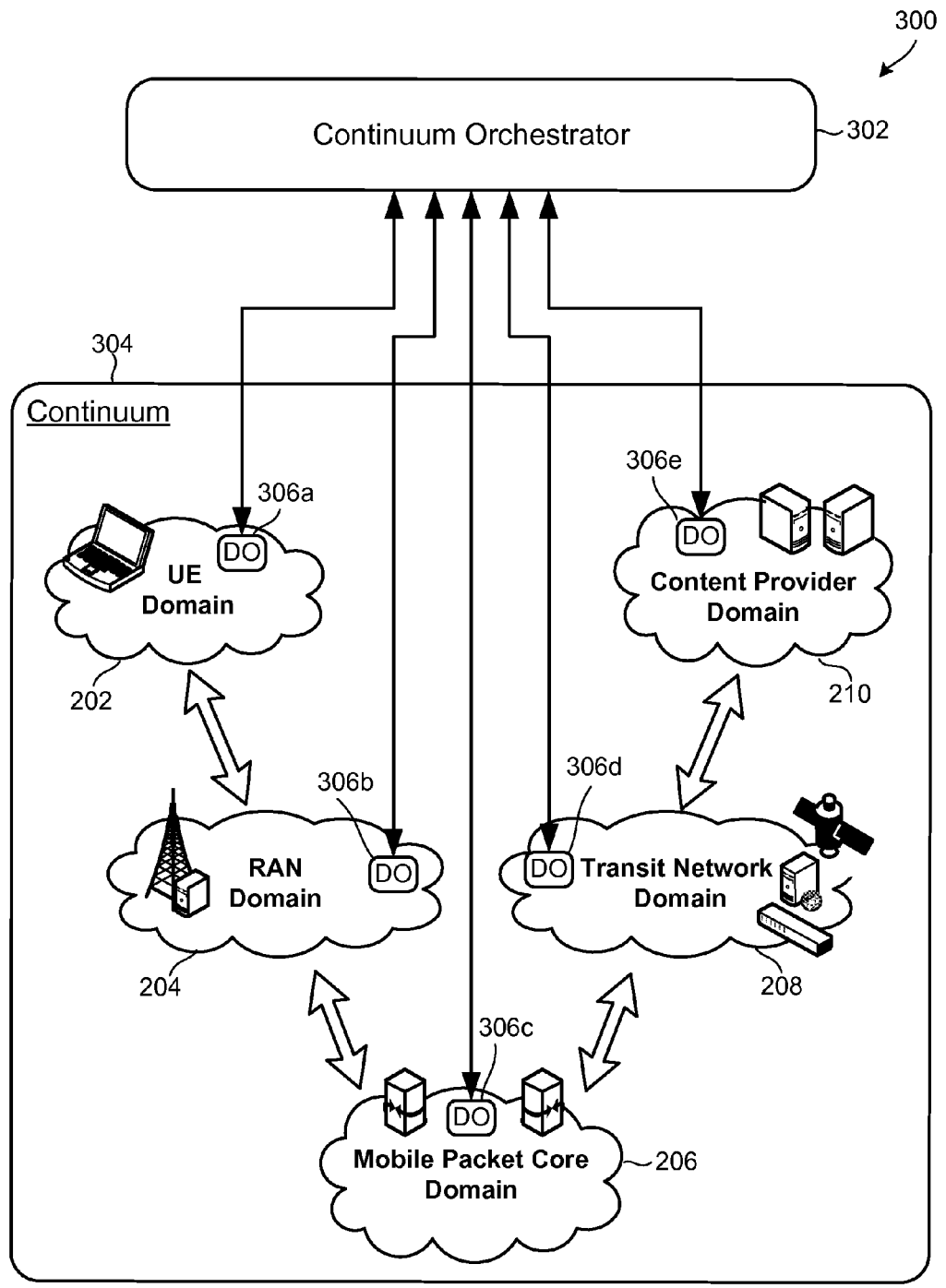
FIG. 3 is a network block diagram illustrating an example communications network having a continuum orchestrator configured to coordinate operations within the network in accordance with the various embodiments.

FIG. 3 illustrates an example communications system 300 having a continuum orchestrator 302 for coordinating the operations within a continuum 304 in accordance with the various embodiments. The continuum 304 may include the resources (e.g., devices, components, systems, networks, etc.) in the end-to-end telecommunications network associated with a service (or category of services), grouped into domains. The groupings may be performed such that each domain is responsible for a particular function or part of the telecommunications network. In the example illustrated in FIG. 3, the resources are grouped into a user equipment domain 202, a radio access network domain 204, a mobile packet core domain 206, a transit network domain 208, and a content provider domain 210. The continuum 304 may include multiple instances of each domain, and each domain may include multiple instances of the same components. For example, in various embodiments, the continuum 304 may include multiple instances of the user equipment domain 202 and/or each user equipment domain 202 may include one or more user equipment devices.

Each domain (e.g., domains 202, 204, 206, 208, 210) may include a domain orchestrator 306a-e component, interface and/or software module configured for sending and receiving information to and from a continuum orchestrator 302. The continuum orchestrator 302 may be any logical entity that coordinates services and communications between domains to ensure that services are delivered in an efficient manner. The continuum orchestrator 302 may be implemented as a stand-alone service or as part of another component. In various embodiments, the continuum orchestrator 302 may be part of a domain within the continuum 304, may be outside of the domains and within the continuum 304, and/or outside of the continuum 304. The continuum 304 may include (or may be associated with) more than one continuum orchestrator 302. In systems having more than one continuum orchestrator 302, each continuum orchestrator 302 may be responsible for managing a category, type, or group of services for the continuum 304. In various embodiments, the continuum orchestrator 302 may be a "mobile application server," a "customer interaction gateway," and/or a "subscriber engagement engine." The continuum orchestrator 302 may also be a component of, or included in, a mobile application server, a customer interaction gateway, and/or a subscriber engagement engine.

The continuum orchestrator 302 may be configured to orchestrate services across multiple heterogeneous telecommunications domains and/or coordinate resources and services across multiple autonomous and semi-autonomous telecommunications domains in the continuum 304. In an embodiment, the continuum orchestrator 302 may be configured to identify domains capable of (or required for) fulfilling a service request and communicate the service request to the identified domains.

As mentioned above, the continuum orchestrator 302 may be configured to send and receive service requests to and from one or more of the logical domains 202-210. A service request may be any message that contains information relating to a particular service or group of services. A service request may include service policies that describe one or more behaviors of the continuum 304, the domains 202-210, and/or services. A service request may be implementation agnostic, which may be accomplished, for example, by specifying a service in terms of its functional requirements rather than in terms of its realization. In various embodiments, service requests may be service creation requests, service modification requests, or service termination requests. For example, a service request may be a service creation request that commands the creation of services that relate to a single once-off event (e.g., sending a single text message) or an ongoing session-based event (e.g., starting a voice call).

As mentioned above, the continuum orchestrator 302 may be configured to identify domains capable of (or required for) fulfilling a service request. In various embodiments, the continuum orchestrator 302 may identify the domains required to fulfill a service request, decompose the service request into one or more single-domain service requests specific to the identified domains, and send each domain specific service request to a domain orchestrator (e.g., domain orchestrators 306a-e) in the identified domain. The domain orchestrators 306a-e may be configured to receive and decompose single-domain service requests into resource rules, and send the resource rules to the relevant components within the domain for enforcement.

The resource rules may contain detailed information prescribing a behavior of a component within a domain. The resource rules may also be a message sent from a component (e.g., a domain orchestrator component) within a domain to another component within the same domain. The resource rules may also include information for reporting the current usage and status of resources controlled by a component within a domain. The resource rules may be specific to the components that are sending and/or receiving the rules within the domain, and the system may be configured such that the resource rules generated in (or generated for) a domain do not need to be interoperable with components outside of the domain.

As discussed above, the domain orchestrators 306a-e may be configured to decompose service requests into resource rules that are to be enforced by one or more components in the domain. The enforcement of rules may include performing operations to control the bandwidth, quality of service (QoS), and other the characteristics of the data and services being communicated.

In an embodiment, one or more domain orchestrators 306a-e may be configured to recursively decompose a single-domain service request into multiple single-domain service requests. In a further embodiment, one or more domain orchestrators 306a-e may be configured to decompose implementation agnostic service requests into implementation specific service requests and resource rules.

In an embodiment, one or more domain orchestrators (e.g., domain orchestrator 306a) may be configured to collect, publish, and/or subsequently transfer domain related information (i.e., information that is produced within the domains) to the continuum orchestrator 302 and to one or more other domain orchestrators (e.g., domain orchestrators 306b-e) within the continuum 304, enabling the information to be produced at the most efficient point (i.e., component, software module, network, etc.) within the continuum 304.

In an embodiment, one or more domain orchestrators (e.g., domain orchestrator 306a) may include a synchronization mechanism for synchronizing information with the continuum orchestrator 302 and/or other domain orchestrators (e.g., domain orchestrator 306b-e) in the continuum 304. For example, a domain orchestrator 306a that publishes information may use the synchronization mechanism to synchronize information with the continuum orchestrator 302 (and other domain orchestrators 306b-e consuming the information) to ensure that the most current information is always available to the other network components and reduce the amount of network traffic involved in transferring information across the domains.

As discussed above, one or more domain orchestrators 306a-e may be configured to exchange information with the continuum orchestrator 302. Information exchanged between the domain orchestrators 306a-e and the continuum orchestrator 302 may include any information that facilitates the operation of the continuum 304, such as information relating to resource management within a domain, charging for services involving multiple domains, and the decomposition of service requests.

In an embodiment, the system may be configured to monitor service usage in one or more domains to determine if the actual quality of service (QoS) received in those domains is above or below the intended quality of service. If the actual quality of service is less than the intended quality of service in a monitored domain (e.g., mobile packet core domain 206), the continuum orchestrator 302 may request that another domain (e.g., content provider domain 210) increase the allocated quality of service to improve the actual quality of service received in the monitored domain (e.g., mobile packet core domain 206). The system may then reevaluate the actual quality of service in the monitored domain (e.g., mobile packet core domain 206) to ensure that it is increased to the intended level. In an embodiment, the continuum orchestrator 302 may form a feedback control loop with one or more of the domain orchestrators 306a-e in which the monitoring and adjustment operations are repeated until the measured level of service is approximately equal to the intended level of service. In an embodiment, the usage monitoring in a domain may be used to determine the quality of experience (QoE).

In an embodiment, the continuum orchestrator 302 may be configured to transfer functionality traditionally associated with one domain (e.g., user equipment domain 202) to another domain (e.g., mobile packet core domain 206). The functionality may be transferred on a dynamic case-by-case basis or based on a static system-wide policy. In an embodiment, the system may be configured to perform load balancing operations by dynamically transferring functionality between domains 202-210.

In an embodiment, the continuum orchestrator 302 may be configured to perform crowd sourcing operations. In an embodiment, the continuum orchestrator 302 may be configured to gather contextual information from one or more domains 202-210 in the continuum 304. In an embodiment, the continuum orchestrator 302 may combine and process contextual information gathered from a plurality of domains (e.g., user equipment domain 202, mobile packet core domain 206 and content provider domain 210) to better manage the operations of one or more domains (e.g., mobile packet core domain 206) in the continuum 304. In an embodiment, the continuum orchestrator 302 may augment service requests that are sent to one or more domain orchestrators (e.g., domain orchestrator 306c) with the contextual information gathered from multiple domains (e.g., user equipment domain 202 and content provider domain 210).

In an embodiment, components within a domain may invoke the services offered by the continuum orchestrator 302. In an embodiment, components may be configured to invoke the services offered by the continuum orchestrator in response to changing circumstances in their domain. In an embodiment, the system may be configured such that components external to the telecommunications networks may invoke the services offered by the continuum orchestrator 302.

Figure 4:
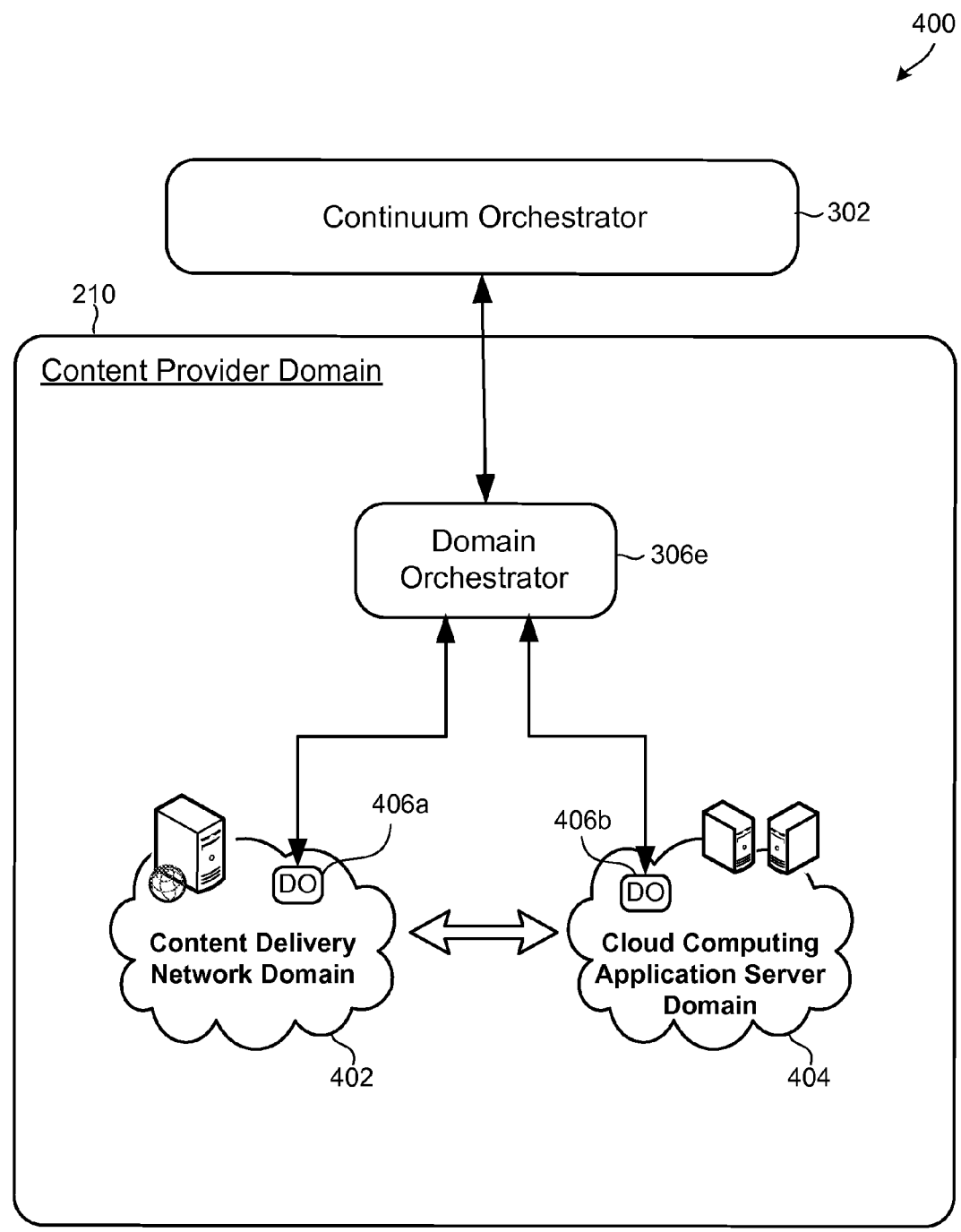
FIG. 4 is a network diagram illustrating logical components and information flows in an example communication system that includes a domain that may be decomposed into additional domains in accordance with an embodiment.

FIG. 4 illustrates logical components and information flows in an example communication system 400 that includes a domain that may be decomposed into additional domains in accordance with an embodiment. Specifically, FIG. 4 illustrates a content provider domain 210 that may be decomposed into a content delivery network domain 402 and a cloud computing application server domain 404. The sub-domains 402, 404 may be decomposed into resources that implement one or more domain functions, or may be decomposed into additional domains. In an embodiment, the sub-domains 402, 404 may be recursively decomposed into sub-domains until it is determined that all of the decomposed components implement one or more of the domain's functions.

The communication system 400 may also include a continuum orchestrator 302 configured to coordinate services and communications between the content provider domain 210 and other domains in the continuum. The content provider domain 210 may include a domain orchestrator 306e that exposes a public interface on behalf of the domain. Likewise, each of the sub-domains 402, 404 may include a domain orchestrator 406a, 406b that exposes a public interface on behalf of its respective sub-domain 402, 404. In an embodiment, the public interfaces of the domains and/or sub-domains may be "consumed" by the continuum orchestrator 302 in order to send and receive information (e.g., service requests) to and from the domains 210, 402, 404. In an alternative embodiment, the domain orchestrator 306e may assume the role of a continuum orchestrator 302 (e.g., with respect to domain orchestrators 406a, 406b) and interact directly with other domain orchestrators (not illustrated in FIG. 4) in the continuum. In a further embodiment, the domain orchestrator 306e may be included, or implemented as part of, a component within the domain (e.g., a content server, an authentication server, etc.).

In an embodiment, the domain orchestrator 306e may decompose received service requests into requests specific to the sub domains 402, 404. In an embodiment, two or more orchestrators 302, 306e, 406a, 406b may be configured to use a common ontology and semantics to describe the service requests, as well as a common syntax and protocol for exchanging these service requests (e.g., XML or JSON over HTTP in a RESTful manner, Diameter, etc.).

Figure 5:
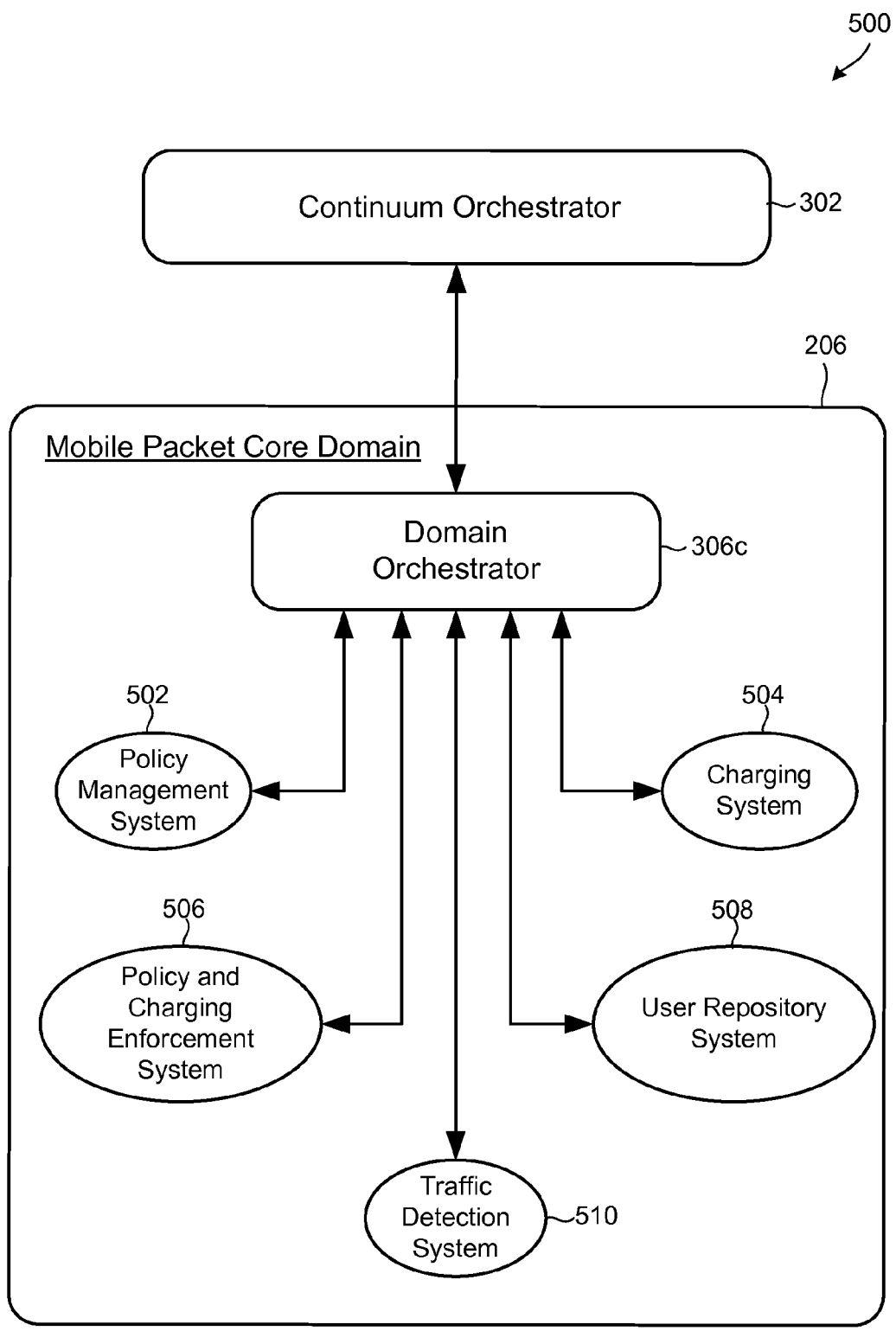
FIG. 5 is a system block diagram illustrating logical components and information flows in an example mobile packet core domain that may be used with various embodiments.

FIG. 5 illustrates logical components and information flows in an example communication system 500 that includes a domain that may be decomposed into functional resources in accordance with an embodiment. Specifically, FIG. 5 illustrates a mobile packet core domain 206 that may be decomposed into domain specific components that implement the domain's functionality, such as the illustrated domain orchestrator 306c, policy management system component 502, charging system component 504, policy and charging enforcement system component 506, user repository system component 508, and traffic detection system component 510.

The policy management system component 502 may be configured to store and manage policies that are to be enforced for some or all users within the domain or continuum. The policy management system component 502 may expose one or more interfaces that enable the other components within the domain to request policy related information, and configure or add new policies. These policies may include policies relating to allowing, blocking, restricting, prioritizing, and filtering network traffic based upon criteria such as the source, the destination, or the type of the network traffic. In an embodiment, the policy management system component 502 may be a Policy Decision Point (PDP), which is a known component of telecommunications networks. In an embodiment, the policy management system component 502 may be a Policy and Charging Rules Function (PCRF) in a 3GPP network.

The charging system component 504 may be configured to store and manage charging information, such as rating information (i.e., information used to calculate how much the user is charged for service consumption) and balance management information relating to users. The charging system component 504 may expose one or more interfaces that enable the other components within the domain to access charging related information, and configure or add new charging details. In the preferred embodiment of a 3GPP network, the charging system component 504 may be an Online Charging System (OCS) or an Offline Charging System (OFSC).

The policy and charging enforcement system component 506 may be configured to enforce the policy and charging rules sent to the system by the domain orchestrator component 306c, the policy management system component 502, the charging system component 504, or any other components within the mobile packet core domain 206. The policy and charging enforcement system component 506 may also be responsible for metering and generating charging records (e.g., Charge Detail Records or "CDRs") containing information about service and resource usage. In the preferred embodiment of a 3GPP network, the policy and charging enforcement system component 506 may be a Policy and Charging Enforcement Point (PCEF).

The user repository system component 508 may be configured to store and manage information relating to the users of the user equipments. Some of this information may be permanently managed by the user repository system component 508, such as user specific preferences. Additionally, user repository system component 508 may be configured to retrieve information from other components within the telecommunications operator's network and operational support systems/business support systems (OSS/BSS) environment (not shown). Examples of user repositories in the preferred embodiment of a 3GPP network may include a subscriber profile repository (SPR), a home subscriber server (HSS), and a user data repository (UDR). In various embodiments, the user repository system component 508 may be a "user manager."

The traffic detection system component 510 may be configured to perform traffic analysis (e.g., deep packet inspection or "DPI") on data traversing the mobile packet core domain 206. The traffic detection system component 510 may additionally receive data from the policy and charging enforcement system component 506, and/or interact with the policy management system component 502 and the charging system component 504 to apply service and application related policies to passing traffic, and to charge for these services and applications. The traffic detection system component 510 may also generate usage statistics and report them to the domain orchestrator 306c. In the preferred embodiment of a 3GPP network, the traffic detection system component 510 may be a Traffic Detection Function (TDF).

As mentioned above, the mobile packet core domain 210 may include a domain orchestrator 306c that exposes a public interface for sending and receiving information to and from the continuum orchestrator 302. The domain orchestrator 306c may function as a gateway into the mobile packet core domain 206 for accessing user information, policies, charging rules, balances, plan information, spending information, and call details, along with the users' historical service and application usage. The domain orchestrator 306c may optionally be located behind a firewall and/or a network address translation (NAT) device.

In an embodiment, the domain orchestrator 306c may expose one or more internal interfaces used to communicate with the other components within the domain. In an embodiment, the domain components (e.g., components 502-510) may be configured to communicate directly with each other using interfaces (not shown) that are internal to the domain.

In an embodiment, the domain orchestrator 306c may be configured to perform management operations, such as filtering information going to and from components within the domain (e.g., components 502-510). Similarly, the domain orchestrator 306c may cache information from components within the domain to avoid overloading these components with multiple duplicate requests.

Figure 6:
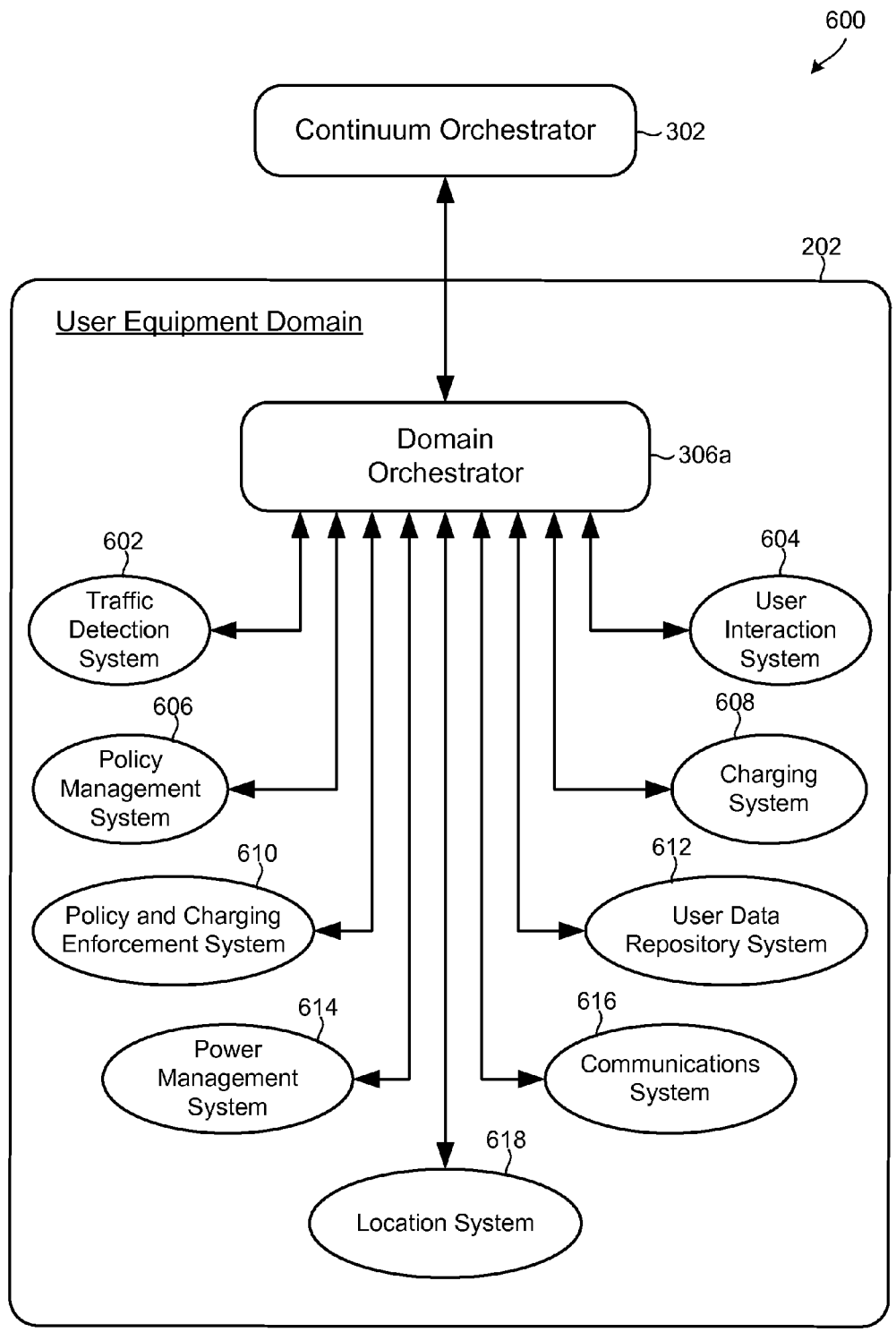
FIG. 6 is a system block diagram illustrating logical components and information flows in an example user equipment domain that may be used with various embodiments.

FIG. 6 illustrates logical components and information flows in a communication system 600 that includes an example user equipment domain 202. The user equipment domain 202 may include user equipment (e.g., cell phones, laptop computers, tablet computers, cellular-equipped cameras, etc.), components connected to the user equipment (e.g., sensors, wireless modems, GPS receivers, etc.), and other components that provide functionality associated with the user equipment. Functionality associated with the user equipment may include informing the user of events, enforcing policy or charging within the user equipment, performing traffic analysis, and exchanging user-specific information (e.g., balance information, loyalty information, user policies, user profile information, etc.) with the continuum orchestrator 302. The user equipment domain 202 and/or its associated components may be implemented as hardware components (e.g., microprocessors, embedded circuitry, wireless modems with embedded processors, etc.) configured with one or more software components (e.g., applications, processes, services, daemons, etc.), and combinations of hardware components and software components.

In the example illustrated in FIG. 6, the user equipment domain 202 may be decomposed into the domain specific components configured to implement one or more aspects of the domain's functionality (as opposed to being decomposed into additional domains). Such domain specific components may include a domain orchestrator 306a, a traffic detection system component 602, a user interaction system component 604, a policy management system component 606, a charging system component 608, a policy and charging enforcement system component 610, a user data repository component 612, a power management system component 614, a communication system component 616, and a location system component 618.

The domain orchestrator 306a may be configured to function as a gateway into the user equipment domain 202 for accessing both user information (e.g., policies, charging rules, etc.) and device information (e.g., location information, power information, etc.). In an embodiment, the domain orchestrator 306a may be a user equipment interaction agent (UEIA).

The traffic detection system component 602 may be configured to perform traffic analysis on data originating and terminating in the user equipment domain 202. The traffic detection system component 602 may be functionally similar to a mobile packet core traffic detection system (e.g., the traffic detection system component 510 in the mobile packet core domain 206 illustrated in FIG. 5). Due to its location in the user equipment domain 202, the traffic detection system component 602 may also provide user equipment functionality (e.g., additional traffic detection methods) in addition to that provided by mobile packet core traffic detection system (e.g., deep packet inspection). For example, the traffic detection system component 602 may directly access the user equipment's operating system's network stack, and may operate as a local proxy server. In an embodiment, the traffic detection system component 602 may be a user equipment traffic detection function (UETDF).

The user interaction system component 604 may be configured to manage interactions between the user and the user equipment domain 202, and hence the entire continuum. These interactions may occur visually (e.g., via user equipment's graphical user interface, camera, notification indicators, etc.), acoustically (e.g., via the user equipment's speaker, microphone, etc.), and/or tactilely (e.g., via the user equipment's touch screen, buttons, vibration capabilities, motion detectors, etc.). These interactions may also occur via software components, such as applications on the user equipment. For example, the user interaction system component 604 may add a reminder to the calendar application to remind the user to pay the bill associated with the user equipment by the bill due date. In an embodiment, the user interaction system component 604 may be a user equipment application (UE-APP).

The policy management system component 606 may be configured to store and manage the policies that are to be enforced for the user within the user equipment domain 202. These policies may relate to any aspect of the user equipment, including charging rules, service rules, device capability rules, application specific rules, etc. The policies may be compulsory (e.g., when the user cannot change or override them) or self-imposed (e.g., when the user has set them). In an embodiment, the policy management system component 606 may be a user equipment policy manager (UEPM).

The charging system component 608 may be configured to manage all aspects of charging, rating, and balance management for the user of the user equipment. The charging system component 608 may be configured to make predictions regarding the future consumption of services based upon past trends. In an embodiment, the charging system component 608 may be a user equipment charging, rating and balance manager (UECRBM).

The policy and charging enforcement system component 610 may be configured to enforce policy and charging rules, which may be received from the domain orchestrator component 306a, the policy management system component 606, the charging system component 608, or any other component in the user equipment domain 202. The policy and charging enforcement system component 610 may also be configured to perform operations for metering and generating charging records (e.g., Charge Detail Records or "CDRs") containing information about service and resource usage. In an embodiment, the policy and charging enforcement system component 610 may also provide functionality similar to that provided by a mobile packet core PCEF (e.g., the policy and charging enforcement system component 506 illustrated in FIG. 5). In an embodiment, the policy and charging enforcement system component 610 may be a user equipment enforcement function (UEEF).

The user data repository component 612 may be configured to store and manage information relating to the user equipment and its user (e.g., customer IDs, preferences, etc.).

The power management system component 614 may be configured to modify the user equipment's resources to satisfy policies and resource rules relating to power consumption and conservation. For example, resource rules designed to reduce the user equipment's power consumption may turn-off the user equipment's display after a short period of inactivity, or prevent background applications from maintaining radio network connections.

The communication system component 616 may be configured to manage all of the user equipment's external communication capabilities, which may be performed in accordance to the policies of the policy management system component 606 and/or the power management system component 614.

The location system component 618 may be configured to calculate, obtain, and/or provide location information relating to the user equipment, which may be achieved via a single location technology or a combination of multiple location technologies. The location system component 618 may be configured to operate with or without assistance from other external location systems. In an embodiment, the location system component 618 may operate in accordance with the policies of the policy management system component 606 and/or the power management system component 614. In an embodiment, the location system may be a global positioning system (GPS).

In an embodiment, the system 600 may also include a quality detector component (not shown in FIG. 6). The quality detector component may be configured to measure and report the quality of service (QoS) and the quality of experience (QoE) received in the user equipment domain 202. This measurement may be performed on the overall data originating and terminating in the user equipment domain 202, or on data pertaining to specific applications and services consumed on the user equipment. In an embodiment, the quality detector component may have application-level measurement capabilities. For example, the quality detector component may be configured to measure the number of correctly rendered frames per second (or the pixilation/blockiness level) instead of (or in addition to) the number of bytes per second in a video stream.

As discussed above, various embodiments may group the devices, components, systems, networks, and/or resources between providers and consumers of a service into a distinct set of logical domains, and the combination of all the logical domains in the end-to-end telecommunications network may form a continuum. In an embodiment, the continuum may be organized as a recursive hierarchy that enables policy and charging control (PCC) functions to be distributed amongst two or more autonomous domains within the telecommunications network.

Distributing functionality is becoming increasingly important because the management and operation of modern telecommunications networks requires that many domains work together in a consistent and collaborative manner to deliver the overall service to the user. For example, some services (e.g., parental control services) should be consistent regardless of which user equipment and access network are used to access digital content. For other services (e.g., video on demand), the user equipment and the access network may be significant because the video may need to be optimized for the user equipment's screen size and the access network's capabilities.

Service policies may define the overall operation of the continuum, and hence the overall operation of all of the domains within the continuum that are involved in the service delivery. These policies may be expressed either abstractly in terms of the desired continuum behavior (e.g., optimize the network for video conferencing), or concretely in terms of the desired continuum configuration (e.g., configure the network to ensure that the maximum latency does not exceed 500 ms).

In an embodiment, the continuum orchestrator may decompose a service policy into one or more domain specific service policies. The continuum orchestrator may send these domain specific service policies to the associated domains. Each individual domain may have its own set of service policies to implement in order to achieve the overall continuum service policy. In an embodiment, each domain may be configured to implement the domain specific service policies in a manner consistent with existing service policies.

In an embodiment, a domain orchestrator may decompose a service policy that is abstract into one or more domain specific concrete resource rules. Therefore, abstract service policies may be effectively polymorphic. The domain orchestrator may send these domain specific concrete resource rules to the associated components within the domain.

Figure 7A:
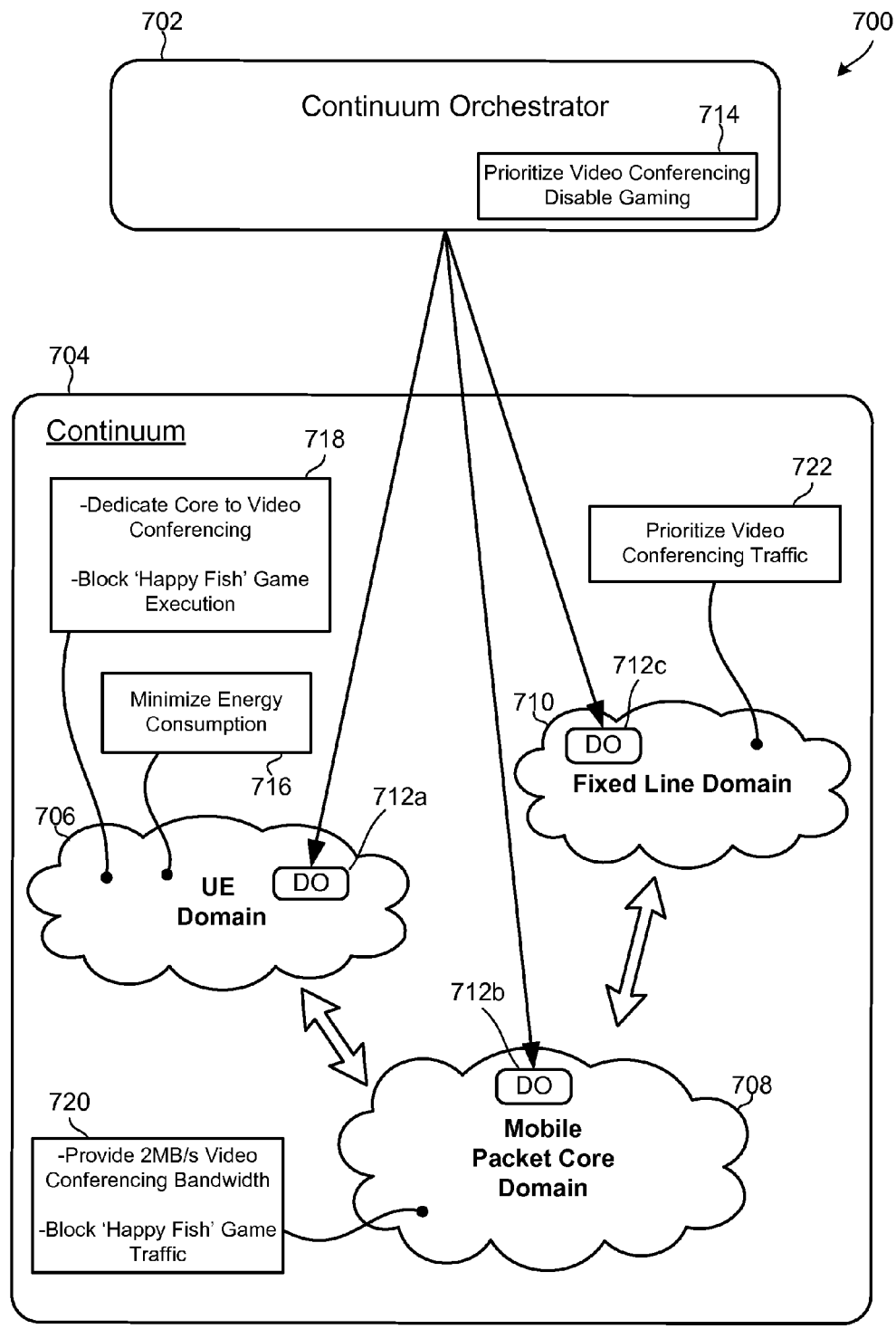
FIG. 7A is a system block diagram illustrating example logical components and information flows in a communication system having a continuum orchestrator configured to delegate service policies in accordance with an embodiment.
Figure 7B:
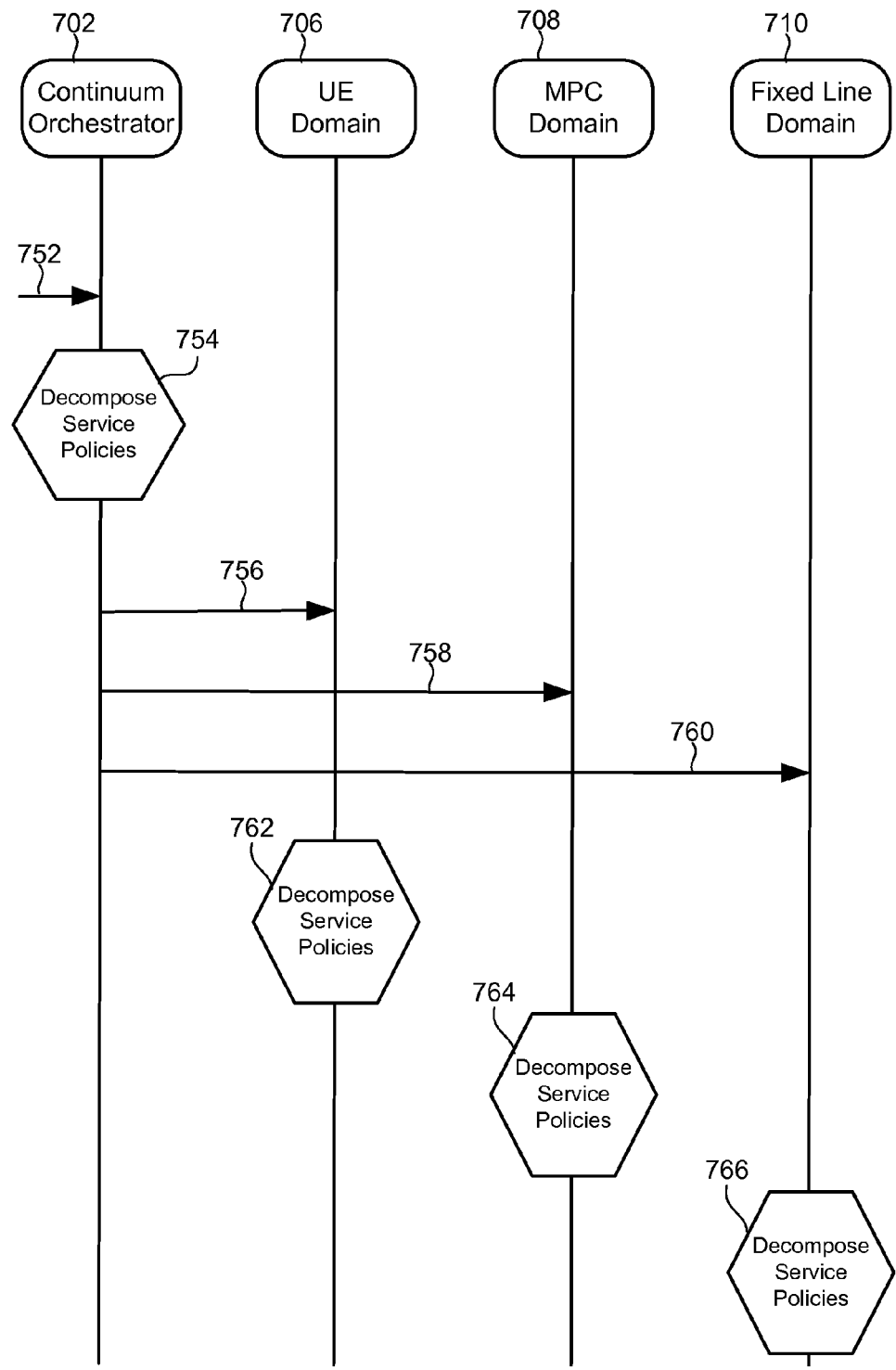
FIG. 7B is a message flow diagram illustrating the orchestration messages sent between a single continuum orchestrator and multiple telecommunications domains within an example telecommunications continuum.

FIGS. 7A and 7B illustrate example logical components and information flows in a communication system 700 having a continuum orchestrator 702 configured to delegate service policies in accordance with an embodiment. Specifically, FIG. 7A illustrates example logical components and interactions in the communications system 700, and FIG. 7B illustrates message flows and sequences in which messages may be exchanged between the logical components in the communications system 700.

For reasons of clarity, FIGS. 7A and 7B are described together with reference to a specific set of example scenarios. However, it should be understood that the various embodiments are not limited to the example scenarios, and this application should not be limited to operations specific to described scenarios unless expressly recited as such in the claims.

FIG. 7A illustrates that the communication system 700 may include a continuum orchestrator 702 and a continuum 704. The continuum 704 may include all the resources (e.g., devices, components, systems, networks, etc.) in the end-to-end telecommunications network associated with a service (or group or category of services), grouped into domains. The resources may be grouped such that each domain is responsible for a particular function or part of the telecommunications network. In the example illustrated in FIGS. 7A and 7B, the resources are grouped into at least a user equipment domain 706, a mobile packet core domain 708, and a fixed line domain 710. It should be understood that the continuum 704 may include additional domains (e.g., radio access network domain, etc.), which have been omitted from FIGS. 7A-B to focus the discussion on the relevant features. Each domain 706, 708, 710 may include a domain orchestrator 712a-c for sending and receiving information to and from a continuum orchestrator 702.

Referring to FIG. 7B, in block 752 the continuum orchestrator 702 may receive a set of service policies 714, which may include two abstract service policies relating to a single user that describe the desired continuum behavior (i.e., "Prioritize video conferencing," and "Disable gaming"). Other possible examples of policies include overall end-to-end bandwidth and aggregated throughput requirements, as well as more fine grained policies such as policies specifying the number of concurrent network applications allowed (across both the user equipment domain 706 and the mobile packet core domain 708), policies specifying the frequency of connections spanning multiple domains, policies to prevent unexpectedly large bills, policies relating to statistics generation, and application specific policies.

In block 754, the continuum orchestrator 702 may decompose the set of service policies 714 into three distinct subsets of service policies, and send one of these subsets to each of the user equipment domain 706 (in block 756), the mobile packet core domain 708 (in block 758), and the fixed line domain 710 (in block 760). Thus, the continuum orchestrator 702 effectively delegates service policies to each of the domains.

A domain orchestrator (e.g., domain orchestrators 712a-c) in each domain may receive the subset of service policies, and further decompose each service policy into one or more domain specific resource rules. For example, in block 762, the domain orchestrator 712a in the user equipment domain 706 may decompose the service policy "Prioritize video conferencing" into the resource rule "Dedicate core to video conferencing" to ensure that one processing core in the user equipment is available for video conferencing when it is required. Similarly, the service policy "Disable gaming" may be decomposed into the resource rule "Block 'Happy Fish' game execution," which when implemented in the user equipment prevents execution of the game.

In an embodiment, the domain orchestrators (e.g., domain orchestrators 712a-c) may generate resource rules based on a number of factors, such as the capabilities, roles and/or availability of various domain resources. For example, the domain orchestrator 712a may be configured to determine the number of processing cores available on the user equipment and/or generate rules that dedicate processing cores to various tasks based on the determined availability of cores. In the example discussed above, it may be assumed that the user equipment has been determined to include at least two processing cores, because otherwise the domain orchestrator 712a may have chosen not to dedicate an entire processing core to video conferencing. For example, if the domain orchestrator 712a had determined that the user equipment has only a single processing core, then the domain orchestrator 712a may have created a resource rule limiting the maximum number of active applications and processes.

As this example illustrates, an advantage of a domain orchestrator (e.g., domain orchestrator 712a) decomposing the service policies within the domain is that it may create resource rules that are specific to the types and instances of hardware and software implemented in the domain. Further, as illustrated in this example, the mobile packet core domain 708 may be responsible for implementing the maximum overall bandwidth, yet the user equipment domain 706 may enforce a maximum user equipment initiated application bandwidth. That is, the user equipment may implement maximum bandwidth for special purpose applications as opposed to either the maximum bandwidth for general purpose applications, such as Internet browsers or the maximum aggregated bandwidth for all applications.

Examples of other resource rules that may be applied within the user equipment domain 706 include rules to warn the user when he/she is reaching usage limits in order to prevent billshock, rules to implement application specific controls, rules to block daemons that send and receive peer-to-peer network traffic, rules to prioritize maximizing performance ahead of minimizing cost (and vice-versa), rules related to notifying the user when thresholds are breached (e.g., 80% of monthly data transfer, 20% of battery power remaining, etc.), and rules relating to the user equipment's hardware capabilities (e.g., rules relating to the device's operating system, display, battery, locating hardware, motion detectors, etc.).

In block 764, the domain orchestrator 712b in the mobile packet core domain 708 may decompose the service policy into a corresponding resource rule. For example, if the received service policy is "Prioritize video conferencing," the mobile packet core domain 708 may decompose the service policy into the resource rule "Provide 2 MB/s video conferencing bandwidth." This resource rule may be based upon both the bandwidth requirement of video conferencing and the available resources within the mobile packet core domain 708. Similarly, if the received service policy is "Disable gaming" the mobile packet core domain 708 may decompose the service policy into the resource rule "Block 'Happy Fish' game traffic." In this example, the domain orchestrator 712b in the mobile packet core domain 708 may create a resource rule to block the downlink traffic associated with the Happy Fish game, and the domain orchestrator 712a in the user equipment domain 706 may create a resource rule to block the uplink traffic associated with the game. In this example scenario, the user equipment domain 706 and the mobile packet core domain 708 cooperate to block the forbidden traffic as close to the source as possible. This eliminates intermediate network nodes (e.g., nodes in the radio access network domain) from processing game-related traffic that will ultimately be discarded in the user equipment. Examples of other resource rules that may be applied within the mobile packet core domain 708 include rules to block peer-to-peer (P2P) traffic, rules to block software updates to the user equipment, and rules to implement video boosting.

Similarly, in block 766 the domain orchestrator 712c in the fixed line domain 710 may decompose a received service policy into a resource rule appropriate for the fixed line domain. For example, if the received service policy is "Prioritize video conferencing," the domain orchestrator 712c in the fixed line domain 710 may decompose this policy into the resource rule "Prioritize video conferencing traffic." The domain orchestrator in any domain may further be configured to ignore service policies for which its domain has no involvement or corresponding capabilities/functionalities. For example, as part of block 766, the domain orchestrator 712c may be configured to not decompose the service policy "Disable gaming" in response to determining that the fixed line domain 710 does not include any components or functionality for detecting game traffic, as may be the case for this example scenario.

In a further enhancement, the domain orchestrator (e.g., domain orchestrators 712a-c) in each domain may combine additional resource rules (e.g., user-specific resource rules or domain wide resource rules) with the generated domain specific resource rules. For example, the domain orchestrator 712a in the user equipment domain 706 may combine the user specific resource rule "Minimize energy consumption" 716 with the generated resource rules "Dedicate core to video conferencing" and "Block 'Happy Fish' game execution" 718 in block 762.

In an embodiment, the domain orchestrators (e.g., domain orchestrators 712a-c) may have a resource rules conflict resolver (not illustrated) configured to identify conflicts and/or determine which resource rules are to be given priority when a conflict exists. For example, the system 700 may be configured such that the policies from the continuum orchestrator 702 are given priority over the policies associated with the user equipment domain 706, in which the system may limit the user from, for example, increasing his/her monthly allowance beyond the monthly allowance permitted by the continuum orchestrator 702. In another example, the policies associated with the fixed line domain 710 may be given priority over the policies received from the continuum orchestrator 702.

In an embodiment, the continuum orchestrator 702 and its associated continuum 704 may be configured to support many additional service policies that span one or more domains.

FIGS. 8A and 8B list continuum service policies, along with the decomposed resource rules that may be applied in a user equipment domain and a mobile packet core domain (e.g., the user equipment domain 706 and mobile packet core domain 708 illustrated in FIGS. 7A-B). Similar domain-specific policies may be applied for other domains (e.g., the fixed line domain 710).

Figure 9A:
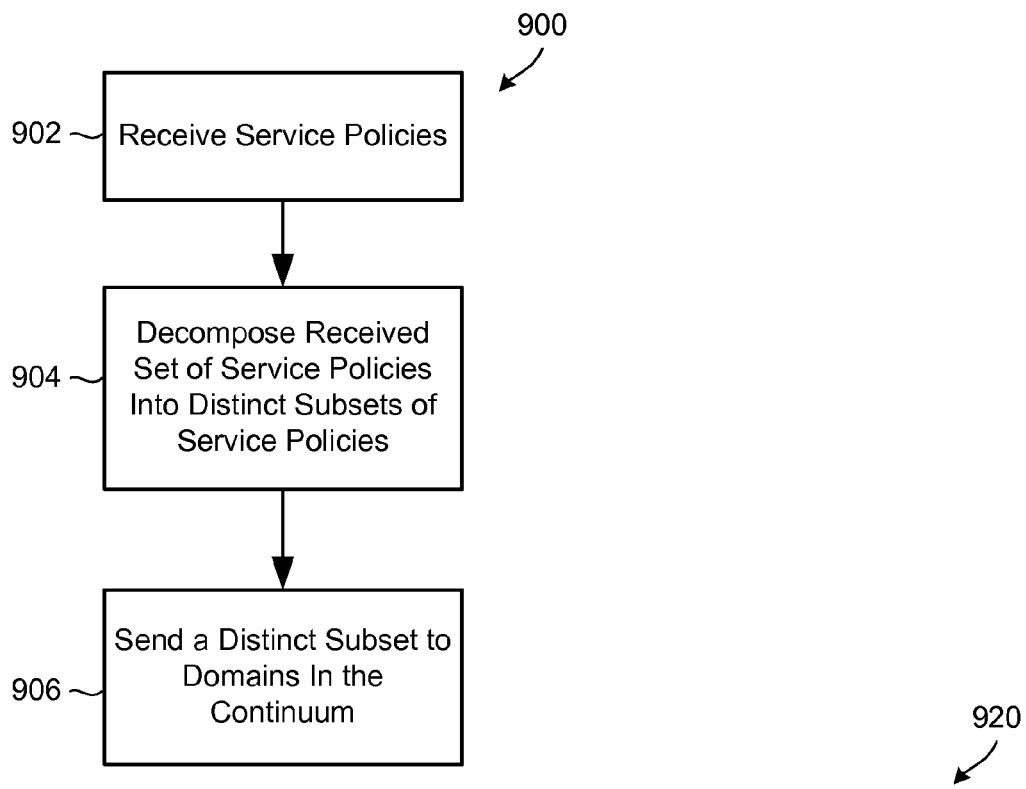
FIGS. 9A and 9B are process flow diagrams illustrating embodiment methods for delegating service policies in an example continuum.
Figure 9B:
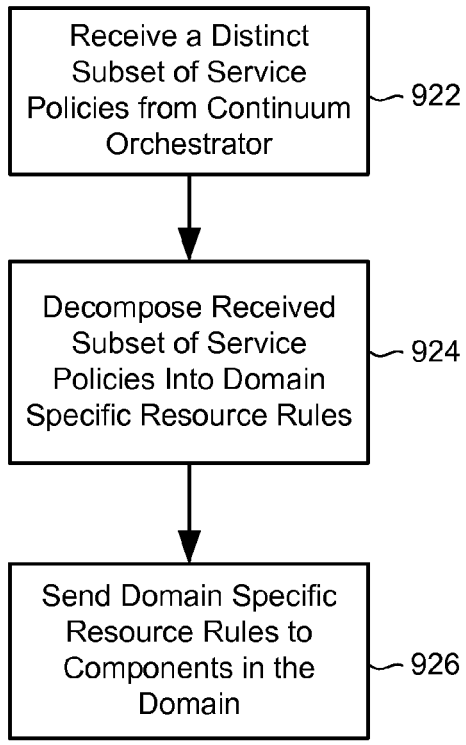

FIGS. 9A-9B illustrate embodiment methods for delegating service policies in an example continuum. Specifically, FIG. 9A illustrates an embodiment continuum orchestrator method 900 for delegating service policies across the continuum, and FIG. 9B illustrates an embodiment domain orchestrator method 920 for implementing delegated service policies as domain specific resources rules.

FIG. 9A illustrates an embodiment continuum orchestrator method 900 for delegating service policies in an example continuum. In block 902, the continuum orchestrator may receive service policies relating to a single user that describe a desired continuum behavior (e.g., "improve video conferencing," etc.). In block 904, the continuum orchestrator may decompose the received service policies into distinct subsets of service policies. The distinct subsets may be generated based on the capabilities, operations, roles and/or availability of the domains in the continuum. The distinct subsets may include service policies specific to the domain to which they are to be sent and/or service policies that may be implemented by multiple domains. In block 906, the continuum orchestrator may send a distinct subset of service policies to each of the domains. The domain orchestrator in each domain may receive the subset of service policies, decompose each service policy into one or more domain specific resource rules, and send the domain specific resource rules to one or more components in the domain for enforcement.

FIG. 9B illustrates an embodiment domain method 920 for implementing delegated service policies as domain specific resources rules. In block 922, a domain orchestrator in a domain (e.g., user equipment domain) may receive a subset of service policies from a continuum orchestrator. For example, the domain orchestrator may receive a subset of service policies that include a "prioritize video conferencing" policy and a "disable gaming" policy.

In block 924, the domain orchestrator may decompose the received service policies into resources rules. For example, a domain orchestrator in a user equipment domain may decompose the "prioritize video conferencing" policy into the resource rule "dedicate core to video conferencing" and the "disable gaming" policy into the resource rule "block 'Happy Fish' game execution." Likewise, a domain orchestrator in a mobile packet core domain may decompose the "prioritize video conferencing" policy into the resource rule "provide 2 MB/s video conferencing bandwidth" and the service policy "disable gaming" into the resource rule "block game traffic" or "block 'Happy Fish' game traffic." As another example, a domain orchestrator in a fixed line domain may decompose in the service policy "prioritize video conferencing" into the resource rule "prioritize video conferencing traffic," but ignore the service policy "disable gaming" in response to determining that the fixed line domain does not include any resources capable of detecting game traffic. In block 926, the domain orchestrator may send the domain specific resource rules to the relevant components in the domain for enforcement.

As mentioned above, the various embodiments provide complete and holistic network solutions that enable reliable, efficient and profitable end-to-end delivery of services across multiple heterogeneous networks participating in the delivery of a service. To facilitate network operations among the diverse domains in a decentralized architecture, the components, domain orchestrators, and one or more continuum orchestrators may exchange network and communication information regarding service conditions, network operations, billing/charging, and other communication-related information. For ease of reference, such information is referred to herein generally as "information." In various embodiments, the continuum may provide a holistic approach to the exchanging of information between domains. Domains may be configured to collect, publish, and/or transfer information to both the continuum orchestrator and one or more other domains. In an embodiment, the domain orchestrator in each domain may be configured to perform operations for the collection, publication, transfer, and consumption of all information relating to its domain.

Information exchanged between domains may include usage monitoring and reporting information, such as time based information (e.g., the start time of a phone call, the duration of the phone call, etc.), volume based information (e.g., the number of SMS messages sent in the current period, the total number of bytes received by the domain today, etc.), event based information (e.g., purchases of service upgrades, etc.), and performance based information (e.g., the average bit rate, and the maximum upload speed, etc.). The exchanged information may also include service purchase information (e.g., type of service, cost of service, data and time of service purchase, previous related purchases, etc.), service rating information (e.g., current rating plan, etc.), and balance information (e.g., current balance, previous transactions, threshold information, etc.). The exchanged information may further include policy information (e.g., policies relating to users, policies relating to services, policies relating to domains, etc.). The exchanged information may further include contextual information (e.g., the user equipment domain may collect location, signal strength, temperature, time, remaining battery power, biometric information, etc.). The exchanged information may also include information relating to users (e.g., service preferences, relationships with other users, group account information, etc.). In an embodiment, the domains may be configured to process (e.g., sum, average, aggregate, compare, correlate, etc.) the information before transferring it to other domains in order to enhance its usefulness in managing overall network functionality among the various domains.

In an embodiment, the domains in a continuum may assume, or may be assigned, one or more roles related to creating, monitoring, and consuming the communication-related information exchanged in managing communication sessions and network operations in general. For example, in an embodiment a domain may assume the role of a master, a creator, or a consumer of information. A domain may assume (or be assigned) more than one role (e.g., a domain may be a master of one piece of information and a consumer of another piece of information, and a domain may be both the creator and the master of the same information).

In an embodiment, a domain may change its role as the continuum changes. For example, a domain may initially be both the creator and the master of information, but due to changes in the continuum (e.g., the domain becomes overloaded, the domain begins generating erroneous data, the domain becomes unreliable, etc.) the domain may relinquish its role as the master of the information.

A domain assuming the role of master of information may function as the authoritative source of that information, and may therefore be responsible for publishing the information within the continuum. The master may also be responsible for enforcing controlled access to the information, and for ensuring the accuracy and integrity of the information. There may be many different masters within a continuum, because there may be many different pieces of information within the continuum. However, a single piece of information may only have one master.

A domain assuming the role of creator of information may function as the producer of a piece of information. This information may include usage monitoring and reporting information, service information, policy information, contextual information, user information, etc. The creator of the information may process the information that it produces, before transferring it to the master for publication. There may be multiple creators of the same piece of information within a continuum (e.g., both a user equipment domain and a radio access network domain may produce location information for a specific user).

A domain assuming the role of consumer of information may receive, and subsequently use, the published information from one or more masters of information. This usage may vary depending on the type of domain (e.g., a user equipment domain may display the information to the user, a mobile packet core domain may use the information for charging and fraud detection purposes, and a content provider domain may use the information to adjust a service policy).

In various embodiments, the information may be published, transferred, synchronized, and consumed in different ways depending on the roles of the involved domains and the information that is exchanged. The purpose of exchanging the information may be to transfer information from a master domain to a consumer domain, to synchronize information between a creator domain and a master domain, and/or to compare the information from two or more creator domains for assurance purposes.

Information may be exchanged between domains within the continuum to ensure that the consumer domain has accurate and reliable information from the master domain. In an example embodiment, the creator domain may be the mobile packet core domain, the master domain may also be the mobile packet core domain, and the consumer domains may be both the mobile packet core domain and the user equipment domain. In this example, all information (e.g., metering information, rating information, charging information, balance information, etc.) may be created and published by the mobile packet core domain. The information may be transferred from the mobile packet core domain to the user equipment domain each time that it is required (e.g., when the user requests his/her current balance using a software application on the user equipment, etc.), and the user equipment domain may subsequently present the information in a user-friendly manner. The mobile packet core domain may also be a consumer domain in this example because it may require charging information for billing and revenue assurance purposes.

Information may be exchanged between domains within the continuum to ensure that information created in one domain is consistent with the same information created in another domain. Two domains may be synchronized so they both possess the same information, rather than one domain simply obtaining the information from or transmitting to the other domain.

In an example embodiment, the creator domains may be both the user equipment domain and the mobile packet core domain, the master domain may also be the mobile packet core domain, and the consumer domains may be both the mobile packet core domain and the user equipment domain. An advantage of enabling the user equipment domain to be a creator domain is that the information that is most relevant to the user (e.g., metering information, rating information, charging information, balance information, etc.) is created in the domain where it is most likely to be required (e.g., by a software application). This eliminates the need for any network communications with other domains when the user requests the information, and therefore the software application is more responsive and requires less network resources than is the case with a centralize network architecture as is the current standard. Thus, the information created in the user equipment domain may be primarily intended for the user's benefit. The mobile packet core domain may also generate this information simultaneously for other purposes (e.g., billing and revenue assurance purposes), and since it is the master domain, its version of the information remains the authoritative version. Therefore, the information created in the user equipment domain may be periodically checked to ensure that it is consistent with the same information created in the mobile packet core domain. Any discrepancies in the information may indicate that the user equipment is experiencing technical difficulties or intentionally attempting to defraud the mobile packet core domain. In this case, the information may be synchronized across domains by replacing the incorrect portions of the information in the user equipment domain with the correct portions of information from the mobile packet core domain.

Information may be exchanged between domains within the continuum to ensure that information created in an unsecure domain is audited against the same information created in a secure domain. Therefore, the information created by the two domains may be compared to verify its integrity and identify discrepancies.

In an example embodiment, the creator domains may be both the user equipment domain and the mobile packet core domain, the master domain may be the user equipment domain, and the consumer domains may be both the user equipment domain and the mobile packet core domain. In this example, the user equipment domain is both a creator and consumer of information (e.g., metering information, rating information, charging information, balance information, etc.). This information may be the authoritative information used for billing purposes because the user equipment domain is the master domain. In this scenario, the information may be sent to a centralized billing system in the mobile packet core domain. This information may also be consumed by the user equipment domain for subsequent use in a software application. An advantage of the embodiment described by this example is that the mobile packet core domain does not need large complex systems that are costly in order to continuously record usage information for all users all of the time, because the user equipment domain is the master domain for this information. Another advantage of this embodiment is that users always have direct access to all of their information (e.g., using a software application on the user equipment) with minimum latency because the user equipment domain is the master domain. However, the user equipment domain may not be a secure domain, because it could be subjected to tampering by a malicious user. Therefore, the mobile packet core domain may be both a creator and consumer of the same information, and it is a secure domain because it is under the direct control of the network operator.

In an example embodiment, the mobile packet core domain may create the information and compare it with the information created by the user equipment domain. This may occur at fixed time intervals, randomly, when it has sufficient resources, or when there is a suspicion that the user equipment domain is behaving fraudulently (e.g., based on previous usage patterns). The mobile packet core domain may become the master domain for that information, and hence the user equipment domain may forfeit this role, if the information created by the user equipment domain differs from the same information created by the mobile packet core domain. In an example embodiment, the mobile packet core domain may retrieve the information from the user equipment domain when it is required (e.g., when a user contacts the network operator's customer care center the agent may require the user's current balance).

Information may be exchanged between domains within the continuum to ensure that the information is created in the domain where it is most likely to be consumed, which minimizes the transferring of information between domains. Therefore, there may be many different master domains within the continuum, and each master domain may be responsible for different types of information.

In an example embodiment, the creator domains may be both the user equipment domain and the mobile packet core domain, the master domains may be both the user equipment domain and the mobile packet core domains, and the consumer domains may be both the user equipment domain and the mobile packet core domain. In this example, the user equipment domain may be the master of metering information, because this metering information may include application level information that is only visible to the user equipment domain. The mobile packet core may be the consumer of this metering information, and it may subsequently process it further by combining it with rating information to create charging information and balance information. The mobile packet core domain may be the master of this charging information and balance information, and the user equipment domain may be a consumer of this charging information and balance information. In another example embodiment, the mobile packet core domain may be the master of the balance information. However, the mobile packet core domain may allocate a portion of the user's balance to the user equipment domain so that service can be charged for within the user equipment domain. Therefore, the user equipment domain may be promoted to being a master domain for the balance information that represents the allocated balance.

Information may be exchanged between domains (e.g., from a master domain to a consumer domain) using any suitable messaging choreography model, such as a push model in which one domain asynchronously sends information to another domain; a request-response model in which one domain queries another domain for information and subsequently receives a response containing the information; or a subscription model in which one domain registers with another domain to receive information whenever a notification event occurs (e.g., a fixed period of time elapses, information becomes available, etc.).

Regardless of the messaging choreography model being used, the consumer domain may inform the master domain of the information that it requires (i.e., the type of information, and the specific resource or resources to which the information type relates). The consumer domain may also specify a refresh period value that indicates how frequently the consumer domain is likely to require an update of the information. The consumer domain may require frequent updates to prevent it from becoming unsynchronized if the information changes rapidly. The refresh period may be time based (e.g., once an hour), quantity based (e.g., after 10 Mb), event based (e.g., after viewing a video on demand film), cost based (e.g., when there is less than $5 of credit remaining in a pre-paid account), trust based (e.g., information from an un-trusted domain is refreshed more frequently than information from a trusted domain), and resource based (e.g., the refresh period is related to the availability of resources within the continuum). The master domain may respond with the required information, or an error message indicating why the required information could not be provided. The master domain may also respond with a freshness value that indicates how long the required information is likely to remain valid (e.g., a piece of balance information might have a 95% probability of remaining valid for 3 hours), and hence how frequently an update of the information is likely to be required.

In an embodiment, the information may be synchronized between domains (e.g., between a creator domain and a master domain) periodically, upon the occurrence of an event, or in response to a request for the information from a domain. In this scenario, the creator domain may inform the master domain of its role (i.e., a creator domain), its information creation capabilities (e.g., the frequency with which it can create the information), and the information that it can create (i.e., the type of information, and the specific resource or resources to which the information type relates). The creator domain may include the information to be synchronized, which may be a subset of all of the information that it creates, along with a confidence value that indicates the correctness of this created information. The creator domain may also specify a refresh period value. The master domain may respond with its role (i.e., a master domain), the information that it masters (i.e., the type of information, and the specific resource or resources to which the information type relates), and the information to be synchronized. The master domain may also respond with a freshness value. The creator domain may then respond with its role (i.e., a creator domain), and for each piece of information that was synchronized the creator domain may include an acknowledgement receipt and details of any synchronization discrepancy (e.g., the expected information, the difference between the actual information and the expected information, and a log of the information creation process that the master domain can use to reconcile the discrepancy).

In various embodiments, the domain orchestrators and/or continuum orchestrators may be configured to detect discrepancies in information. Discrepancies between the information from domains may occur for a number of reasons. For example, discrepancies between the information from domains may occur because one domain is creating the data using different criteria than the other domain (e.g., two domains may be calculating charging information using the same metering information but different rating information). As another example, discrepancies between the information from domains may occur because one domain is behaving maliciously in order to intentionally defraud the other domain. As another example, discrepancies between the information from domains may occur because one domain has different capabilities than the other domain (e.g., two domains may be creating metering information, but only one of these domains may be able to meter application level events). As another example, discrepancies between the information from domains may occur because one domain has access to additional information (e.g., a user equipment domain may have access to metering information for each radio access type, whereas a mobile packet core domain might only have access to metering information relating to one radio access type). As another example, discrepancies between the information from domains may occur because one domain is malfunctioning. In an embodiment, a malfunctioning domain may be detected if it is observed that certain types of domain consistently malfunction.

In an embodiment, the quantity of information exchanged between domains may vary based upon the domains involved and their states. For example, some situations may require only a small amount of information to be exchanged, whereas other situations may require a complete set of information to be exchanged. In this embodiment, the domains may initially attempt to exchange only the minimum information that is required at a given time or to support a particular service, transaction or event in order to minimize the use of network resources. If this minimum information is not sufficient, then the domains may exchange progressively larger amounts of information until sufficient information has been exchanged. For example, the user equipment domain may have the role of a creator domain and it may exchange information with a mobile packet core domain that has the roles of both a creator domain and a master domain. If the master domain is synchronizing the information created by both domains (e.g., a single piece of balance information), then the two domains may exchange only the balance information. However, if the master domain detects a discrepancy between the information from the two domains, then they may exchange the complete set of charging information that was created since the two domains last had a synchronized balance. The master domain can then use this charging information to reconcile the discrepancy in the balance information.

In an embodiment, the information may be exchanged between the domains using a flexible and extensible type of data structure based upon call detail records (CDRs). For example, a domain requesting the information (e.g., a consumer domain) may include information about the required call detail records in the initial request. Such call detail records information may include the starting point from which call detail records are required (e.g., any combination of a date and time, a quantity of data, a service event, a threshold breach, a monetary amount, etc.), the end point to which call detail records are required (e.g., any combination of a date and time, a quantity of data, a service event, a threshold breach, a monetary amount, etc.), the frequency with which the call detail records are created (e.g., once every 15 minutes, etc.), the length of time for which the call detail records should be retained (e.g., if the call detail records will be deleted from the user equipment domain after they have been exchanged with the mobile packet core domain, then the mobile packet core may need to retain the call detail records indefinitely), and the quantity of information required in each call detail record.

In various embodiments, the exchanging of usage monitoring and reporting information between domains may be used to determine the actual quality of service (QoS) that is received in one or more domains, as distinct from the intended quality of service that may be specified by the continuum orchestrator. This quality of service may be measured objectively using one or more network properties (e.g., bit rate, bit error rate, packet delay, packet loss, allocation and retention priority (ARP), QoS class indicator or (QCI), etc.). The difference in quality of service may occur due to issues, restrictions, and limitations in any of the domains involved in the delivery of the overall end-to-end service. If the user has been sold a service with a specified intended quality of service (e.g., a video service with a guaranteed video delivery rate, etc.) then it may be necessary to increase or decrease the allocated quality of service in one or more domains to ensure that the user receives the correct actual quality of service in the user equipment domain.

In an embodiment, the quality of service may be measured independently for both the uplink network traffic and the downlink network traffic in each domain. Differences between the actual qualities of service for a single network traffic flow in two or more domains may occur as a result of quality of service loss between the domains. For example, a difference in the downlink actual quality of service between a mobile packet core domain and a content provider domain may be due to downlink traffic loss in a transit network domain. The combination of the actual quality of service information from different domains in the continuum may enable the continuum orchestrator (or one or more domain orchestrators, either individually or in collaboration) to modify services to adjust their end-to-end actual quality of services.

In an embodiment, the intended quality of service may be obtained by using an out-of-band communication with the content provider, by examining the network traffic for embedded intended quality of service meta-data, by performing a lookup based upon the service type, or by increasing the allocated quality of service until the actual quality of service stops increasing and remains constant.

In various embodiments, the quality of service monitoring and reporting may include—or may be used to determine—the actual quality of experience (QoE) received in one or more domains. This quality of experience may be used as a subjective measure of a user's experience of a particular service (e.g., a video on demand service, a web browsing service, a game playing service, a file sharing service etc.). In an embodiment, automated tools may be used to objectively measure/estimate the quality of experience. For example, video analysis tools capable of measuring poor quality video may be used to estimate the user's quality of experience. Similarly, various embodiments may measure the times taken to load web-pages as a way of determining web browsing quality of experience. The quality of experience may be used by the continuum orchestrator (or one or more domain orchestrators, either individually or in collaboration) to determine whether to increase or decrease the allocated quality of service in one or more other domains in order to ensure that the user receives an acceptable quality of experience in the user equipment domain.

Figure 10:
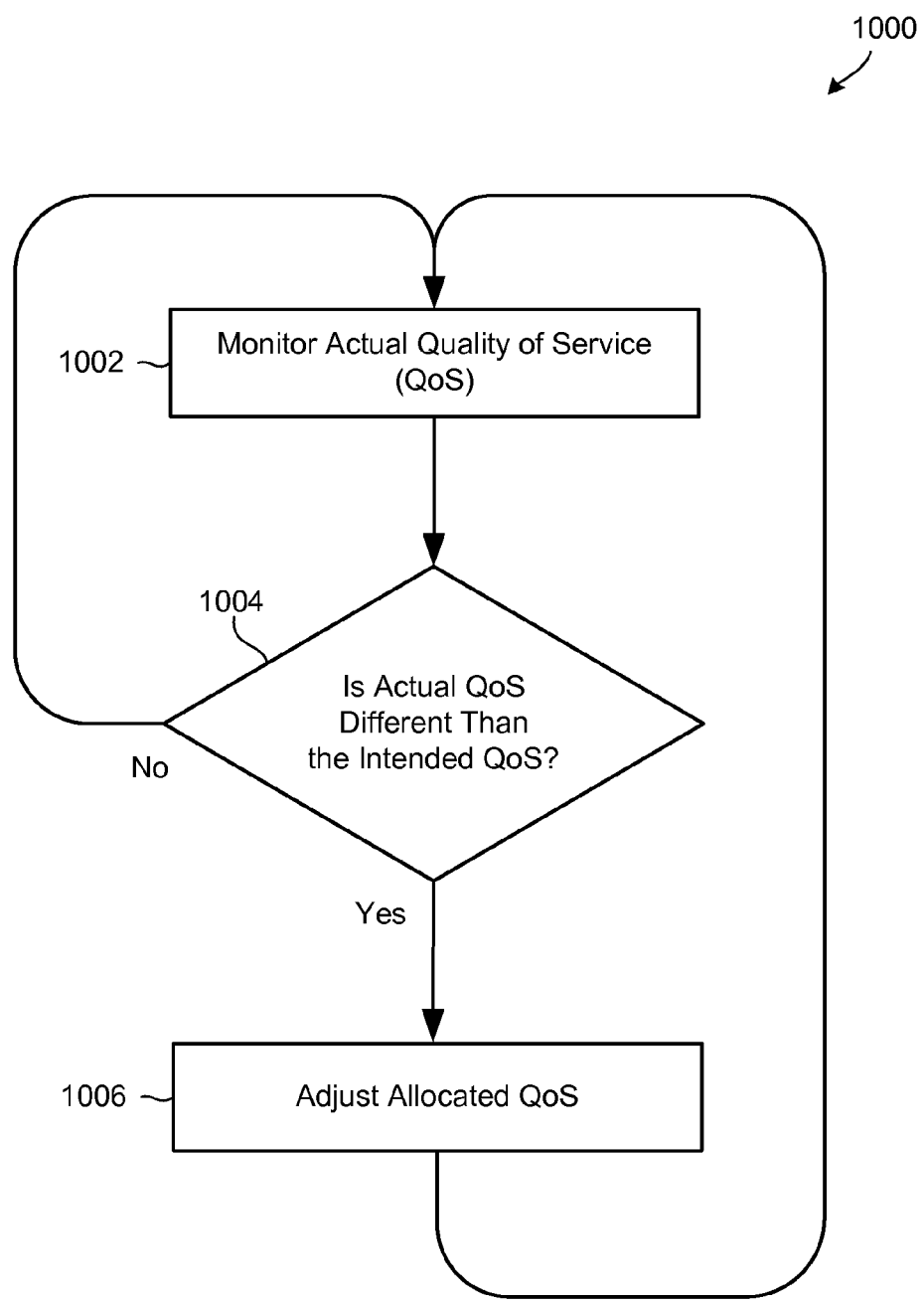
FIG. 10 is a process flow diagram illustrating an embodiment method for adjusting the allocated quality of service.

FIG. 10 illustrates an embodiment method 1000 for adjusting the allocated quality of service. In block 1002 a domain component (e.g., a domain orchestrator) may monitor the actual quality of service received and report this information to the continuum orchestrator or a domain orchestrator in another domain. In block 1004 the continuum orchestrator may compare the actual quality of service to the intended quality of service. In an alternative embodiment, in block 1004, the continuum orchestrator may compare the actual quality of service received from two or more domains. If there is not a significant difference between the actual and intended quality of services, or if changing the allocated quality of service is unlikely to affect the actual quality of service (e.g., the network resources within the continuum are being fully utilized), then control may return to the domain in block 1002. Otherwise, the continuum orchestrator (or a domain orchestrator in another domain) may request one or more domains to adjust the allocated quality of service in block 1006. In an embodiment, the magnitude of the allocated quality of service adjustment may be related (e.g., by one or more of proportional control, integral control, and derivative control) to the difference between the actual quality of service and the intended quality of service.

The embodiment method 1000 for enabling the continuum orchestrator and the domains to adjust the allocated quality of service shown in FIG. 10 may be modeled as a closed circuit feedback control loop. In this model the system is the overall continuum, the controller is the combination of the continuum orchestrator, and one or more domains (which may in turn use internal components such as policy management system components), and the sensors are components within the domains (such as policy and charging enforcement system components, traffic detection system components, and quality detector components). The system input may be the allocated quality of service, the system output may be the actual quality of service, and the measured error may be the difference between the intended quality of service and the actual quality of service. The use of feedback control loops with the continuum has the effect of enabling the network to become self organizing. In an embodiment, the magnitude and compositional network properties of the quality of service feedback may be based upon machine learning techniques (e.g., reinforced learning, etc.).

In an embodiment, a domain may include both network properties that are specific to the domain and network properties that relate to the end-to-end service. These network properties may relate to either or both of the overall uplink network traffic quality of service and the overall downlink network traffic quality of service. The network properties may include an aggregated (e.g., summed, averaged, maximum, etc.) actual quality of service; an aggregated intended quality of service; an aggregated available quality of service; and information regarding resource availability. In an embodiment, the domain properties may include network properties that are application and service specific.

In various embodiments, the continuum orchestrator may request information from one or more external systems in order to determine the domains that should adjust their allocated quality of service, and the magnitudes of such adjustments. These external systems may be: quality of service or quality of experience analysis systems; user data stores (e.g., HSS, SPR, UDC, SDM etc.); congestion management systems; loyalty management systems; malware or virus detection systems; charging or billing systems; offload management systems; and media optimization engines. In an embodiment, the continuum orchestrator may obtain information from other domains.

As mentioned above, the continuum orchestrator may request one or more domains to adjust the allocated quality of service. These adjustments may relate to either or both of the overall uplink network traffic quality of service and the overall downlink network traffic quality of service, and they may relate to specific applications and services. The continuum orchestrator may request a decrease in the allocated quality of service, if either there are insufficient network resources within the domain to provide the intended quality of service, or if the actual quality of service is greater than the intended quality of service. In an embodiment, the user may be notified if the actual quality of service is insufficient. The user may be offered an additional or different service that provides a greater actual quality of service if there are available network resources within the continuum. The continuum orchestrator may request an increase in the allocated quality of service, if there are available network resources within the domain. In an embodiment, a domain may reconfigure its behavior and resources in order to increase the actual quality of service for a specific service by decreasing the allocated quality of service for other services (e.g., a mobile packet core domain may reduce or eliminate the network resources available for video on demand services in order to increase the resources available for video call services). A domain may offload some of its network traffic from one adjacent domain to another adjacent domain in order to increase the allocated quality of service (e.g., a user equipment domain may offload traffic from one radio access network domain to another access network domain).

A domain may modify one or more services in order to reduce the need for adjusting the allocated quality or service for a specific service. For example, a mobile packet core domain may dynamically and temporarily adjust the rating plans of services to discourage the use of resource intensive services, and a content provider domain may encode video using a codec that provides greater compression.

In an embodiment, the feedback control loop may operate continuously. In an alternative embodiment, the feedback control loop may be started and stopped as required. This may occur based upon one of more of the time (e.g., the actual quality of service may be measured at fixed time intervals, or the time intervals may be related to the magnitude of the previous difference between the actual quality of service and the intended quality of service); events that occur within a domain (e.g., the actual quality of service drops below a predefined threshold); network intelligence (e.g., the output of either a probability based forecasting system or a machine learning algorithm); external system triggers (e.g., a service assurance system); human intervention (e.g., the user, or a customer support engineer); and any other events.

In various embodiments, the feedback control may be applied to either or both of the overall uplink network traffic quality of service and the overall downlink network traffic quality of service. In an embodiment, the feedback control may be applied to specific types of network traffic (e.g., TCP network traffic, UDP network traffic, Real-Time Transport Control Protocol (RTCP) network traffic, etc.). The method of calculating the allocated quality of service adjustment may differ between network traffic sent using a reliable protocol (e.g., TCP) and a best-effort protocol (e.g., UDP). In an embodiment, the feedback control may be applied to the network traffic associated with one or more protocols, services, or applications rather than the total network traffic.

Figure 11:
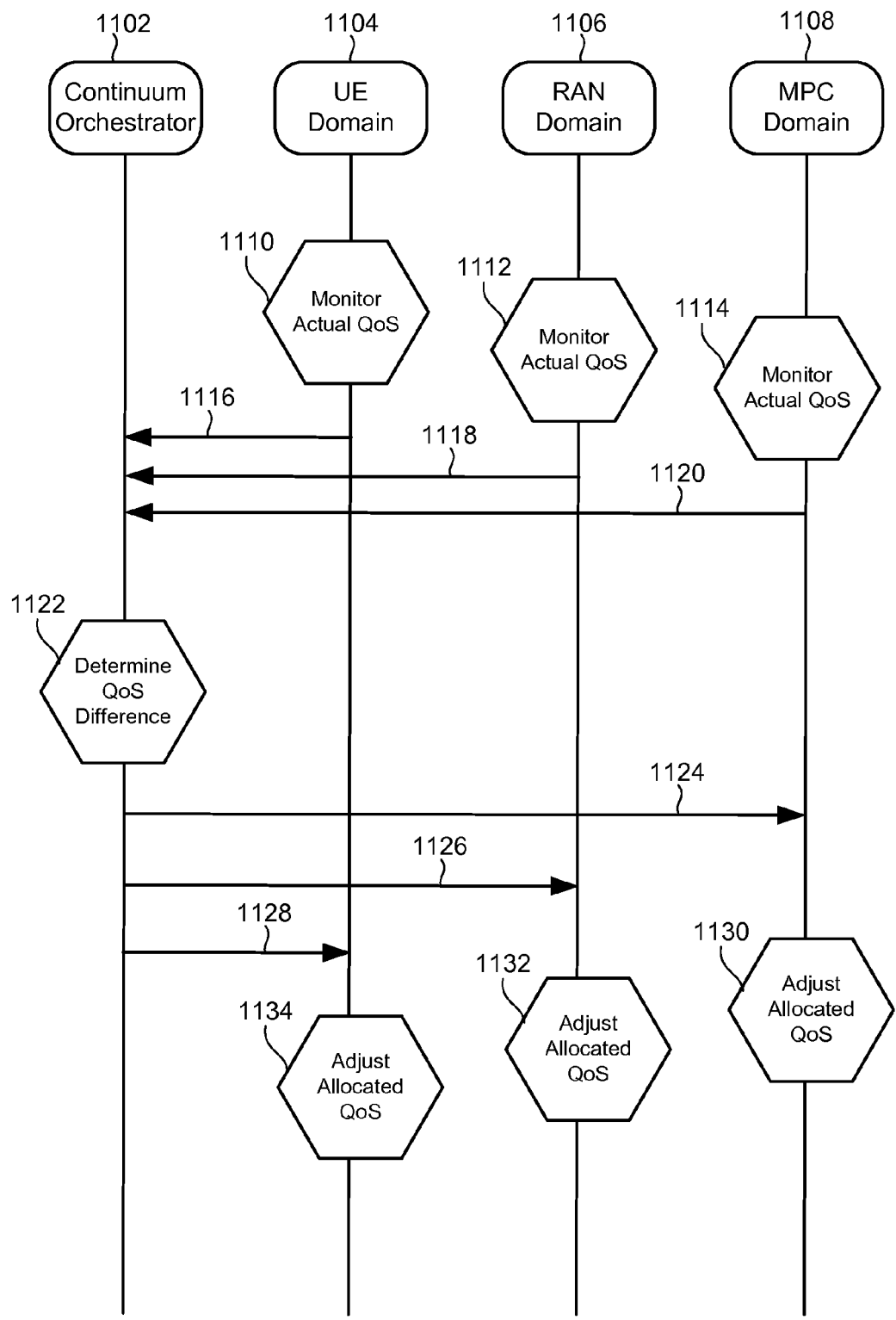
FIG. 11 is a message flow diagram illustrating message flows in an example embodiment of the feedback control loop.

FIG. 11 illustrates message flows in an example embodiment of the feedback control loop within a continuum including a continuum orchestrator 1102 and three domains (i.e., a user equipment domain 1104, a radio access network domain 1106, and a mobile packet core domain 1108) in accordance with an embodiment. In this embodiment, the continuum orchestrator controls the allocated quality of service (QoS) in the three domains in order to ensure that the actual quality of service measured in each domain is greater than or equal to the intended quality of service. In block 1110, a component (e.g., the quality detector component) within the user equipment domain 1104 may measure the actual quality of service received in the user equipment domain 1104. In block 1116, the user equipment domain 1104 may report the measured actual quality of service to the continuum orchestrator 1102. The user equipment domain 1104 may also report the allocated quality of service and the intended quality of service. The user equipment domain 1104 may report this quality of service information separately for both the uplink network traffic and the downlink network traffic. The operations illustrated in these blocks may be repeated in both the radio access network domain 1106 (i.e., blocks 1112 and 1118) and the mobile packet core domain 1108 (i.e., blocks 1114 and 1120).

In block 1122, the continuum orchestrator 1102 may calculate the difference between the actual quality of service and the intended quality of service for each domain. In an alternative embodiment, the difference between the actual quality of service and the intended quality of service may be calculated within each domain, and subsequently reported to the continuum orchestrator 1102. The continuum orchestrator may subsequently calculate the change that is necessary to adjust the allocated quality of service and/or identify the domains in which such adjustments should occur.

In block 1124, the continuum orchestrator 1102 may send a service request to the mobile packet core domain 1108 containing a service policy describing the required new allocated quality of service. In block 1130, the mobile packet core domain 1108 may apply the new service policy. The operations illustrated in these blocks may be repeated in both the radio access network domain 1106 (i.e., blocks 1126 and 1132) and the user equipment domain 1104 (i.e., blocks 1128 and 1134). The process may then be repeated by returning to block 1110 if necessary (i.e., if the actual quality of service differs from the intended quality of service). As described previously, the messages may be defined and exchanged using any common syntax and protocol (e.g., XML or JSON over HTTP in a RESTful manner, Diameter, etc.).

FIG. 12A illustrates the initial partial state of three domains (i.e., the user equipment domain, the mobile packet core domain, and the content provider domain) within an example continuum. In the example illustrated in FIG. 12A, the user equipment is consuming two services (i.e., a video on demand service and a user equipment update service), and both of these services are delivered using a reliable protocol. Each service has an associated priority, and this priority may have been assigned by either the user who owns the user equipment or the owner of another domain (e.g., the network operator). The network traffic quality of service (QoS) associated with each service is quantified solely in terms of bandwidth for ease of understanding, but it could also be quantified in terms of one or more other network properties. This network traffic quality of service may be measured in terms of kilobits per second (kb/s). Further-more, the feedback control loop may be only applied to the downlink network traffic for the sake of simplicity, but it could also be applied separately to the uplink network traffic. Similarly, the feedback control loop may be only applied to one domain, but it could also be applied to the user equipment domain and the content provider domain. In this initial state the user may be actively viewing a video, so the video-on demand service requires a significant downlink quality of service. Similarly, in this example the user equipment update service requires a substantial downlink quality of service, because the user's user equipment is updating the operating system and installed applications as part of a background task.

In this initial state of the illustrated example, the video on demand service has a downlink intended quality of service of 3,000 kb/s (as specified by the content provider domain) and a downlink allocated quality of service of 3,000 kb/s (as specified in the mobile packet core domain), but the downlink actual quality of service is only 2,000 kb/s (as measured by the user equipment domain). Thus, the user equipment domain is receiving a downlink quality of service that is 1,000 kb/s less than intended. This loss in the downlink quality of service could be due to issues in the radio access network domain such as congestion, poor signal strength, and over allocation of radio resources. In this example, the user equipment update service is not experiencing degradation of the downlink quality of service, because the actual downlink quality of service in the user equipment domain is equal to the downlink intended quality of service in the content provider domain (i.e., 2,000 kb/s).

In this example, the feedback control loop may attempt to improve the downlink actual quality of service associated with the video on demand service, because this service has the highest priority. Therefore, the continuum orchestrator may increase the downlink allocated quality of service in the mobile packet core domain (i.e., from 3,000 kb/s to 4,000 kb/s) until the downlink actual quality of service in the user equipment domain equals the downlink intended quality of service (i.e., 3,000 kb/s) in the content provider domain. This adjustment of the downlink allocated quality of service may occur over several iterations of the feedback control loop. Although all of the services may be using a common bearer for their network traffic, the continuum orchestrator can increase the downlink allocated quality of service for each service, and thus increase the downlink allocated quality of service for the bearer. Therefore, the downlink allocated quality of service associated with the user equipment update service does not change.

FIG. 12B illustrates an example stable state of the domains after the feedback control loop has finished iterating, and the quality of service values that have changed from the initial state are underlined for clarity.

In an embodiment, it is probable that the network conditions in the continuum will change continuously, and therefore the downlink actual quality of service may continuously fluctuate relative to the downlink allocated quality of service. However, the feedback control loop may also operate continuously to ensure that the downlink actual quality of service equals the downlink intended quality of service.

FIG. 12C illustrates an example initial state of the domains after the network conditions in the continuum have changed due to the user requesting a higher quality of video from the video on demand service. This example requested change has caused the downlink intended quality of service in the content provider domain to increase to 4,000 kb/s for the video on-demand service, while the user equipment update service remains unchanged.

In an embodiment, it is probable that there is an upper limit to the available downlink allocated quality of service in the mobile packet core domain. Therefore, the continuum orchestrator may not be able to keep increasing this in order to increase the downlink actual quality of service in the user equipment domain as part of the feedback control loop for the video on demand service. In this case, the continuum orchestrator may send a new service policy to the mobile packet core domain requesting it to redistribute the downlink allocated quality of service between the services. This enables the continuum orchestrator, as part of the feedback control loop, to ensure that the highest priority service can still receive the downlink intended quality of service in the user equipment domain. This may be achieved by increasing the downlink allocated quality of service in the mobile packet core domain for the video on demand service and decreasing the downlink allocated quality of service in the mobile packet core domain for the user equipment update service such that the total downlink allocated quality of service in the mobile packet core domain remains unchanged (i.e., 6,000 kb/s).

FIG. 12D illustrates an example of the stable state of the domains after the feedback control loop has finished iterating.

The continuum orchestrator may continue to monitor the network conditions as part of the feedback control loop, and it may frequently or continuously redistribute the downlink allocated quality of service as the network conditions vary.

In various embodiments, the feedback control may be applied to any domains within the continuum that are involved in the delivery of an end-to-end service. For example, the feedback control loop may be applied to machine-to-machine domains and mobile packet core domains to ensure that machine-to-machine based services that are not time-sensitive only use the mobile packet core when there are surplus network resources available. Likewise, the feedback control loop may be applied to fixed line domains and content provider domains to ensure that the content providers that are using a flexible infrastructure (e.g., an infrastructure based upon cloud computing principles) are capable of dynamically expanding and contracting to meet changing service demands from the fixed line domains.

In a further enhancement, the continuum orchestrator and the domains may be configured to use the service adjustment information to preemptively adjust the services of other users who are likely to be similarly affected (e.g., using the same service, located within the same geographic area, etc.). It may be disadvantageous to increase the allocated quality of service if too many users are competing for the same limited resources. Similarly, the allocated quality of service may be reduced at any time in order to maximize resources in other domains if the actual quality of service becomes greater than the intended quality of service due to changing conditions within one or more domains. In order to prevent an infinite loop, the control loop may be bound by a maximum quality of service that may be allocated. In a further enhancement, the continuum orchestrator or a domain orchestrator may interact with a loyalty management system in order to provide the user with a refund, notify a sales agent to contact the user, propose that the user purchases an alternative or additional service, etc.

In an embodiment, this usage monitoring and reporting may be used to determine the end-to-end quality of service between the domain consuming the service (e.g., the user equipment domain) and the domain providing the service (e.g., the content provider domain). It may be advantageous to do this quality of service testing before offering the service to the user, or before initiating the service, to ensure that the continuum is actually capable of delivering the service. For example, if a user wishes to purchase a service such as video on-demand, then the continuum orchestrator may temporarily increase the allocated quality of service in the relevant domains. It may then cause some test network traffic to be generated in the domain providing the video on demand service, and this test network traffic may subsequently be sent through the intermediate domains to the user equipment domain. The continuum orchestrator may then monitor the actual quality of service received in each of the domains in order to determine the point-to-point quality of service.

The continuum orchestrator may also monitor the actual quality of service received in the user equipment domain in order to determine the end-to-end quality of service. In an embodiment, the user may not be charged for this test traffic, and the test network traffic may be configured to be low priority to ensure that it does not interfere with real network traffic that may currently be in transit. For example, in a 3GPP network the test network traffic may be sent using a non-guaranteed bit rate (non-GBR) bearer with appropriate allocation and retention priority (ARP) and quality of service class indicator (QCI) values to indicate that it is low priority. If the actual quality of service is not sufficient, then the service may not be offered to the user. The testing may be performed incrementally, such as the continuum orchestrator may send increasingly larger quantities of test network traffic until the continuum is no longer able to provide the required quality of service for the test network traffic. Thus, the continuum orchestrator may establish the maximum quality of service available for end-to-end services. The testing may be repeated if conditions within a domain change, such as when the radio access network domain is able to provide an increased quality of service because the user has moved to a new location with better network access conditions. In an embodiment, the end-to-end quality of service testing may be performed independently for uplink and downlink network traffic. In an embodiment, the user may be offered the opportunity to purchase an increased quality of service if the service cannot be provided using the current quality of service.

In various embodiments, the continuum may enable similar, equal, or enhanced policy and charging (e.g., metering, rating, balance management, etc.) functionality to be undertaken by any one of several domains. In an embodiment, policy and charging functionality that is normally centralized in a single mobile packet core domain may be either partially or fully distributed across many user equipment domains. The extent of this distribution may vary depending on the capabilities of the user equipment domains. In an embodiment, the continuum orchestrator may engage in a handshaking process with one or more domains in order to establish their capabilities before distributing any functionality.

Such distribution of network management functionality is possible because both domains may contain policy management system components (e.g., policy management system 502 illustrated in FIG. 5 and policy management system 606 illustrated in FIG. 6), policy and charging enforcement system components (e.g., policy and charging enforcement system 506 illustrated in FIG. 5 and policy and charging enforcement system 610 illustrated in FIG. 6), traffic detection system components, user data repository components, and charging system components.

The components in a user equipment domain may exchange policy and charging information from their counterparts in the mobile packet core domain via the continuum orchestrator and the domain orchestrator components. In an embodiment, the user equipment domain may store a cached copy of the information and the mobile packet core domain may store the master copy of the information, and therefore the user equipment domain may need to periodically synchronize with the mobile packet core domain.

In an embodiment, the continuum may enable policy and charging configurations in one domain to be subsequently distributed to one or more similar domains. Consider as an example a scenario in which a user has multiple user equipments (each of which has its own user equipment domain), and he/she makes policy and charging configuration adjustments. These adjustments may be made on a single user equipment and then distributed to all of his/her user equipments via the continuum. This distribution method is also advantageous in scenarios where multiple user equipments are centrally managed (e.g., family accounts, corporate accounts, machine-to-machine accounts, etc.).

In an embodiment, a user equipment domain may perform policy management operations and periodically synchronize with a mobile packet core domain. In this embodiment a user equipment domain policy management system (e.g., policy management system 606 illustrated in FIG. 6) may be configured with policies both from the user (e.g., via user interaction system 604 illustrated in FIG. 6) and from another policy management system (e.g., policy management system 502 illustrated in FIG. 5). The policies may be either discretionary or mandatory. An advantage of specifying policies in the user equipment domain may be that the policies may be more descriptive because the policies can use contextual information (e.g., the user equipment's current power saving mode, the application that currently has the screen focus, etc.), and the policies can also be tightly integrated with the features and capabilities of the user equipment (e.g., location information, battery charge, signal strength, etc.). For example, a policy could prevent an application (e.g., a game) from executing on the user equipment if the user equipment is in a specified location (e.g., a school); forbid access to a specific service regardless of the network connection type being used by the user equipment; specify the circumstances under which the user equipment may offload traffic (e.g., traffic associated with a specific application) to another network type; limit the number of connections that may be started by a chatty application when the device is in power saving mode; and warn the user when he/she starts an application for which there is not enough bandwidth. In an embodiment, the user may configure policies in terms of high-level goals or profiles.

Figure 13A:
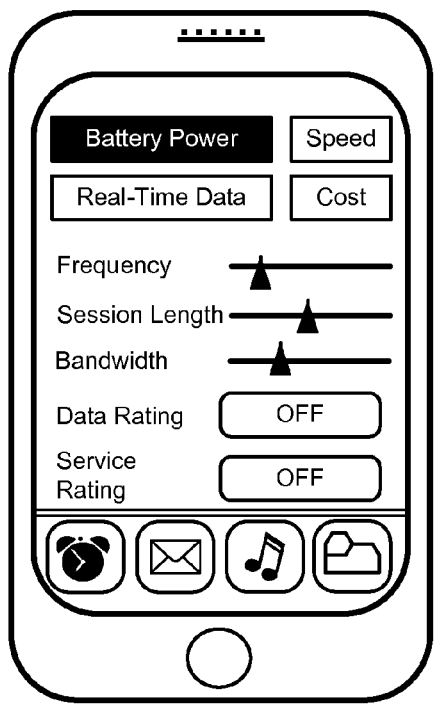
FIGS. 13A-D are illustrations of a user equipment device showing a user interface that enables the user to specify policies.
Figure 13B:
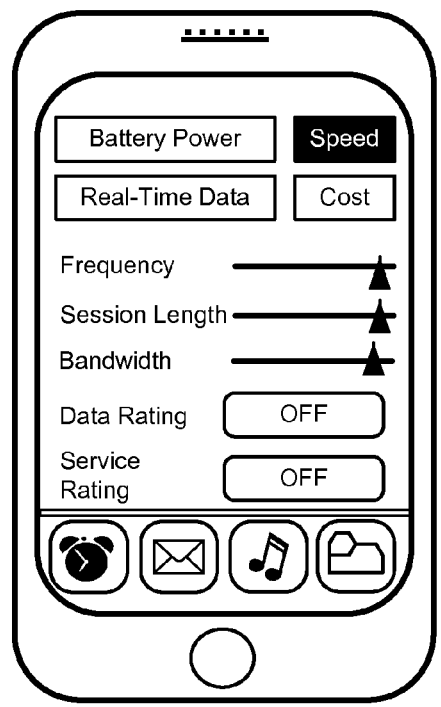
Figure 13C:
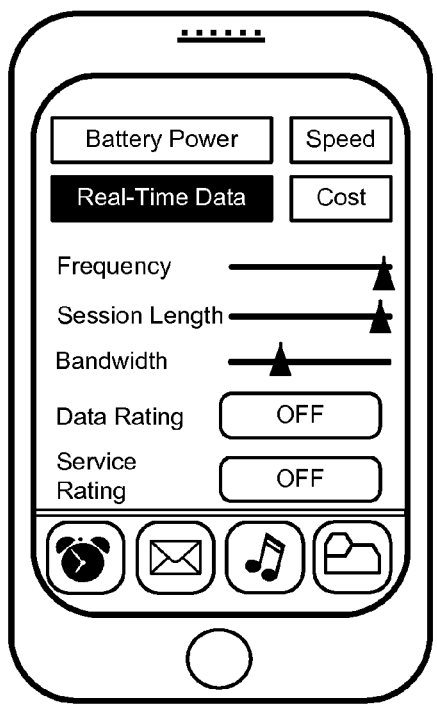
Figure 13D:
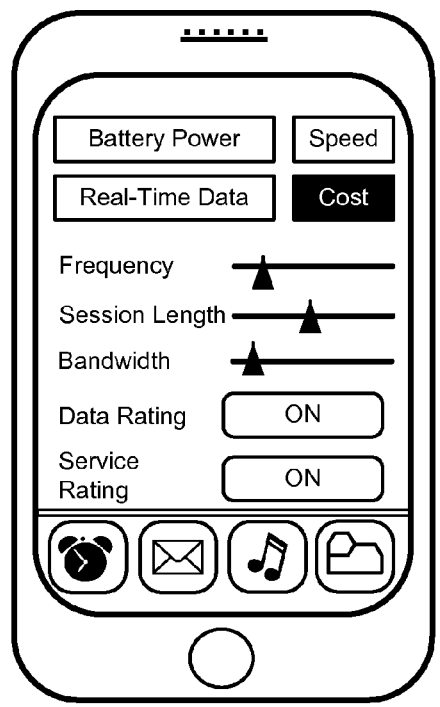

FIGS. 13A-D are illustrations of a user equipment device showing a user interface that enables the user to specify policies. Specifically, FIG. 13A illustrates how the user interface may enable the user to specify policies in terms of battery power, which may minimize the amount of battery power used. FIG. 13B illustrates how the user interface may enable the user to specify policies in terms of network speed, which may maximize the speed of the data throughput. FIG. 13C illustrates how the user interface may enable the user to specify policies in terms of real-time data, which may give priority to time sensitive applications and network traffic such as video calls. FIG. 13D illustrates how the user interface may enable the user to specify policies in terms of costs, which may minimize the usage costs of the data connection.

Figure 14:
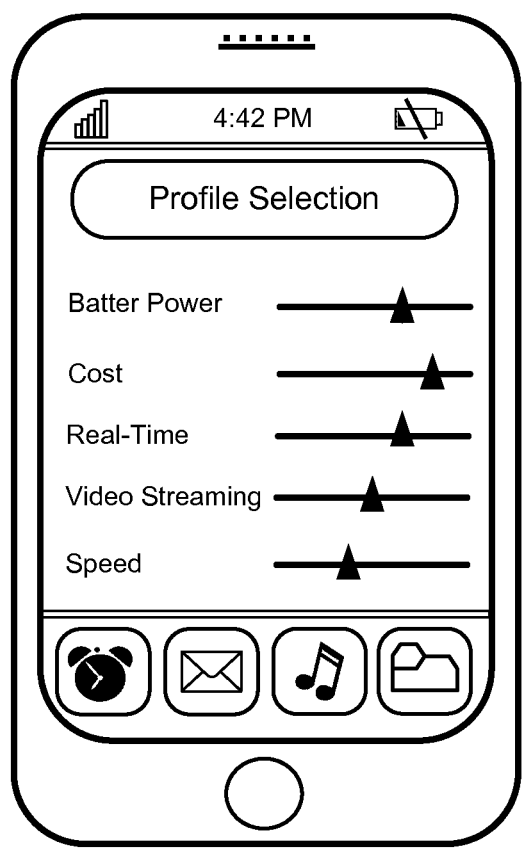
FIG. 14 is an illustration of a user equipment device showing an alternative user interface for specifying user policies.

FIG. 14 is an illustration of a user equipment device showing an alternative user interface for specifying user policies. Specifically, FIG. 14 illustrates that the alternative user interface may display the profiles as slider bars. The slider bars may be dependent on each other. Thus, if the user increases one slider bar then one or more of the other slider bars may decrease in order to maintain an overall balance among the controlled parameters.

In an embodiment, a user equipment domain may be configured to perform policy enforcement, and periodically synchronize with a mobile packet core domain. In this scenario, a component in the user equipment domain (e.g., the policy and charging enforcement system component 610 illustrated in FIG. 6) may obtain policies from both another component in the user equipment domain (e.g., policy management system 606 illustrated in FIG. 6) and a component in the mobile packet core domain (e.g., policy management system 502 illustrated in FIG. 5). The ability to perform policy enforcement in the user equipment domain enables more descriptive policies that better utilize the capabilities of the user equipment. Performing policy enforcement within the user equipment domain may also be more efficient than performing the same policy enforcement in another domain. For example, it may be more efficient to block outgoing network traffic in the user equipment domain compared to the mobile packet core domain, since blocking it in the former prevents the traffic from consuming resources while traversing the radio access network domain.

In an embodiment, a user equipment domain may be configured to perform metering, and periodically synchronize with a mobile packet core domain. In this embodiment, the metering may be performed by a first component (e.g., the policy and charging enforcement system component 610 illustrated in FIG. 6) assisted by another component (e.g., traffic detection system 602 illustrated in FIG. 6). Thus, the user equipment domain may perform application level metering operations and/or meter resources that are not visible to other domains (e.g., battery power).

In an embodiment, the user equipment domain may be capable of obtaining new metering policies from the mobile packet core domain. Such metering policies may enable metering of different resources using different methods, and with different accuracies. For example, a user's voice over IP calls may not need to be metered because they are included in the monthly subscription plan, whereas the video over IP calls may need to be metered to the nearest second. In a further embodiment, the user equipment domain and the mobile packet core domain may cooperate in order to provide enhanced metering. For example, a traffic detection system in a first domain (e.g., traffic detection system 602 illustrated in FIG. 6) may notify the policy and charging enforcement system in another domain (e.g., policy and charging enforcement system 506 illustrated in FIG. 5) when an application starts and stops executing, so that the policy and charging enforcement system can readily identify the traffic associated with the application. In another example, the traffic detection system may be required to perform traffic detection on certain types of traffic (e.g., peer-to-peer file sharing traffic), but it may not be capable of performing traffic detection on the traffic belonging to all users. In this example, the traffic detection system in a user equipment domain (e.g., traffic detection system 602 illustrated in FIG. 6) may notify the traffic detection system in another domain (e.g., traffic detection system 510 illustrated in FIG. 5) when the user equipment domain is sending or receiving peer-to-peer traffic, and the traffic detection system of the user equipment domain could then start performing detailed traffic detection on that user's traffic.

In an embodiment, the user equipment domain may perform rating, and periodically synchronize with the mobile packet core domain. In this scenario, the charging system component in a user equipment domain (e.g., charging system 608 illustrated in FIG. 6) may obtain one or more rating plans applicable to the owner of the user equipment from the charging system component in another domain (e.g., charging system 504 illustrated in FIG. 5). The ability to simultaneously use multiple rating plans that are associated with the user may be advantageous in scenarios where the user is roaming in several different telecommunications networks, and the rating plans change infrequently. Additionally, the charging system component may obtain the rating plans from other sources, such as from applications that are installed directly on the user equipment. In an embodiment, the charging system component may perform application level rating. The ability to perform application level rating within the charging system component enables it to provide the user (e.g., via the user interaction system 604 illustrated in FIG. 6) with accurate charging information on both the services that have been consumed and the services that are currently being consumed, and with pre-emptive charging information on future service consumption. This may be particularly advantageous when the user is roaming in another telecommunications network, or when the user equipment domain is unable to establish a connection with the mobile packet core domain. The charging system component may also warn the user when the cost of a service is greater than a user-specified threshold.

In an embodiment, the user equipment domain may store the user's balances (e.g., accumulated monthly spend in Dollars, remaining minutes of free video, etc.), and periodically synchronize with the mobile packet core domain. In this scenario, the charging system component in a user equipment domain (e.g., charging system 608 illustrated in FIG. 6) may obtain and manage (e.g., increment, decrement, average, reset, etc.) one or more balances associated with the owner of the user equipment from the charging system component in another domain (e.g., charging system 504 illustrated in FIG. 5). Thus, the user equipment domain may not need to query the mobile packet core domain every time that a balance needs to be updated. This may significantly reduce the work load of the charging system (e.g., charging system 504 illustrated in FIG. 5), improve the accuracy of the balance information, and provide the user of the user equipment with faster responses when querying balance information.

In an embodiment, the components within the user equipment domain may be enabled to make assumptions about policy and charging information (e.g., remaining credit balance) without needing to communicate with the equivalent components in the mobile packet core domain. In such cases the scope of the assumptions may be limited to ensure that an incorrect assumption can always be rectified after synchronizing with the mobile packet core domain.

In an alternative embodiment, the components within the user equipment domain (e.g., the policy management system component 606, the policy and charging enforcement system component 610, the traffic detection system component 602, the user data repository component 612, and the charging system components 608) may not be replicated in the mobile packet core domain. Thus, the master policy and charging information may be maintained in the user equipment domain, and there is no need to perform synchronization with any other domains. Such an embodiment requires that the user equipment domain be trusted, and therefore it may be protected against tampering and fraud by the user. This enhanced embodiment is advantageous because it eliminates the need for the equivalent components within the mobile packet core domain. In a further enhancement, the mobile packet core domain may perform audits on user equipment domains to ensure that they are neither malfunctioning nor compromised.

In an embodiment, the metering, rating, and balance management functionalities may be combined to provide the user with live information regarding his/her usage and charging information. This may be achieved by, for example, implementing a user interaction system component (e.g., user interaction system component 604 illustrated in FIG. 6) as a software application on the user equipment.

Figure 15A:
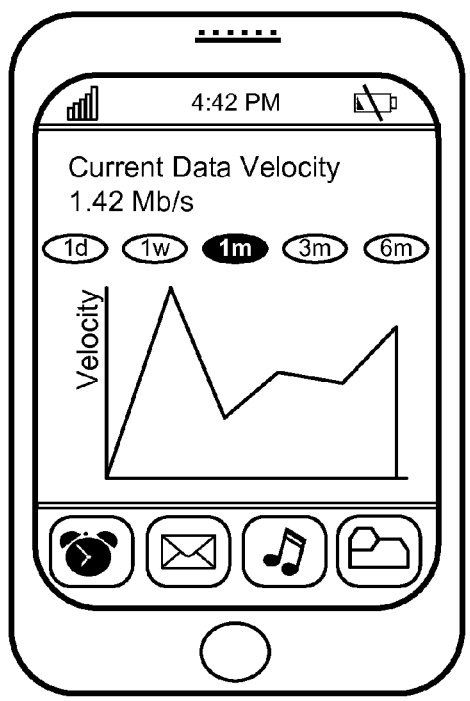
FIGS. 15A-D are illustrations of a user equipment device having a user interaction system configured to provide a user with live information regarding his/her usage and charging in accordance with various embodiments.
Figure 15B:
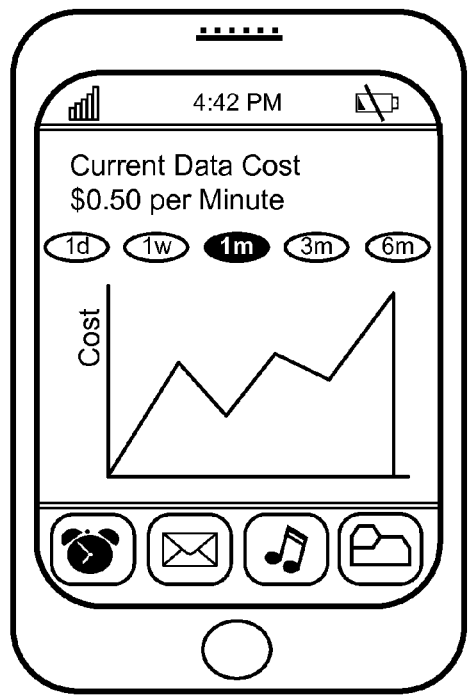

FIGS. 15A-D are illustrations of a user equipment device having a user interaction system configured to provide a user with live information regarding his/her usage and charging in accordance with various embodiments. Specifically, FIG. 15A is an illustration of a device displaying current data velocity (in terms of Mb/s) and a historical data velocity (over the past month) in accordance with an embodiment. FIG. 15B is an illustration of a device displaying the current spend velocity (in terms of currency units per minute) and the historical spend velocity (over the past month) in accordance with another embodiment. The duration of the historical periods (e.g., data velocity, spend velocity) may be user selectable. In the illustrated examples of FIGS. 15A and 15B, the historical periods are user selectable between one day (1d) and six months (6m). In various embodiments, the data velocity and/or the spend velocity may be displayed as percentages of allowances (e.g., monthly allowances) and/or in terms of previous minimum and maximum values. In an embodiment, a user interaction system component in the user equipment domain (e.g., the user interaction system component 604 illustrated in FIG. 6) may notify the user of the user equipment when defined usage and charging thresholds have been exceeded.

Figure 15C:
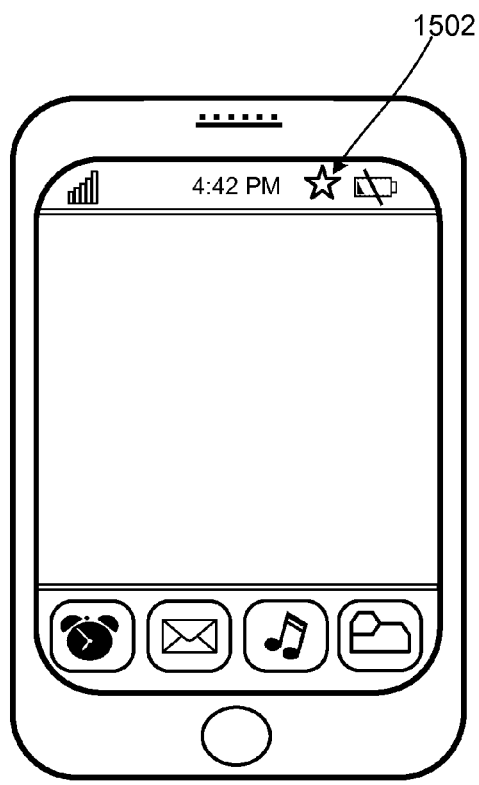
Figure 15D:
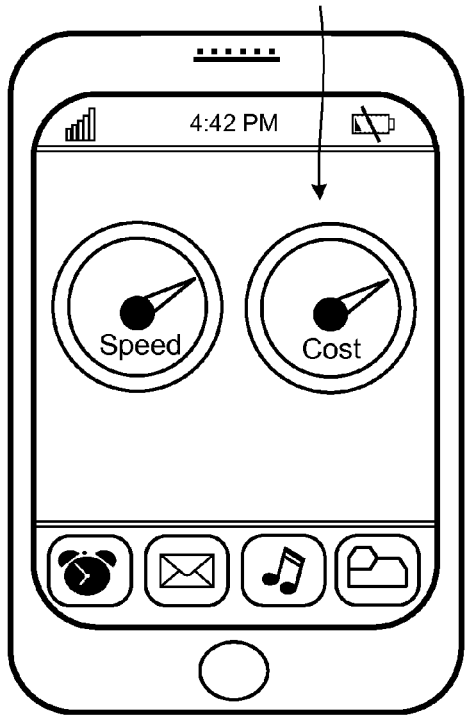

FIG. 15C is an illustration of a device displaying an icon 1502 on the user equipment's desktop or home screen in order to indicate his/her current state relative to one or more user-defined thresholds. For example, the icon 1502 may represent the user's current data usage relative to thresholds representing 75%, 95%, and 100% of his/her monthly allowance. The icon 1502 may represent the different states using any visual means (e.g., shape, color, intensity, blink frequency, animation, completeness, etc.). FIG. 15D is an illustration of a user equipment device having a software widget 1504 that indicates both the user's current data velocity and his/her spend velocity in terms of an allowance.

In an embodiment, the continuum and the orchestrators may change their behavior in order to minimize traffic between them. For example, the user equipment domain and the mobile packet core domain may be configured to limit communications between themselves to periods when they already have an active data session. In another example, the frequency of synchronization communications between domains may be increased or decreased based upon the user's characteristics (e.g., identity, current activity, balance, etc.).

As mentioned above, the continuum may provide a holistic approach to usage monitoring and reporting that spans multiple domains in which the domain orchestrator in each domain has the ability to collect, process, and report contextual information to the continuum orchestrator. The frequency, amount, and type of this collected contextual information may vary depending on the types and numbers of domains from which it is collected. The continuum orchestrator may combine and process the collected contextual information to ensure that the collected information is representative of a single group of integrated domains, rather than being representative of many independent and disparate domains. Thus, the single integrated group of domains may form a combined domain that has different properties and attributes compared to its constituent domains. The continuum orchestrator may then use this combined domain information in subsequent service requests to domain orchestrators in one or more domains.

Figure 16:
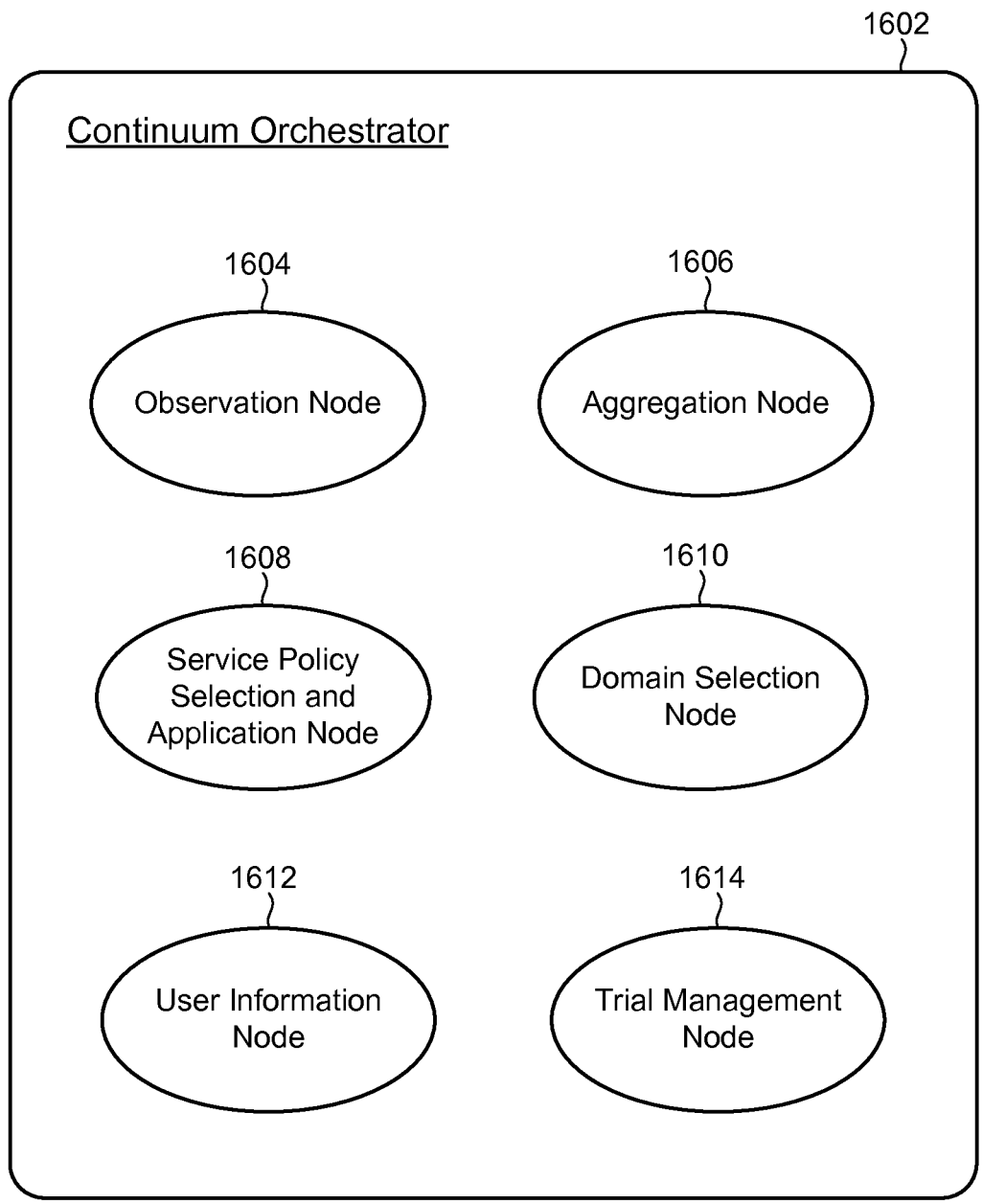
FIG. 16 is a system block diagram illustrating example functional nodes of a continuum orchestrator suitable for use with the various embodiments.

FIG. 16 illustrates example functional nodes of a continuum orchestrator 1602 suitable for use with the various embodiments. In the example illustrated in FIG. 16, the continuum orchestrator 1602 includes an observation node 1604, an aggregation node 1606, a service policy selection and application node 1608, a domain selection node 1610, a user information node 1612, and a trial management node 1614. The observation node 1604 may be configured to collect and process contextual information from one or more types of domains and one or more instances of each type of domain. The collection of contextual information may be based upon either a push or pull model, and the observation node 1604 may use a policy that determines the frequency and circumstances of collection. In an embodiment, the observation node 1604 may perform initial processing (e.g., ensuring the integrity of the data) and filtering (e.g., removing unwanted and unnecessary information) of the collected contextual information.

FIG. 17 illustrates example domains and the types of contextual information that may be collected (e.g., via observation node 1604 illustrated in FIG. 16) from the domains in accordance with various embodiments.

Returning to FIG. 16, the aggregation node 1606 may receive processed and filtered contextual information from the observation node 1604 relating to a plurality of domains. The aggregation node 1606 may also receive information from one or more sources outside of the continuum orchestrator (e.g., components in other domains, external systems, etc.). The aggregation node 1606 may then combine (e.g., aggregate, correlate, etc.) the information obtained from all of these sources in order to produce enhanced information relating to the combined domain that is more valuable and useful than the information relating to the individual domains.

The service policy selection and application node 1608 may use the aggregated and correlated information from the aggregation node 1606 to create service policies that modify the resources in one or more domains within the continuum. These service policies may modify the resources associated with either one or more applications and services, or users, within the continuum. In an embodiment, the service policies may be used to configure the domains to change their monitoring and reporting in response to configuration changes of network resources within the continuum. The service policy selection and application node 1608 may then send these new or updated service policies to the domain orchestrators in one or more domains. The creation and distribution of the service policies may occur immediately, or as soon as is possible, after the aggregated and correlated information is received from the aggregation node 1606. Alternatively, the creation and distribution of the service policies may occur in response to some other event within the continuum, or at a predefined future time.

The domain selection node 1610 may be configured to select one or more subsets of domains from a superset of domains where all of the domains are instances of the same domain type. The domain selection node 1610 may receive the selection criteria from another node, and these selection criteria may be random, based upon a characteristic of the domain type, or based upon statistically representative characteristics of the domain instances. For example, if the superset contains all user equipment domains within a network then the selection criteria could select all user equipment domains that are capable of consuming a video on demand service, or the selection criteria could select two non-intersecting subsets of one thousand user equipment domains each, such that the numbers of pre-paid user equipment domains and post-paid user equipment domains in each subset are representative of the entire superset. The characteristics of the user equipment domain that are used for selection may relate to the user equipment (e.g., type, display capabilities, processing capabilities, etc.), the owner of the user equipment (e.g., age, gender, home address, work address, spending profile, roaming profile, customer support history, etc.), and the usage of the user equipment (e.g., available network resources, available battery resources, current location, applications and services in use, etc.). In an embodiment, the selected domains may be anonymized by having some of their characteristics hidden or removed so that the domains cannot be subsequently identified. In an embodiment, the domain selection node 1610 may recursively select further subsets of domains from the previously selected subsets. In an embodiment, the domain selection node 1610 may obtain domain characteristics from the aggregation node 1606.

The user information node 1612 may send information that is intended for users to one or more domains. This information may be informative (e.g., text based notifications, current network conditions and status, etc.), instructive (e.g., network selection instructions for use while roaming, etc.), or interactive (e.g., subjective quality of experience questionnaires, etc.). The receiving domains may choose the most appropriate way to communicate this information to the user. For example, the user equipment domain may use a user interaction system component, such as the component 604 illustrated in FIG. 6.

The trial management node 1614 may be configured to conduct trials involving one or more domains in the continuum. In an embodiment, the trial management node 1614 may use features provided by the other nodes in the continuum orchestrator. For example, the trial management node 1614 may collect information from both the observation node 1604 and the aggregation node 1606, and create service policies that modify the resources within the continuum using the service policy selection and application node 1608. As another example, the trial management node 1614 may use the domain selection node 1610 to select the sets of domains to participate in the trial, and the trial management node may communicate with the users participating in the trial via the user information node 1612.

In an embodiment, the continuum orchestrator may be configured to generate a location based spending map that combines the location information of users (based upon the location information of their user equipments) with their spending information. The spending may be associated directly with the network operator (e.g., the purchasing of a bandwidth boost), or with a third party (e.g., the purchasing of a video on demand film). The spending map may enable a network operator to determine the locations in which users spend the most money, and consequently the locations that generate the most revenue. The network operator may then give the infrastructure (e.g., the radio access network domains) associated with these locations a higher priority for maintenance and upgrades. It should be understood that the locations in which users have their highest spending may differ significantly from the locations in which the users are registered as living due to the portable nature of many types of user equipment.

In an embodiment, the system may be configured to compute a spending map in which locations with higher spending are differentiated from locations with medium and low spending. The spending map may be displayed on the user equipment. The spending map may illustrate spending associated with locations within a single cell and/or spending associated with locations across multiple cells. In various embodiments, the spending map may be as finely grained as required.

In an embodiment, the continuum orchestrator may be configured to generate the spending map using both the observation node 1604 and the aggregation node 1606. The observation node 1604 may receive location information independently from a plurality of user equipment domains, process it (e.g., homogenize it), and subsequently send it to the aggregation node 1606. The aggregation node 1606 may correlate the location information with the spending information (obtained from the mobile packet core domain) for each user. The aggregation node 1606 may then aggregate this correlated information for all users in order to produce the spending map. In various embodiments, the observation node 1604 may obtain the location information and the spending information from other domains (e.g., a radio access network domain).

In various embodiments, the continuum orchestrator may be configured to combine one set of information with one or more other sets of information, where the sets of information are derived from one or more sets of domains within the continuum. In an embodiment, the continuum orchestrator may monitor and track the popularity and characteristics of applications and services in order to create their usage profiles. The characteristics of these applications and services may differ considerably. For example, some applications and services may create a lot of signaling network traffic, but transfer relatively small quantities of application data, whereas other applications may create relatively small quantities of signaling network traffic, but transfer relatively large quantities of application data using a relatively high quality of service. In this embodiment, the observation node 1604 within the continuum orchestrator may obtain usage information from one or more user equipment domains and mobile packet core domains (which may obtain this information from their traffic detection function components). The aggregation node 1606 may subsequently generate aggregated profile information for each application and service operating within the continuum. In an embodiment, the aggregation node 1606 may be configured to make future predictions regarding the application and service profile information, and the associated resource usage effects on the continuum. For example, the aggregation node 1606 may detect a newly released application that creates a lot of signaling network traffic. If the application usage is increasing, then the increased signaling network traffic may have a detrimental impact on the overall operation of the continuum. Therefore, it may be beneficial for the continuum orchestrator (using the service policy selection and application node 1608) to impose some additional service policies within the continuum (e.g., blocking the application during certain times, restricting how often the application can connect to the network, etc.).

In another embodiment, the continuum orchestrator may combine the location information of users with application and service usage. It is likely that certain locations may experience abnormally high usage of certain types of applications and services. For example, locations containing airports and train stations may experience high usage of video on demand and gaming applications and services due to users waiting for their transportation. Similarly, locations in business districts may experience high usage of e-mail, voice, and video call applications and services. The continuum orchestrator may use this combined location, and application and service usage information to modify the continuum in specific locations (e.g., the continuum orchestrator may create new service policies for user equipment domains operating in specific radio access network domains). In an embodiment, the continuum orchestrator may further combine this information with application and service profile information in order to determine the optimum continuum configuration for providing the applications and services, and hence increase network utilization, customer satisfaction, and revenue.

In an embodiment, the continuum orchestrator 1602 may conduct surveys and polls with users. In this embodiment, the domain selection node 1610 may select the set of users to be surveyed (e.g., 5,000 male users between the ages of 25 and 34 in a specific city). The user information node 1612 may send the interactive survey to the user equipments belonging to the selected users, and it may subsequently collect the survey results. The users may be offered a reward or incentive for participating in, and completing, the survey (e.g., discounts on their next bills, free application or service usage for a limited time, etc.). The survey results may be used to obtain application and service usage information that cannot be objectively measured (e.g., user satisfaction, reasons for service usage, favorite web sites, etc.). In an embodiment, the survey results may be used automatically by the service policy selection and application node 1608, or manually by the network operator, to create new service policies that improve the operation of the applications and services in the continuum.

In an embodiment, the continuum orchestrator 1602 may be configured to detect sudden large-scale and unexpected changes in application and service usage that span one or more domains within the continuum as they are occurring. In this embodiment, each domain may detect changes within it (e.g., using the traffic detection system component) and report the changes to the observation node 1604 within the continuum orchestrator 1602. The aggregation node 1606 may subsequently examine all of these changes from individual domains in order to identify and detect sudden large-scale multi-domain changes. When such a change is detected, the service policy selection and application node 1608 may create new service policies that modify the continuum. This modification may be to improve the delivery of the changing application or service, or to restrict the delivery of the changing application or service in order to ensure that sufficient resources remain available for the other applications and services in the continuum. In an embodiment, additional information from other sources may be used when the new service policies are being created. For example, user profile information may be used to determine that low-value users may be offloaded to a different radio access network, whereas high-value users may be provided with an increased quality of service. The user information node 1612 may send notifications to the users whose applications or services may be affected.

The continuum orchestrator 1602 may use the collected contextual information in order to encourage users to temporarily change their usage behavior. For example, the continuum orchestrator 1602 may encourage users to increase their consumption of services when it detects that one or more domains in the continuum have resources that are being underutilized. In this scenario, the network operator may generate additional revenue using these underutilized resources. Therefore, in an embodiment, the continuum orchestrator 1602 may collect utilization information from both the radio access network domains and the mobile packet core domain, and thus the continuum orchestrator 1602 may determine the cells and locations which are being underutilized. The continuum orchestrator 1602 may then send a service promotion to users in the affected areas using the user information node 1612. In an embodiment, the promotion may be specific to either the user, or his/her current activity. For example, if a user is currently watching a film using a video on demand service, then he/she may be offered a higher quality of service for the duration of the film.

In an alternative embodiment, the continuum orchestrator 1602 may be configured to encourage users to decrease or postpone their consumption of services when it detects that one or more domains in the continuum do not have sufficient resources to provide the services. For example, the continuum orchestrator 1602 may collect utilization information from both the radio access network domain and the mobile packet core domain in order to determine the cells and locations that are experiencing congestion. It may further enhance this utilization information by obtaining additional information (e.g., the current actual quality of service received) from user equipment domains that are located in the affected locations. The continuum orchestrator 1602 may then notify users who are likely to be affected by this congestion before or while they consume the effected services. This notification may include information and statistics regarding other nearby users who are consuming the same service (e.g., the average quality of service currently being received), and one or more images illustrating network conditions (e.g., heat maps). The continuum orchestrator 1602 may offer users incentives to temporarily alter their service usage (e.g., the user may be offered free service credits if he/she offloads to a Wi-Fi network). The continuum orchestrator 1602 may notify the user when the congestion has been cleared, and hence the user can resume consuming the services as normal.

As mentioned above, the continuum orchestrator 1602 may be configured to conduct trials involving one or more domains in the continuum using the trial management node 1614. This allows the network operator to temporarily vary the continuum for a limited number of users and to subsequently monitor the effect of these changes. The goal of these trials may be to improve the efficiency or utilization of a resource within the continuum (e.g., to reduce network congestion in the radio access network domain during peak periods, to increase revenue for a specific service in specific locations, etc.), to understand the behavior of a user or resource in the continuum (e.g., to determine the factors inhibiting users from using a video on demand service, to determine the relationship between quality of service and charging models for video calls, to predict the behavior of chatty social media applications on the mobile packet core domain, etc.), or to evaluate specific what-if scenarios under modified continuum conditions (e.g., what happens to the average revenue for gaming services per teenager if the first 30 minutes per week are free of charge, etc.). In various embodiments, the trials may be used to determine user churn, user spending habits, user satisfaction, the number of promotional service offers accepted, revenue, profit, causes of calls to customer support, domain operating costs, continuum operating costs, quantities of application data, quantities of signaling network traffic, factors influencing the popularity of applications and services, and any other activities deemed relevant by the network operator.

In various embodiments, the trials may be based on closed user groups, A versus B tests, before and after tests, etc. The trials may be passive if they are based exclusively on observations, or they may be active if they require changes to any resources within the continuum. The network operator may use the results of the trial to make decisions regarding future infrastructural development, service offerings, and charging models.

Figure 18:
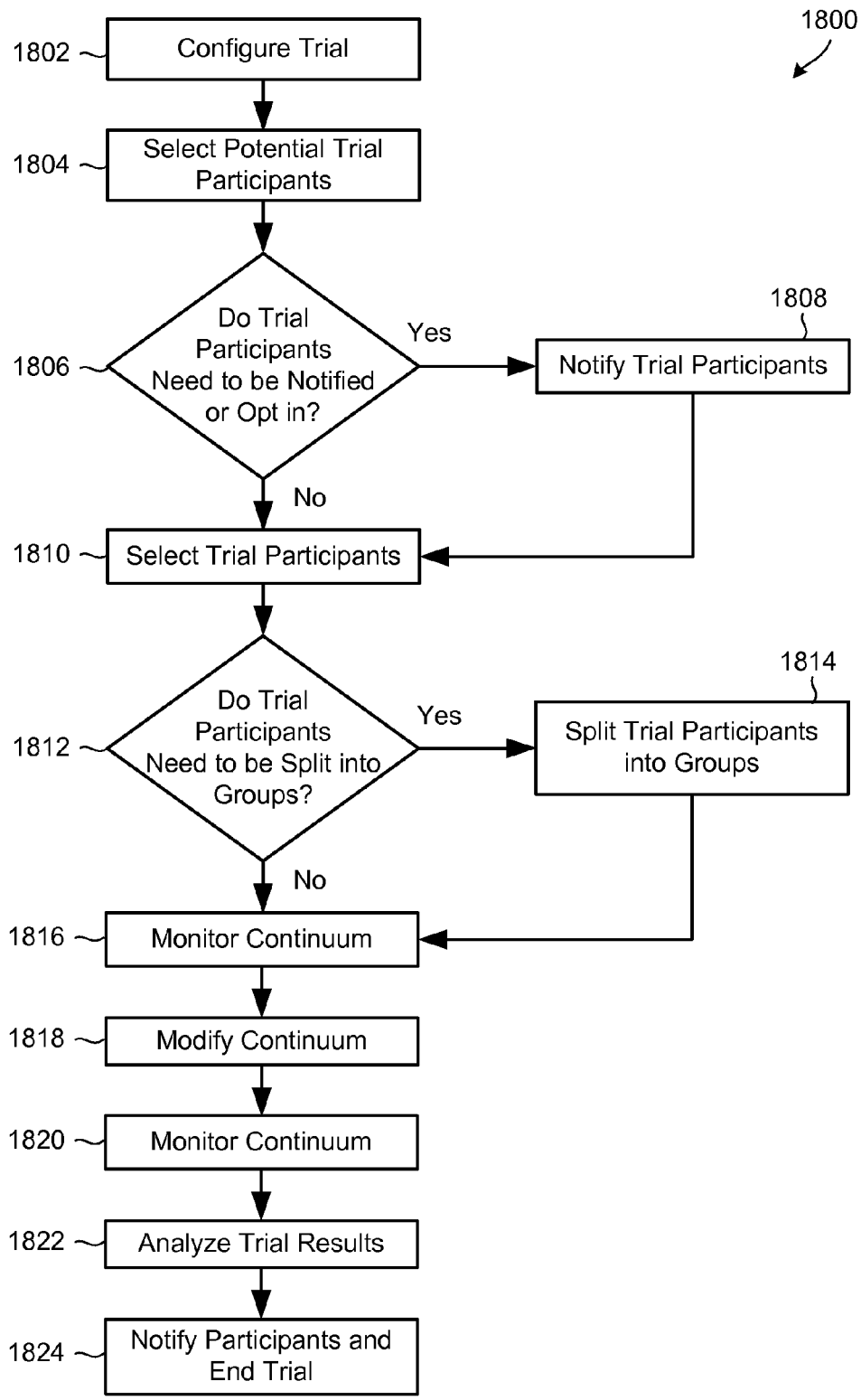
FIG. 18 is a process flow diagram illustrating an embodiment method for conducting network trials with users.

FIG. 18 illustrates an embodiment method 1800 for conducting trials with users using a continuum orchestrator. For reasons of clarity, method 1800 is described with reference to components illustrated in FIG. 16.

In block 1802, the network operator may use a trial management node 1614 to create and configure the trial (e.g., by defining its type, scope, parameters, etc.) based upon one or more of the intended trial goals. In block 1804, the domain selection node 1610 may select users determined to be suitable for participating in the trial (e.g., 2,000 tablet users that participate in family group accounts). In determination block 1806, the trial management node 1614 may determine if the trial requires the participants to either be notified of the trial or opt in to participating in the trial. This may be required due to legal reasons, regulatory reasons, network operator policies, user policies, and the nature of the trial. If it is determined that participants are required to be notified or opted in (determination block 1806="Yes"), in block 1808, the user information node 1612 may send a notification or invite to each participant's user equipment and collect any responses to the notifications. The participants may be offered a reward or incentive for participating in the trial. The network operator may also notify participants using out-of-band communications such as mailshots and customer service calls.

In block 1810, the trial management node 1614 may determine the final set of trial participants. In determination block 1812 the trial management node 1614 may determine if the participants need to be split into groups due to the type of the trial (e.g., A versus B type trials). If it is determined that participants are required to be split into two or more groups (determination block 1812="Yes"), in block 1814, the trial management node 1614 may split the participants into groups.

In block 1816, the trial management node 1614 may monitor the continuum using information obtained from both the observation node 1604 and the aggregation node 1606 before any changes are applied to the continuum. This may be necessary due to the type of the trial (e.g., before and after type trials). In block 1818 the trial management node 1614 may use the service policy selection and application node 1608 to create the service policies that modify the resources within the continuum based upon the trial configuration from block 1802. For example, in an A versus B type trial there may be two groups of users, and only the resources within the continuum associated with one group of users may be modified.

In block 1820, the trial management node 1614 may again monitor the continuum using information obtained from both the observation node 1604 and the aggregation node 1606. The operations in block 1820 may be performed on an ongoing basis throughout the duration of the trial, or it may occur when the trial has ended based upon the trial configuration (e.g., the trial may be configured to operate for one month, the trial may be configured to operate until 5,000 hours of films have been watched, etc.).

In block 1822, the trial management node 1614 may compare and analyze the information obtained in block 1820 in order to make observations on the outcomes of the trial and the overall effects of the change or changes in the continuum. This comparison and analysis may be performed per user, per resource, and for the entire continuum. The trial management node 1614 may present these results to the network operator for further analysis.

In block 1824, the trial management node 1614 may notify the participants (e.g., via the user information node 1612) that the trial has ended, and it may also provide them with some personalized results in order to encourage further engagement (e.g., a user may be informed that the service being trialed may soon be available for purchase, and that his/her usage of the service during the trial was in the top ten percentile of all trial participants). The trial management node 1614 may use functionality provided by the service policy selection and application node 1608 to reset the resources within the continuum to their pre-trial configuration.

Figure 19A:
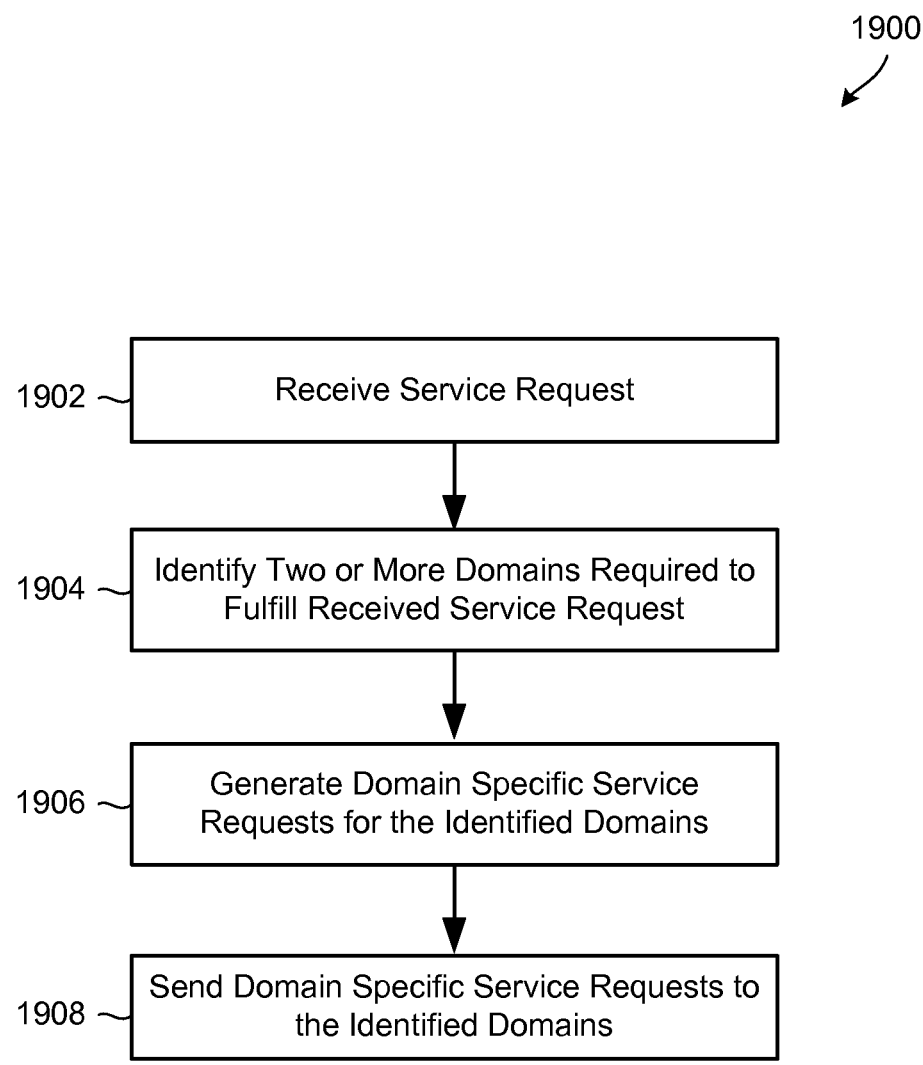
FIG. 19A is a process flow diagram illustrating an embodiment continuum orchestrator method for orchestrating services across multiple domains that are participating in a service delivery

FIG. 19A illustrates an embodiment continuum orchestrator method 1900 for orchestrating services across multiple domains that are participating in a service delivery. In block 1902, a continuum orchestrator (e.g., continuum orchestrator 1602 illustrated in FIG. 16) may receive a service request relating to a service/communication. In an embodiment, the service request may be received from a component in one of the domains participating in the service delivery. The service request may be an event-based service request, a session based service creation request, a session based service modification request, a session based service termination request, a service request containing a policy, etc. In block 1904, the continuum orchestrator may identify two or more domains that provide functionality associated with fulfilling the service request, or which are required to fulfill the service request. In block 1906, the continuum orchestrator may generate one or more domain specific requests for each of the identified domains. In block 1908, the continuum orchestrator may send the domain specific service requests to the identified domains. For example, as part of block 1908, the continuum orchestrator may send a first domain specific service to a domain orchestrator in a user equipment domain and a second domain specific service to a domain orchestrator in a mobile packet core domain (or another user equipment domain).

Figure 19B:
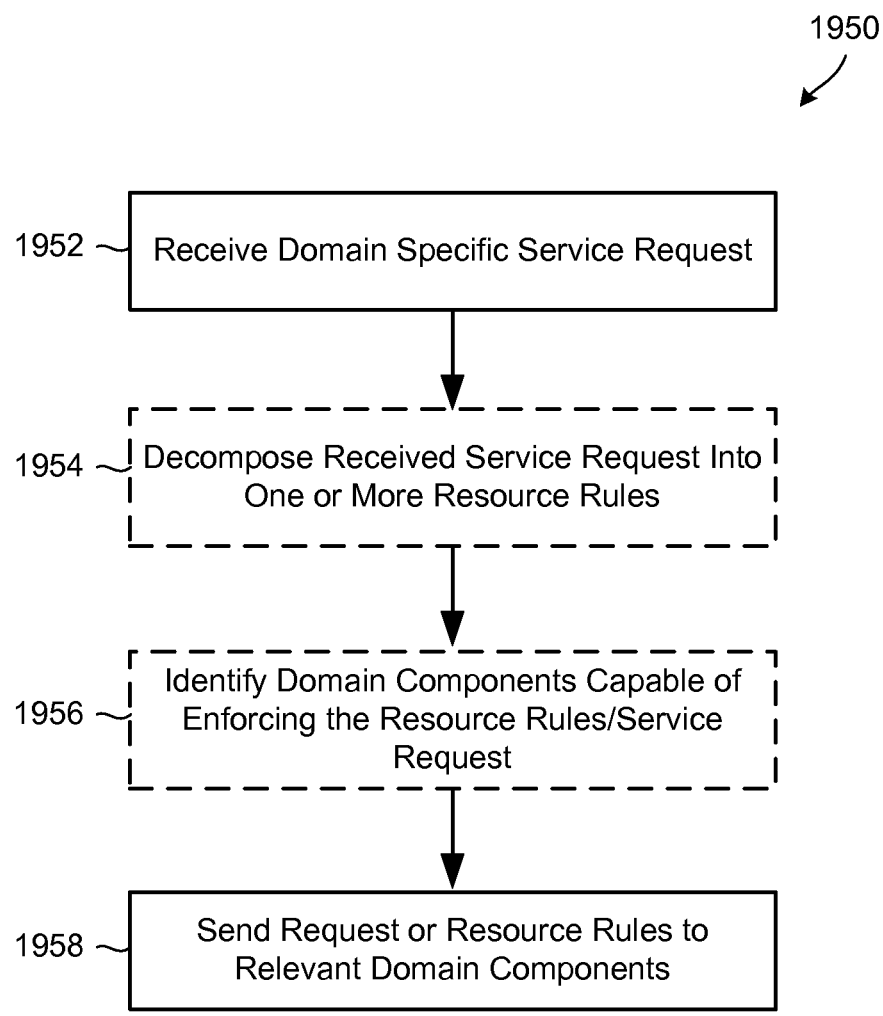
FIG. 19B is a process flow diagram illustrating an embodiment domain orchestrator method for orchestrating services across multiple domains participating in a service delivery.

FIG. 19B illustrates an embodiment domain orchestrator method 1950 for orchestrating services across multiple domains participating in a service delivery. In block 1952, the domain orchestrator may receive a domain specific service request from a continuum orchestrator. In optional block 1954, the domain orchestrator may decompose the received service request into one or more resource rules. In optional block 1956, the domain orchestrator may identify domain components capable of enforcing the resource rules and/or the service request. In block 1958, the domain orchestrator may send the received request and/or resource rules to the relevant components in the domain for enforcement or further decomposition. The domain components may receive the request/resource rules and perform domain operations by, for example, enforcing the received rules.

Figure 20A:
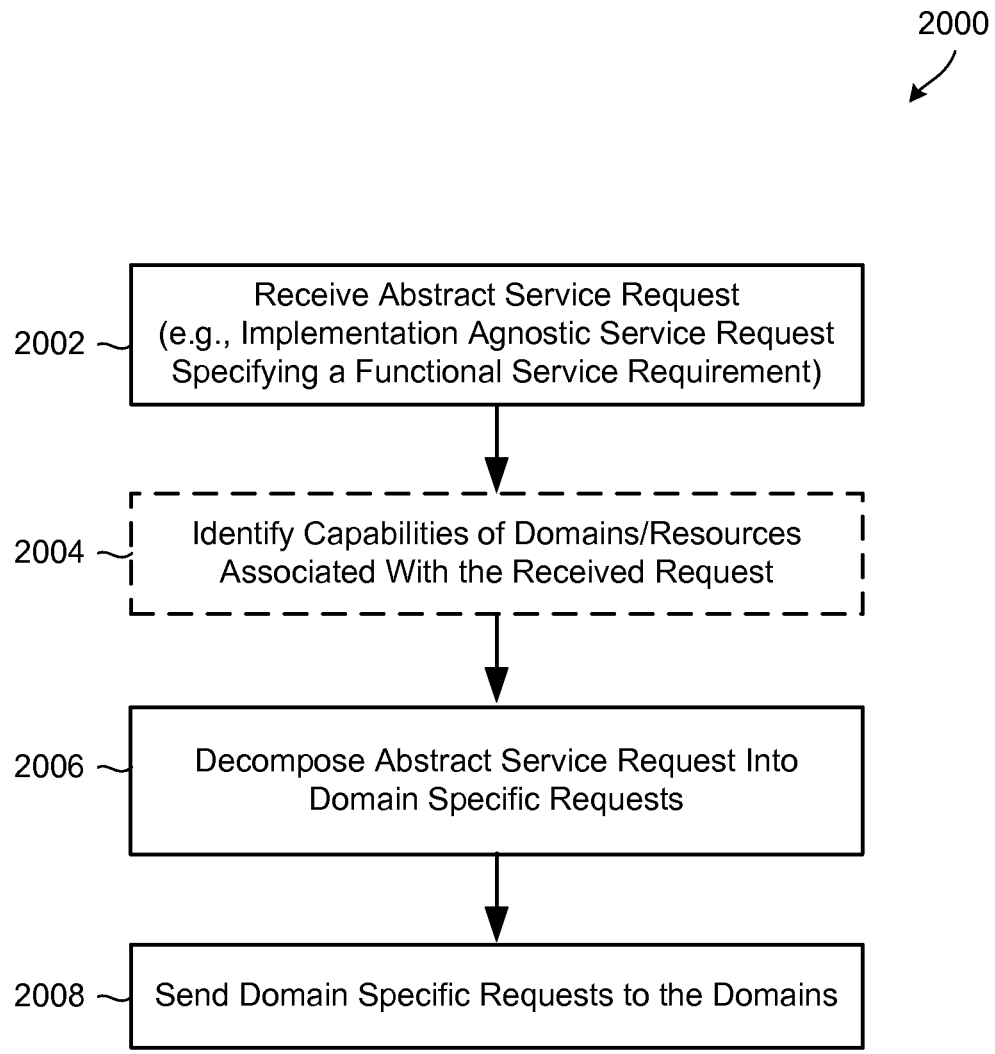
FIG. 20A is a process flow diagram illustrating an embodiment continuum orchestrator method for decomposing abstract service requests into domain specific concrete service requests.

FIG. 20A illustrates an embodiment continuum orchestrator method 2000 for decomposing abstract service requests into domain specific concrete service requests. In block 2002, the continuum orchestrator may receive an abstract service request, which may be an implementation agnostic service request specifying a functional service requirement. In optional block 2004, the continuum orchestrator may identify the capabilities and/or functionality provided by the domains associated with (or required to) fulfill the service request. In block 2006, the continuum orchestrator may decompose the abstract service request into domain specific service requests, which may identify one or more domain specific service policies. In an embodiment, the continuum orchestrator may decompose the abstract service request based on the identified capabilities and/or functionality of the domains and/or components in the domains. In block 2008, the continuum orchestrator may send the domain specific service requests to the domains. A domain orchestrator in each domain may receive the domain specific service requests, decompose the received domain specific service requests into one or more resource rules, and send the resource rules to the relevant component in the domain for enforcement. In an embodiment, each domain may be configured to implement policies identified in the domain specific service requests in a manner that is consistent with existing service policies of the domain.

Figure 20B:
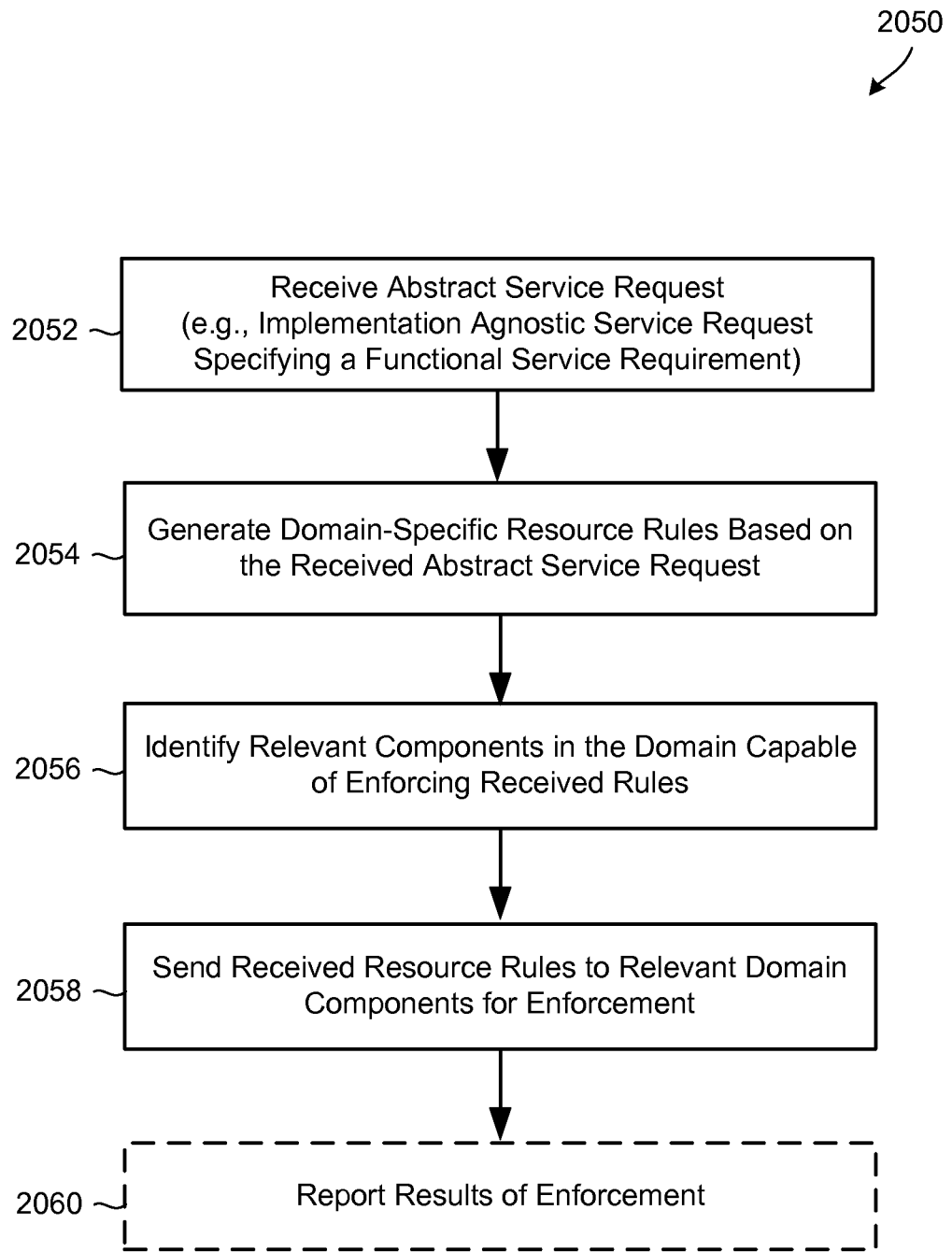
FIG. 20B is a process flow diagram illustrating an embodiment domain orchestrator method for implementing domain specific resource rules.

FIG. 20B illustrates an embodiment domain orchestrator method 2050 for decomposing abstract service requests into domain specific concrete resource rules. In block 2052, the domain orchestrator may receive an abstract service request, which may be an implementation agnostic service request specifying a functional service requirement. In an embodiment, the abstract service request may be a policy-charging service request, which may be any request relating to charging or the enforcement of policies (i.e., any request relating to any and all the functionality provided by policy and/or charging control components). In block 2054, the domain orchestrator may decompose the received abstract service request into one or more domain specific resources rules. In block 2056, the domain orchestrator may identify the relevant components in the domain having functionality for, or which are capable of, enforcing the received resource rules. In block 2058, the domain orchestrator may send the received resource rules to the relevant domain components for enforcement. In optional block 2060, the domain orchestrator may send a message to a continuum orchestrator (or a parent domain orchestrator) reporting the results of the enforcement.

Figure 21A:
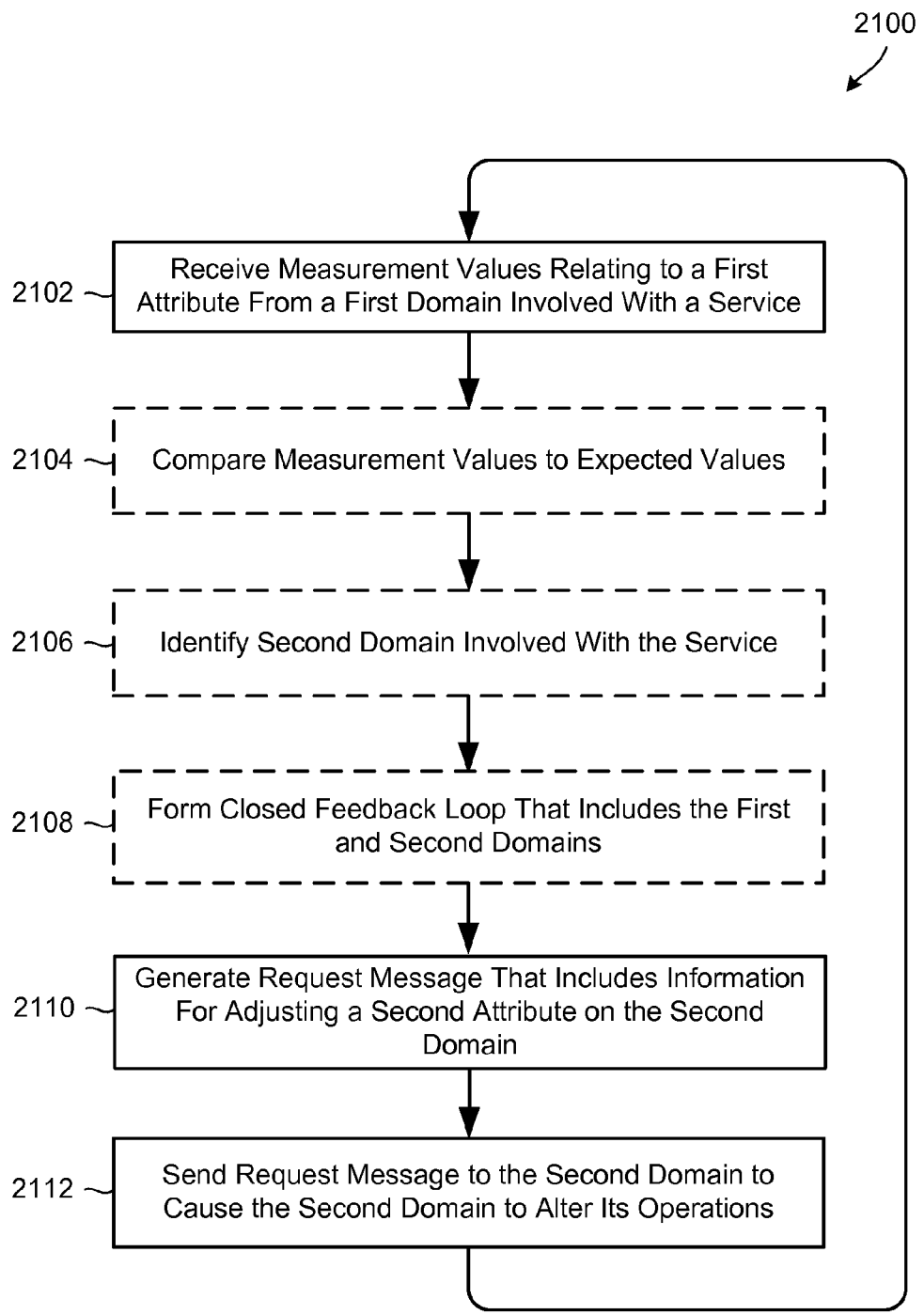
FIG. 21A is a process flow diagram illustrating an embodiment continuum orchestrator method for using measurements collected from a first domain to control a service/communication attribute in another domain.

FIG. 21A illustrates an embodiment continuum orchestrator method 2100 for using measurements (such as actual quality of service) collected from a first domain to control a service/communication attribute (such as the allocated quality of service) in another domain. In block 2102, the continuum orchestrator may receive measurement values relating to a first attribute from a first domain (e.g., a user equipment domain) involved with a service. In optional block 2104, the continuum orchestrator may compare the actual measurement values with intended values to determine if the characteristics of the service/communication present in the first domain are approximately equal to the characteristics intended for the communication. For example, the continuum orchestrator may compare actual quality of service measurements with values associated with the intended quality of service for the communication to determine if the quality of service realized in the first domain is consistent with what is intended for that domain. In optional block 2106, the continuum orchestrator may identify a second domain (e.g., mobile packet core domain) involved with the service/communication. In optional block 2108, the continuum orchestrator may form a closed feedback loop that includes the first and second domains. In block 2110, the continuum orchestrator may generate a request message that includes information for adjusting an attribute of the communication/service in the second domain. The attribute adjusted in the second domain may be the same attribute measured on the first domain, or may be a different attribute. In block 2112, the continuum orchestrator may send the request message to the second domain to cause the second domain to alter its operations. For example, as part of block 2112, the continuum orchestrator may send a request message that causes the second domain to increase the quality of service or bandwidth in that domain. The operations illustrated in blocks 2102-2112 may be repeated so that the attributes of the communication are repeatedly measured in the first domain and adjusted in the second domain until the measured actual values are approximately equal to the intended values.

Figure 21B:
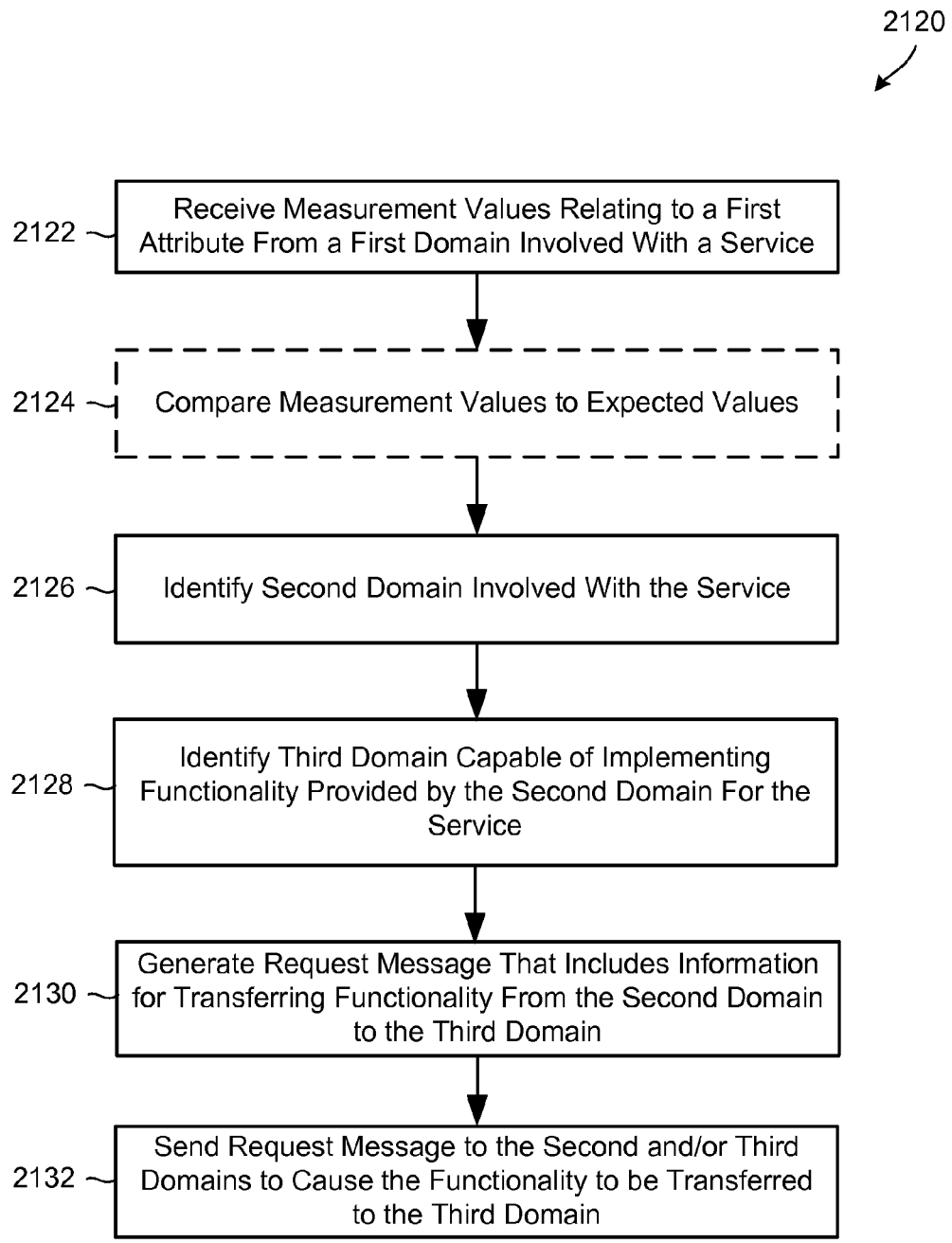
FIG. 21B is a process flow diagram illustrating an embodiment continuum orchestrator method for transferring functionality between domains.

FIG. 21B illustrates an embodiment continuum orchestrator method 2120 for transferring functionality between domains. In block 2122, the continuum orchestrator may receive measurement values relating to a first attribute from a first domain (e.g., a user equipment domain) involved with a service. In optional block 2124, the continuum orchestrator may compare the received measurement values with expected values to determine if the characteristics of the service/communication present in the first domain are approximately equal to the characteristics desired or intended for the communication. In block 2126, the continuum orchestrator may identify a second domain involved with the service/communication. In block 2128, the continuum orchestrator may identify a third domain capable of implementing the functionality provided by the second domain for the service/communication. In block 2130, the continuum orchestrator may generate one or more request messages that include information for transferring functionality from the second domain to the third domain. In block 2132, the continuum orchestrator may send the request messages to the second and/or third domains to cause the functionality to be transferred to the third domain. In an embodiment, the continuum orchestrator may update (or form) a closed feedback loop to include the first and third domains (e.g., by removing the second domain from the loop and/or adding the third domain into the loop).

Figure 21C:
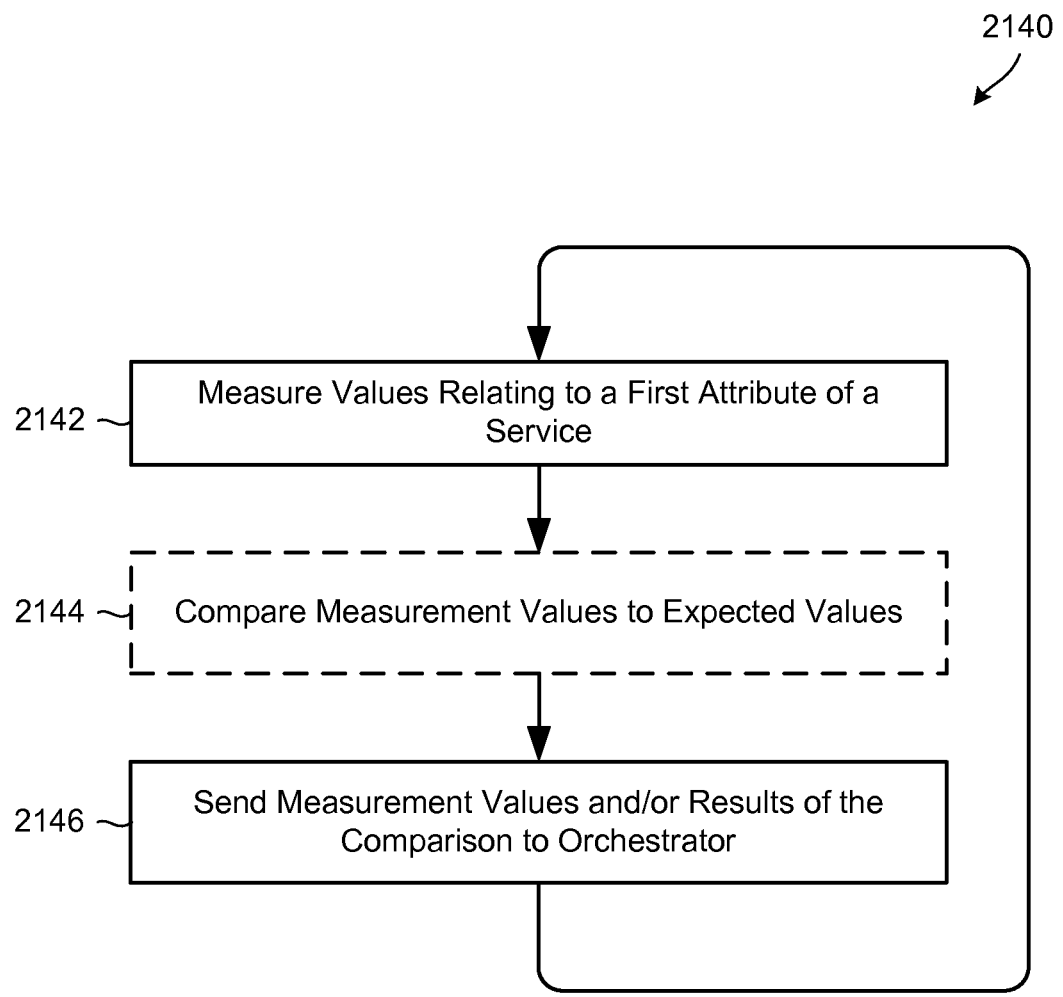
FIG. 21C is a process flow diagram illustrating an embodiment domain orchestrator method for collecting measurements that enable a continuum orchestrator to control a service/communication attribute across multiple domains.

FIG. 21C illustrates an embodiment domain orchestrator method 2140 for collecting measurements that enable a continuum orchestrator to control a service/communication attribute across multiple domains. In block 2142, the domain orchestrator may measure values relating to a first attribute of a communication (e.g., quality of service for video streaming). In optional block 2144, the domain orchestrator may compare the measured values with expected values to determine if the actual values are approximately equal to the desired or intended values for the communication. In block 2146, the domain orchestrator may send the measurement values and/or results of the comparison to a continuum orchestrator. The operations illustrated in blocks 2142-2146 may be repeated periodically or until it is determined that the actual values are approximately equal to the desired or intended values.

Figure 22:
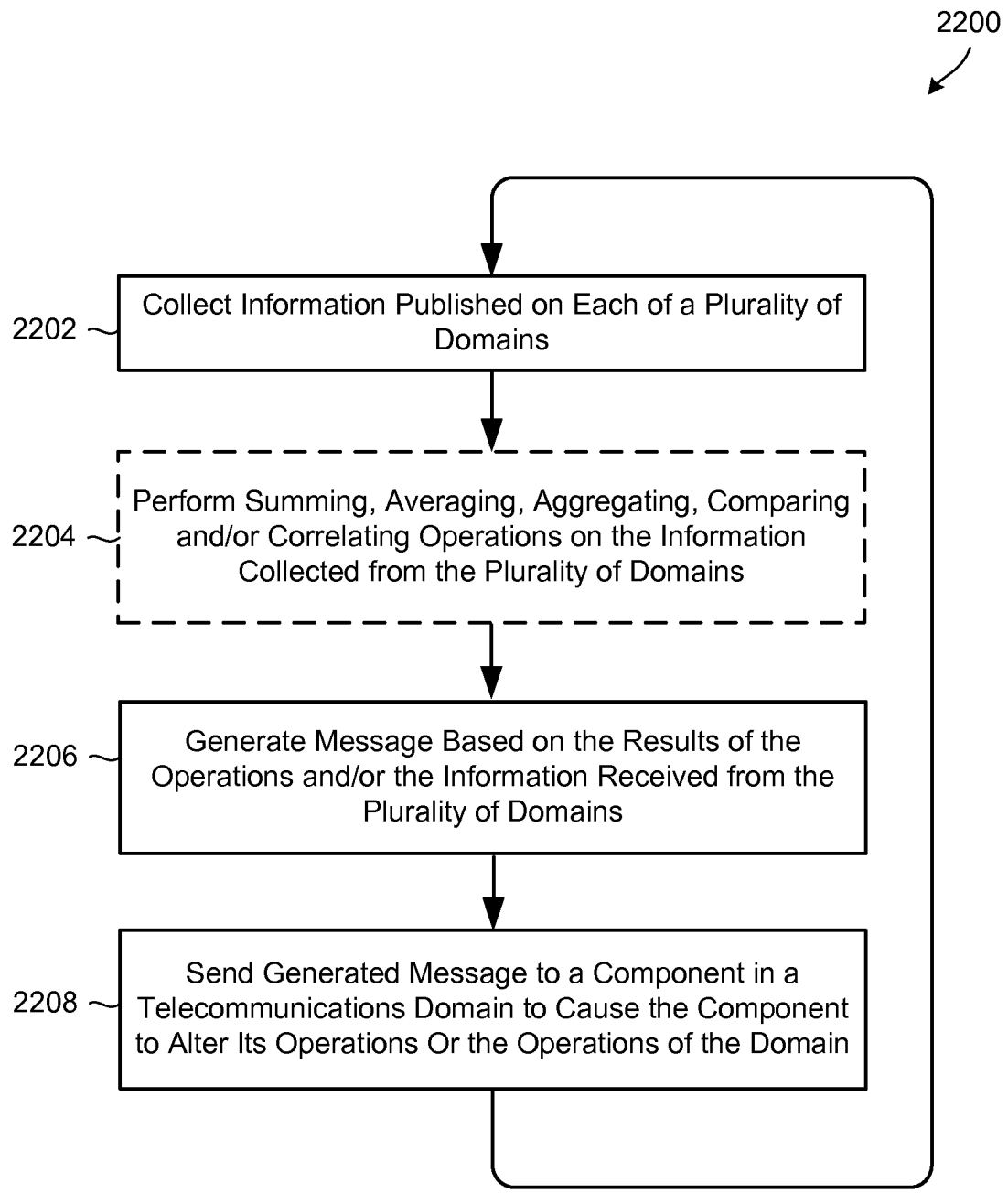
FIG. 22 is a process flow diagram illustrating an embodiment continuum orchestrator method of performing crowd sourcing.

FIG. 22 illustrates an embodiment continuum orchestrator method 2200 of performing crowd sourcing operations in which information collected from multiple domains is used to modify the operations in one or more domains. In block 2202, the continuum orchestrator may collect information published on each of a plurality of domains. For example, the continuum orchestrator may collect information published by domain orchestrators on thousands of user equipment domains and tens of mobile packet core domains associated with the user equipment domains. In optional block 2204, the continuum orchestrator may perform summing, averaging, aggregating, comparing and/or correlating operations on the information collected from the plurality of domains. In block 2206, the continuum orchestrator may generate one or more messages based on the results of the collected information and/or results of the operations. The generated message may include information for causing a component in a domain (which may or may not be included in the plurality of domains from which information was collected) to alter its operations or to alter the operations of the domain. In block 2208, the continuum orchestrator may send the generated message to the component in the domain to cause the component to alter its operations or to alter the operations of the domain. The component may receive the generated message and alter its operations based on the information included in the received message.

Figure 23A:
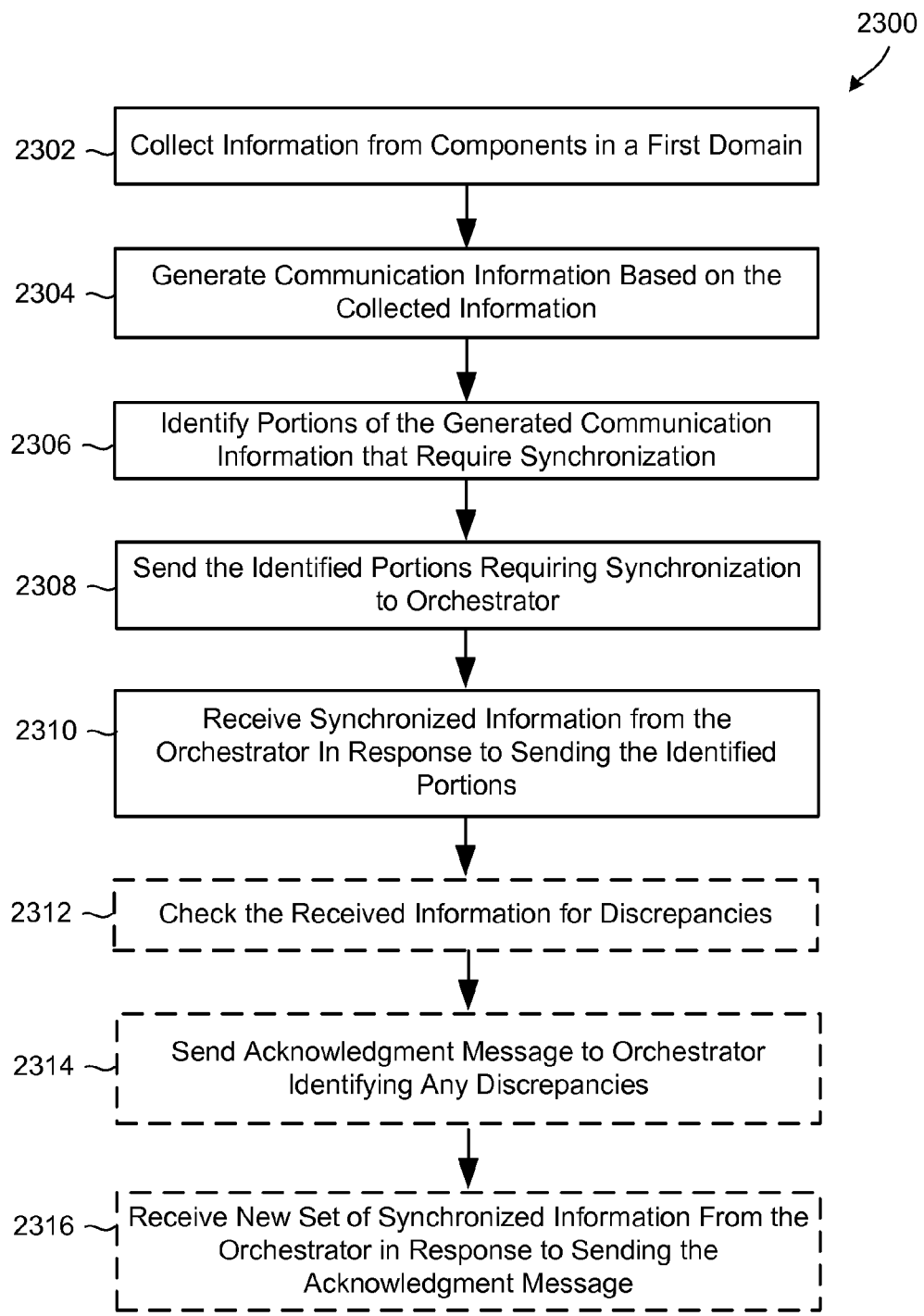
FIG. 23A is a process flow diagram illustrating an embodiment domain orchestrator method for synchronizing information with other domains participating in a service delivery.

FIG. 23A illustrates an embodiment domain orchestrator method 2300 for synchronizing information with other domains participating in a service delivery. In block 2302, the domain orchestrator may collect information from components in the domain. In block 2304, the domain orchestrator may generate communication information based on the collected information. In block 2306, the domain orchestrator may identify portions of the generated communication information that require synchronization. In block 2308, the domain orchestrator may send the identified portions requiring synchronization to a continuum orchestrator. In block 2310, the domain orchestrator may receive synchronized information from the continuum orchestrator in response to sending the identified portions. In optional block 2312, the domain orchestrator may check the received synchronized information for discrepancies. In optional block 2314, the domain orchestrator may send an acknowledgment message to the continuum orchestrator identifying any discrepancies in the received synchronized information. In optional block 2316, the domain orchestrator may receive a new batch of synchronized information from the continuum orchestrator.

Figure 23B:
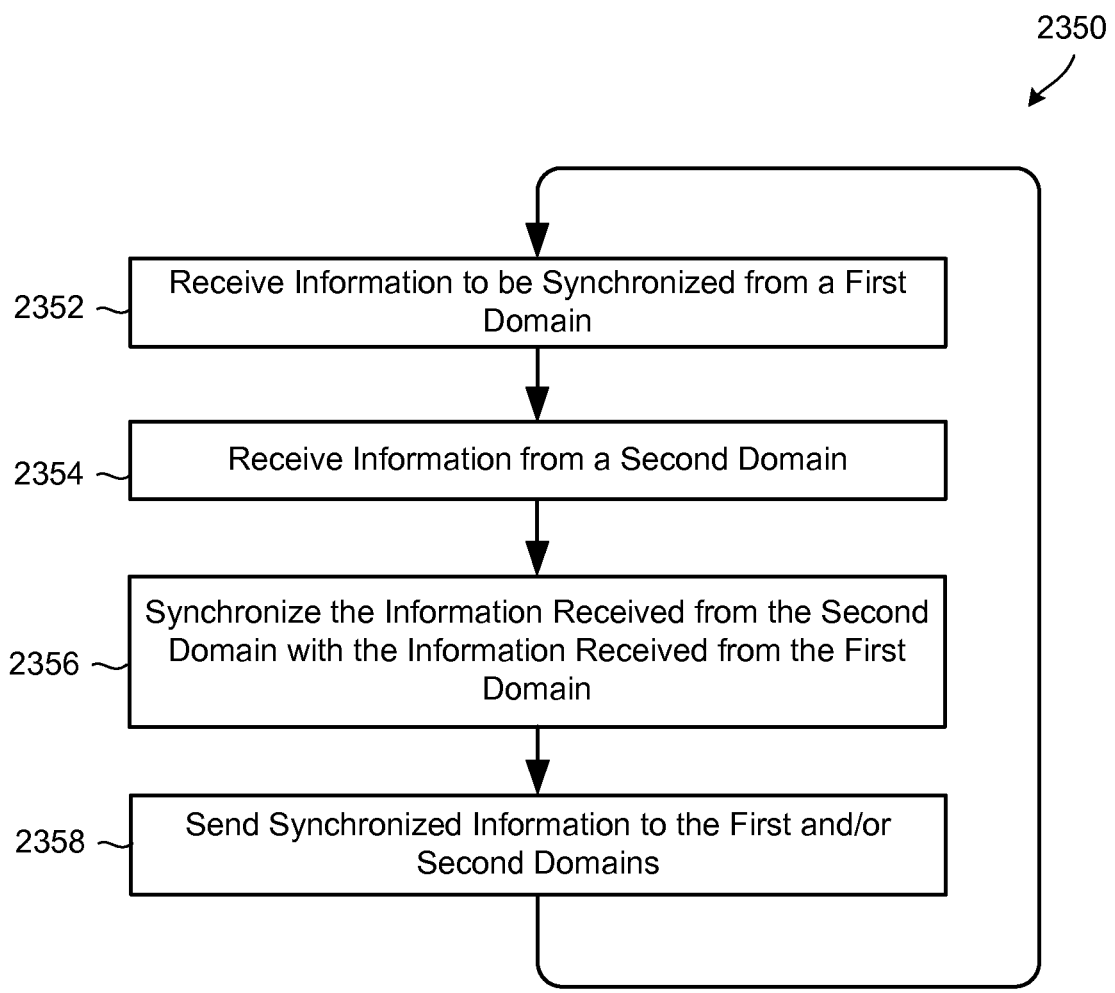
FIG. 23B is a process flow diagram illustrating a continuum orchestrator method for synchronizing information between two or more domains participating in a service delivery.

FIG. 23B illustrates a continuum orchestrator method 2350 for synchronizing information between two or more domains participating in a service delivery. In block 2352, the continuum orchestrator may receive information to be synchronized from a first domain orchestrator. In block 2354, the continuum orchestrator may receive information from a second domain orchestrator. In block 2356, the continuum orchestrator may synchronize the information received from the second domain with the information received from the first domain. In block 2358, the continuum orchestrator may send the synchronized information to the first and/or second domains. The operations in blocks 2352-2358 may be repeated as needed. In an embodiment, the continuum orchestrator may receive an acknowledgment message from the first and/or second domains indicating receipt of the synchronized information and/or if the sent synchronized information included discrepancies. In such embodiments, the continuum orchestrator may perform operations to identify and correct the source of the deficiency, resynchronize the information, and send a new batch of synchronized information to the first and/or second domains.

Figure 24:
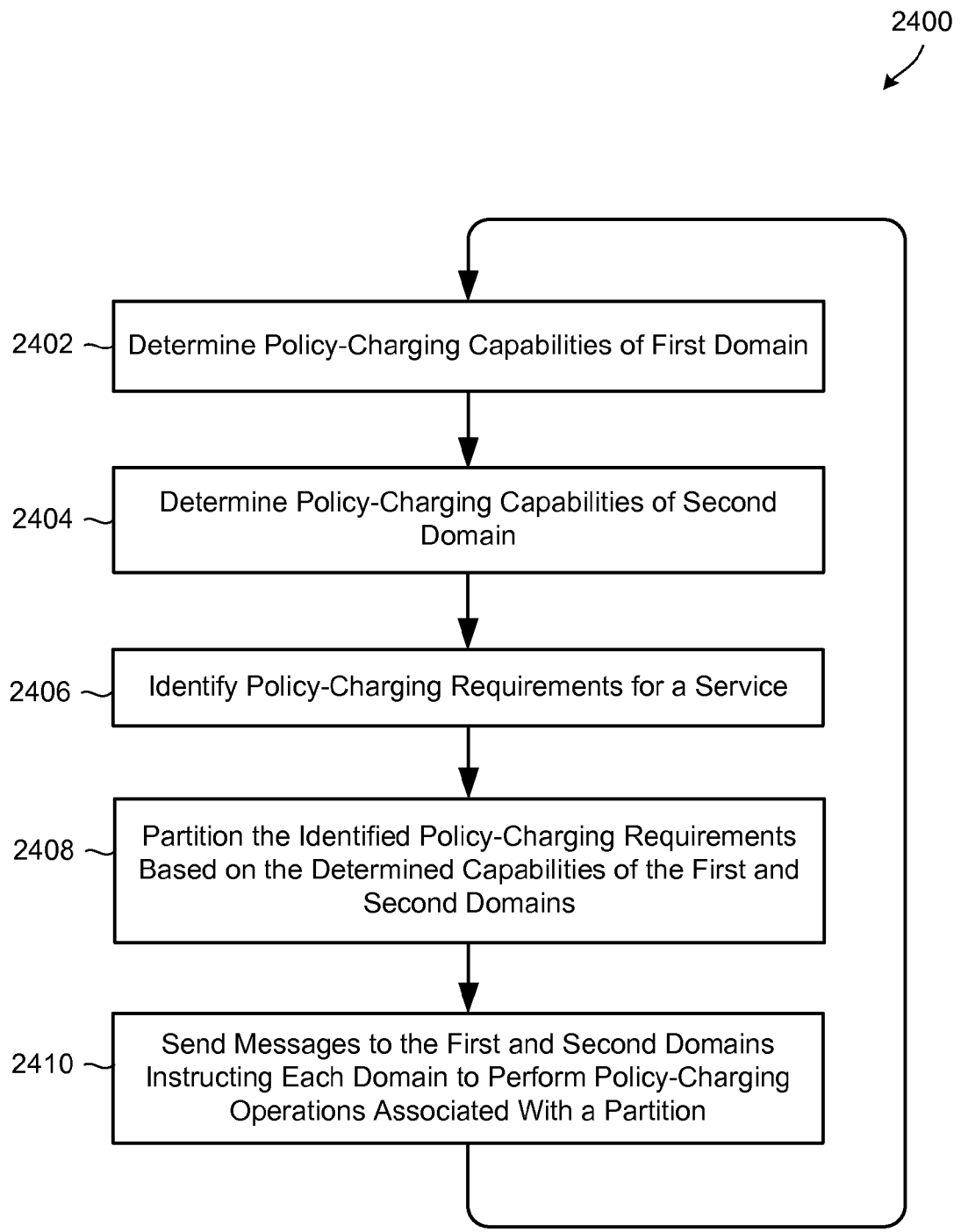
FIG. 24 is a process flow diagram illustrating a continuum orchestrator method for distributing policy-charging operations across multiple domains.

FIG. 24 illustrates a continuum orchestrator method 2400 for distributing policy-charging operations across multiple domains. Policy-charging operations may include any operations relating to charging or the enforcement of policies in the continuum, and thus may encompass any and all the functionality provided by policy and charging control components (e.g., components 502, 504, 506 illustrated in FIG. 5, components 606, 608, 610 illustrated in FIG. 6, etc.). Similarly, a policy-charging message may be any message relating to the policies or charging.

Returning to FIG. 24, in block 2402, the continuum orchestrator may determine the policy-charging capabilities of a first domain. In block 2404, the continuum orchestrator may determine the policy-charging capabilities of a second domain. In block 2406, the continuum orchestrator may identify the policy-charging requirements for a service/communication in the continuum. In block 2408, the continuum orchestrator may partition the identified policy-charging requirements of the communication based on the determined capabilities of the first and second domains. In block 2410, the continuum orchestrator may send messages to the first and second domains, instructing each domain to perform policy-charging operations associated with one or more of the partitions.

Figure 25:
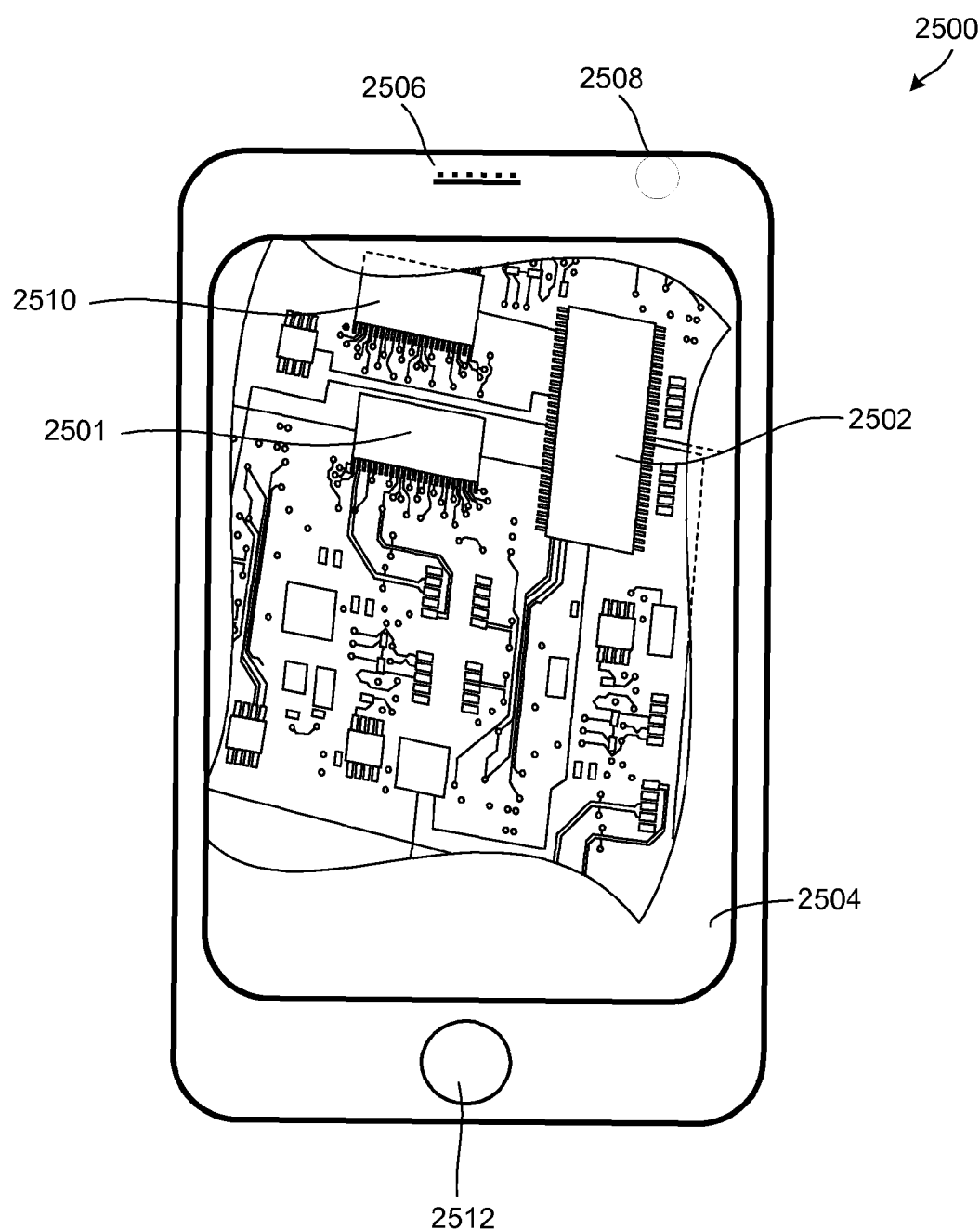
FIG. 25 is a system block diagram of a user equipment device in the form of a phone/cell phone suitable for use with various embodiments.

FIG. 25 is a system block diagram of a user equipment device in the form of a phone/cell phone suitable for use with various embodiments. A cell phone 2500 may include a processor 2501 coupled to internal memory 2502, a display 2504, and to a speaker 2506. Additionally, the cell phone 2500 may include an antenna 2508 for sending and receiving electromagnetic radiation that may be connected to a wireless data link and/or cellular telephone transceiver 2510 coupled to the processor 2501. Cell phones 2500 typically also include menu selection buttons 2512 or switches for receiving user inputs.

Figure 26:
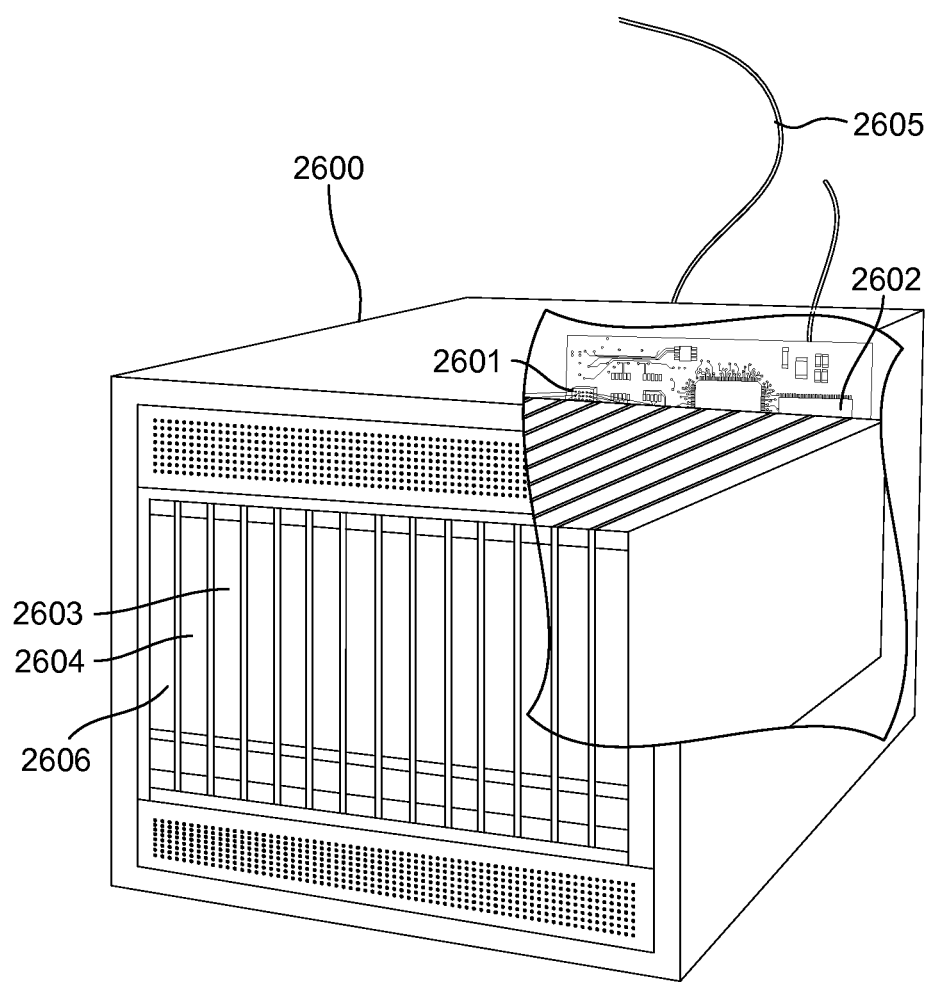
FIG. 26 is a system block diagram of a server suitable for implementing various embodiments.

The various embodiments may be implemented on any of a variety of commercially available server devices, such as the server 2600 illustrated in FIG. 26. Such a server 2600 typically includes a processor 2601 coupled to volatile memory 2602 and a large capacity nonvolatile memory, such as a disk drive 2603. The server 2600 may also include a floppy disc drive, compact disc (CD) or DVD disc drive 2606 coupled to the processor 2601. The server 2600 may also include network access ports 2604 coupled to the processor 2601 for establishing data connections with a network 2605, such as a local area network coupled to other operator network computers and servers.

The processors 2501, 2601 may be any programmable microprocessor, microcomputer or multiple processor chip or chips that can be configured by software instructions (applications) to perform a variety of functions, including the functions of the various embodiments described below. Multiple processors 2501, 2601 may be provided, such as one processor dedicated to wireless communication functions and one processor dedicated to running other applications. Typically, software applications may be stored in the internal memory 2502, 2602, 2603 before they are accessed and loaded into the processor 2501, 2601. The processor 2501, 2601 may include internal memory sufficient to store the application software instructions.

The foregoing method descriptions and the process flow diagrams are provided merely as illustrative examples and are not intended to require or imply that the steps and operations of the various embodiments must be performed in the order presented. As will be appreciated by one of skill in the art the order of steps and operations in the foregoing embodiments may be performed in any order. Words such as "thereafter," "then," "next," etc. are not intended to limit the order of the steps or operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such as, non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of communicating information in a telecommunications system that is organized into a plurality of heterogeneous telecommunication domains, the method comprising:

receiving, in a processor of a first domain orchestrator component, an implementation agnostic policy-charging service request message from a continuum orchestrator component, wherein:
all components in the telecommunications system involved in delivery of a first service are grouped into at least one of a plurality of domains,
each domain in the plurality of domains includes different components than every other domain in plurality of domains,
the plurality of domains includes at least a first domain and a second domain,
each of the components in the first domain implement domain-specific rules that are specific to the first domain,
the components in the first domain collectively provide a first functionality for the delivery of the first service,
the components in the second domain collectively provide a second functionality for the delivery of the first service,
each of the components in the second domain implement domain-specific rules that are specific to the second domain,
the first domain includes the first domain orchestrator component,
the second domain includes a second domain orchestrator component, and
the received implementation agnostic policy-charging service request message includes information identifying a functional service requirement for the delivery of the first service generating, by the processor of the first domain orchestrator component, implementation-and-domain-specific resource rules based on information included in the received implementation agnostic policy-charging service request message, the generated implementation-and-domain-specific resource rules including at least one domain-specific charging rule that is specific to the first domain;

identifying, by the processor of the first domain orchestrator component, a policy component and a charging component in the first domain for enforcing the generated implementation-and-domain-specific resource rules; and sending at least one of the generated implementation-and-domain-specific resource rules to each of the identified policy and charging components.

2. The method of claim 1, further comprising:
receiving at least one of the implementation-and-domain-specific resource rules in at least of the identified policy or charging components; and
enforcing the received implementation-and-domain-specific resource rules.

3. The method of claim 1, wherein receiving the implementation agnostic policy-charging service request message from the continuum orchestrator component comprises receiving:

an implementation agnostic event-based service request message;

an implementation agnostic session based service creation request message;

an implementation agnostic session based service modification request message;

an implementation agnostic session based service termination request message; or an implementation agnostic service request message containing policy information.

4. The method of claim 1, wherein generating the implementation-and-domain-specific resource rules comprises generating resource rules for an instance of a domain type selected from a hierarchy of domain types.

5. The method of claim 1, wherein the first domain is a user equipment domain.

6. The method of claim 1, wherein receiving the implementation agnostic policy-charging service request message from the continuum orchestrator component comprises receiving the implementation agnostic policy-charging service request message from the second domain orchestrator component via the continuum orchestrator component.

7. The method of claim 6, wherein receiving the implementation agnostic policy-charging service request message from the continuum orchestrator component comprises receiving a request message generated in response to detecting a change in circumstances in the first domain.

8. The method of claim 1, wherein receiving the implementation agnostic policy-charging service request message from the continuum orchestrator component comprises receiving a request message sent in response to a service request message being received by the continuum orchestrator component.

9. The method of claim 1, wherein generating the implementation-and-domain-specific resource rules comprises generating the implementation-and-domain-specific resource rules based on domain capabilities identified in the received implementation agnostic policy-charging service request message.

10. The method of claim 1, further comprising identifying existing resource rules in the first domain, wherein generating the implementation-and-domain-specific resource rules comprises generating the implementation-and-domain-specific resource rules such that they are consistent with the identified resource rules.

11. A domain orchestrator computing device, comprising:
first communication circuitry for communicating with components in a first domain in a telecommunications system that is organized into a plurality of heterogeneous telecommunication domains;
second communication circuitry for communicating with a second domain in the telecommunications system;
a memory; and
a processor coupled to the first and second communication circuitry and to the memory, wherein the processor is configured with processor-executable instructions to perform operations comprising:
receiving an implementation agnostic policy-charging service request message from a continuum orchestrator component, wherein:
all components in the telecommunications system involved in delivery of a first service are grouped into at least one of a plurality of domains,
each domain in the plurality of domains includes different components than every other domain in plurality of domains,
the plurality of domains includes at least the first domain and a second domain,
each of the components in the first domain implement domain-specific rules that are specific to the first domain,
the components in the first domain collectively provide a first functionality for the delivery of the first service,
the components in the second domain collectively provide a second functionality for the delivery of the first service,
each of the components in the second domain implement domain-specific rules that are specific to the second domain,
the first domain includes the domain orchestrator computing device,
the second domain includes a second domain orchestrator computing device, and
the received implementation agnostic policy-charging service request message includes information identifying a functional service requirement for the delivery of the first service;
generating implementation-and-domain-specific resource rules based on information included in the received implementation agnostic policy-charging service request message, the generated implementation-and-domain-specific resource rules including at least one domain-specific charging rule that is specific to the first domain;
identifying a policy component and a charging component in the first domain for enforcing the generated implementation-and-domain-specific resource rules; and
sending at least one of the implementation-and-domain-specific resource rules to each of the identified policy and charging components via the first communication circuitry.

12. The domain orchestrator computing device of claim 11, wherein the processor is configured with processor-executable instructions such that receiving the implementation agnostic policy-charging service request message from the continuum orchestrator component comprises receiving:
an implementation agnostic event-based service request message;
an implementation agnostic session based service creation request message;
an implementation agnostic session based service modification request message;
an implementation agnostic session based service termination request message; or
an implementation agnostic service request message containing policy information.

13. The domain orchestrator computing device of claim 11, wherein the first domain is a user equipment domain.

14. The domain orchestrator computing device of claim 11, wherein the processor is configured with processor-executable instructions such that receiving the implementation agnostic policy-charging service request message from the continuum orchestrator component comprises receiving the implementation agnostic policy-charging service request message from the second domain orchestrator computing device via the continuum orchestrator component.

15. The domain orchestrator computing device of claim 14, wherein the processor is configured with processor-executable instructions such that receiving the implementation agnostic policy-charging service request message from the continuum orchestrator component comprises receiving a request message generated in response to detecting a change in circumstances in the first domain.

16. The domain orchestrator computing device of claim 11, wherein the processor is configured with processor-executable instructions such that receiving the implementation agnostic policy-charging service request message from the continuum orchestrator component comprises receiving a request message sent in response to a service request message being received by the continuum orchestrator component.

17. The domain orchestrator computing device of claim 11, wherein the processor is configured with processor-executable instructions such that generating the implementation-and-domain-specific resource rules comprises generating resource rules for an instance of a domain type selected from a hierarchy of domain types.

18. The domain orchestrator computing device of claim 11, wherein the processor is configured with processor-executable instructions such that generating the implementation-and-domain-specific resource rules comprises generating the implementation-and-domain-specific resource rules based on domain capabilities identified in the received implementation agnostic policy-charging service request message.

19. The domain orchestrator computing device of claim 11, wherein:
  the processor is configured with processor-executable instructions to perform operations further comprising identifying existing resource rules in the first domain, and
  the processor is configured with processor-executable instructions such that generating the implementation-and-domain-specific resource rules comprises generating the implementation-and-domain-specific resource rules such that they are consistent with the identified resource rules.

20. A non-transitory computer readable storage medium having stored thereon processor-executable software instructions configured to cause a processor to perform operations for communicating information in a telecommunications system that is organized into a plurality of heterogeneous telecommunication domains, the operations comprising:
  establishing first communication links for communicating with components in a first domain in the telecommunications system;
  establishing second communication links for communicating with one a second domain in the telecommunications system;
  receiving an implementation agnostic policy-charging service request message from a continuum orchestrator component, wherein:
    all components in the telecommunications system involved in delivery of a first service are grouped into at least one of a plurality of domains,
    each domain in the plurality of domains includes different components than every other domain in plurality of domains,
    the plurality of domains includes at least the first domain and a second domain,
    each of the components in the first domain implement domain-specific rules that are specific to the first domain,
    the components in the first domain collectively provide a first functionality for the delivery of the first service,
    the components in the second domain collectively provide a second functionality for the delivery of the first service,
    each of the components in the second domain implement domain-specific rules that are specific to the second domain,
    the first domain includes the domain orchestrator computing device,
    the second domain includes a second domain orchestrator computing device, and
    the received implementation agnostic policy-charging service request message includes information identifying a functional service requirement for the delivery of the first service;
  generating implementation-and-domain-specific resource rules based on information included in the received implementation agnostic policy-charging service request message, the generated implementation-and-domain-specific resource rules including at least one domain-specific charging rule that is specific to the first domain;
  identifying a policy component and a charging component in the first domain for enforcing the generated implementation-and-domain-specific resource rules; and
  sending at least one of the implementation-and-domain-specific resource rules to each of the identified policy and charging components.

21. The non-transitory computer readable storage medium of claim 20, wherein the stored processor-executable software instructions are configured to cause a processor to perform operations such that receiving the implementation agnostic policy-charging service request message from the continuum orchestrator component comprises receiving:
  an implementation agnostic event-based service request message;
  an implementation agnostic session based service creation request message;
  an implementation agnostic session based service modification request message;
  an implementation agnostic session based service termination request message; or
  an implementation agnostic service request message containing policy information.

22. The non-transitory computer readable storage medium of claim 20, wherein the first domain is a user equipment domain.

23. The non-transitory computer readable storage medium of claim 20, wherein the stored processor-executable software instructions are configured to cause a processor to perform operations such that receiving the implementation agnostic policy-charging service request message from the continuum orchestrator component comprises receiving the implementation agnostic policy-charging service request message from the second domain orchestrator computing device via the continuum orchestrator component.

24. The non-transitory computer readable storage medium of claim 23, wherein the stored processor-executable software instructions are configured to cause a processor to perform operations such that receiving the implementation agnostic policy-charging service request message from the continuum orchestrator component comprises receiving a request message generated in response to detecting a change in circumstances in the first domain.

25. The non-transitory computer readable storage medium of claim 20, wherein the stored processor-executable software instructions are configured to cause a processor to perform operations such that receiving the implementation agnostic policy-charging service request message from the continuum orchestrator component comprises receiving a request message sent in response to a service request message being received by a continuum orchestrator.

26. The non-transitory computer readable storage medium of claim 20, wherein the stored processor-executable software instructions are configured to cause a processor to perform operations such that generating the implementation-and-domain-specific resource rules comprises generating resource rules for an instance of a domain type selected from a hierarchy of domain types.

27. The non-transitory computer readable storage medium of claim 20, wherein the stored processor-executable software instructions are configured to cause a processor to perform operations such that generating the implementation-and-domain-specific resource rules comprises generating the implementation-and-domain-specific resource rules based on domain capabilities identified in the received implementation agnostic policy-charging service request message.

28. The non-transitory computer readable storage medium of claim 20, wherein:
the stored processor-executable software instructions are configured to cause a processor to perform operations comprising identifying existing resource rules in the first domain, and
the stored processor-executable software instructions are configured to cause a processor to perform operations such that generating the implementation-and-domain-specific resource rules comprises generating the implementation-and-domain-specific resource rules such that they are consistent with the identified resource rules.

29. A communication system, comprising:
a computing device comprising a memory, and a device processor coupled to the memory; and
a communications server comprising:
first communication circuitry for communicating with components in a first domain in a telecommunications system that is organized into a plurality of heterogeneous telecommunication domains;
second communication circuitry for communicating with a second domain in the telecommunications system;
a server memory; and
a server processor coupled to the first and second communication circuitry and to the server memory,
wherein the server processor is configured with server-executable instructions to perform operations comprising:
receiving an implementation agnostic policy-charging service request message from a continuum orchestrator component, wherein:
all components in the telecommunications system involved in delivery of a first service are grouped into at least one of a plurality of domains,
each domain in the plurality of domains includes different components than every other domain in plurality of domains,
the plurality of domains includes at least the first domain and a second domain,
each of the components in the first domain implement domain-specific rules that are specific to the first domain,
the components in the first domain collectively provide a first functionality for the delivery of the first service,
the components in the second domain collectively provide a second functionality for the delivery of the first service,
each of the components in the second domain implement domain-specific rules that are specific to the second domain,
the first domain includes the domain orchestrator computing device
the second domain includes a second domain orchestrator computing device, and
the received implementation agnostic policy-charging service request message includes information identifying a functional service requirement for the delivery of the first service;
generating implementation-and-domain-specific resource rules based on information included in the received implementation agnostic policy-charging service request, the generated implementation-and-domain-specific resource rules including at least one domain-specific charging rule that is specific to the first domain;
identifying a policy component and a charging component within the first domain for enforcing the generated implementation-and-domain-specific resource rules; and
sending at least one of the implementation-and-domain-specific resource rules to each of the identified policy and charging components, and
wherein the device processor is configured with processor-executable instructions to perform operations comprising:
receiving at least one of the implementation-and-domain-specific resource rules; and
enforcing the received implementation-and-domain-specific resource rules.

\* \* \* \* \*